(12) United States Patent
Hansen et al.

(10) Patent No.: US 12,134,219 B2
(45) Date of Patent: *Nov. 5, 2024

(54) INJECTION MOLDING APPARATUS WITH INSULATED INTEGRATED ACTUATOR ELECTRONIC DRIVE

(71) Applicant: Synventive Molding Solutions, Inc., Peabody, MA (US)

(72) Inventors: Deven Hansen, Somerville, MA (US); Jared Wright, Gloucester, MA (US); Vito Galati, Rowley, MA (US); Paul Savoie, Nashua, NH (US)

(73) Assignee: SYNVENTIVE MOLDING SOLUTIONS, INC., Peabody, MA (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/876,607

(22) Filed: Jul. 29, 2022

(65) Prior Publication Data

US 2022/0396018 A1 Dec. 15, 2022

Related U.S. Application Data

(63) Continuation of application No. PCT/US2020/019669, filed on Feb. 25, 2020, and a
(Continued)

(51) Int. Cl.
*B29C 45/72* (2006.01)
*B29C 45/27* (2006.01)
(Continued)

(52) U.S. Cl.
CPC ........ *B29C 45/281* (2013.01); *B29C 45/2738* (2013.01); *B29C 45/73* (2013.01);
(Continued)

(58) Field of Classification Search
CPC ........ B29C 45/2737; B29C 2045/2824; B29C 2045/7271
See application file for complete search history.

(56) References Cited

U.S. PATENT DOCUMENTS

| 5,362,222 A | 11/1994 | Faig et al. |
| 6,294,122 B1 | 9/2001 | Moss et al. |

(Continued)

FOREIGN PATENT DOCUMENTS

| CN | 104797397 A | 7/2015 |
| CN | 105848848 A | 8/2016 |

(Continued)

OTHER PUBLICATIONS

Chinese Office Action for Chinese Application No. 202080089060.9; Report Mail Date Mar. 4, 2024 (30 Pages—with translation).
(Continued)

*Primary Examiner* — James Sanders
(74) *Attorney, Agent, or Firm* — CANTOR COLBURN LLP

(57) ABSTRACT

An injection molding apparatus (10) comprising an
actuator (940, 941, 942) comprised of a driver (940*dr*, 941*dr*, 942*dr*) receiving electrical energy or power from an electrical drive (940*d*, 941*d*, 942*d*),
the electrical drive (940*d*, 941*d*, 942*d*) comprising an interface that receives and controllably distributes electrical energy or power in controllably varied amounts during the course of an injection cycle to the driver (940*dr*, 941*dr*, 942*dr*),
the electrical drive (940*d*, 941*d*, 942*d*) being housed within or by an actuator housing (940*h*, 941*h*, 942*h*) or being mounted on or to the housing (940*h*, 941*h*, 942*h*),
the housing (940*h*, 941*h*, 942*h*) and the electrical drive (940*d*, 941*d*, 942*d*) being mounted on, to or in close proximity to the heated manifold (40),
(Continued)

a cooling device (940mc, 940mc1, 940mc2, 941mc, 942mc) disposed between the heated manifold (40) and the housing (940h, 941h, 942h) adapted to substantially isolate or insulate at least the electrical drive (940d, 941d, 942d) from substantial communication with heat emanating or emitted from the heated manifold (40).

18 Claims, 37 Drawing Sheets

Related U.S. Application Data continuation-in-part of application No. 17/408,562, filed on Aug. 23, 2021, now Pat. No. 11,897,174, which is a continuation of application No. PCT/US2020/019669, filed on Feb. 25, 2020, application No. 17/876,607, filed on Jul. 29, 2022 is a continuation-in-part of application No. 17/181,292, filed on Feb. 22, 2021, now Pat. No. 11,524,435, which is a continuation of application No. PCT/US2020/046736, filed on Aug. 18, 2020, application No. 17/876,607, filed on Jul. 29, 2022 is a continuation-in-part of application No. 17/690,040, filed on Mar. 9, 2022, which is a continuation-in-part of application No. 17/408,562, filed on Aug. 23, 2021, now Pat. No. 11,897,174, which is a continuation of application No. PCT/US2020/019669, filed on Feb. 25, 2020, application No. 17/876,607, filed on Jul. 29, 2022 is a continuation-in-part of application No. 17/725,888, filed on Apr. 21, 2022.

(60) Provisional application No. 62/862,277, filed on Jun. 17, 2019, provisional application No. 63/226,779, filed on Jul. 29, 2021, provisional application No. 62/810,204, filed on Feb. 25, 2019, provisional application No. 62/889,385, filed on Aug. 20, 2019.

(51) Int. Cl.
  *B29C 45/28* (2006.01)
  *B29C 45/73* (2006.01)
  *B29C 45/76* (2006.01)

(52) U.S. Cl.
  CPC ...... *B29C 45/76* (2013.01); *B29C 2045/2753* (2013.01); *B29C 2045/2824* (2013.01); *B29C 2045/7271* (2013.01); *B29C 2045/735* (2013.01); *B29C 2945/76006* (2013.01); *B29C 2945/7604* (2013.01); *B29C 2945/76083* (2013.01); *B29C 2945/76274* (2013.01); *B29C 2945/76568* (2013.01); *B29C 2945/76752* (2013.01)

(56) References Cited

U.S. PATENT DOCUMENTS

| | | | |
|---|---|---|---|
| 6,309,208 B1 | 10/2001 | Kazmer et al. | |
| 6,464,909 B1 | 10/2002 | Kazmer et al. | |
| 7,597,828 B2 | 10/2009 | Doyle et al. | |
| 8,091,202 B2 | 1/2012 | Galati et al. | |
| 8,928,271 B2 | 1/2015 | Bucella et al. | |
| 9,048,708 B2 | 6/2015 | Cloran et al. | |
| 9,849,618 B1 | 12/2017 | Tooman et al. | |
| 2003/0122272 A1 | 7/2003 | Smith et al. | |
| 2004/0161490 A1 | 8/2004 | Babin et al. | |
| 2004/0166189 A1 | 8/2004 | Babin | |
| 2005/0123641 A1 | 6/2005 | Kim | |
| 2007/0273060 A1 | 11/2007 | Doyle et al. | |
| 2015/0306803 A1 | 10/2015 | Antunes et al. | |
| 2016/0229102 A1 | 8/2016 | Galati | |
| 2018/0079121 A1 | 3/2018 | Lee et al. | |
| 2018/0186051 A1 | 7/2018 | Lee et al. | |
| 2018/0194050 A1 | 7/2018 | Galati | |
| 2018/0264698 A1 | 9/2018 | Bazzo et al. | |

FOREIGN PATENT DOCUMENTS

| | | |
|---|---|---|
| CN | 109080084 A | 12/2018 |
| DE | 202008010772 U1 | 11/2008 |
| EP | 2679374 A1 | 1/2014 |
| EP | 2926972 A1 | 10/2015 |
| JP | H07290485 A | 11/1995 |
| JP | 2004274834 A | 9/2004 |
| JP | 2005053074 A | 3/2005 |
| WO | 03057448 A1 | 7/2003 |
| WO | 2014172100 A1 | 10/2014 |
| WO | 2014194037 A1 | 12/2014 |
| WO | 2017210169 A1 | 12/2017 |
| WO | 2018089243 A1 | 5/2018 |
| WO | 2018194961 A1 | 10/2018 |
| WO | 2019089243 A1 | 5/2019 |

OTHER PUBLICATIONS

Chinese Office Action for Chinese Application No. 202080030923.5; Report Mail Date Sep. 16, 2023 (66 Pages—with translation).
European Office Action for European Application No. 20714758.8; Report Mail Date Dec. 21, 2021 (4 Pages).
International Preliminary Report on Patentability for International Application No. PCT/US2020/054354; International Filing Date Oct. 6, 2020; Report Mail Date Feb. 7, 2022 (81 Pages).
International Preliminary Report on Patentability in related international application PCT/US2020/046736 mailed on May 6, 2021 (97 Pages).
International Search Report and Written Opinion for International Application No. PCT/2021/018973; International Filing Date Feb. 22, 2021; Report Mail Date Apr. 28, 2021; 11 Pages.
Teknic Clear Path Integrated Servo Motors printout from www.teknic.com/products/clearpath-brushless-dc-servo-motors/ from Apr. 29, 2019 (3 Pages).
International Search Report and Written Opinion for International Application No. PCT/US2020/019669; International Filing Date Feb. 25, 2020; Report Mail Date May 26, 2020 (19 Pages).
International Search Report and Written Opinion for International Application No. PCT/US2020/046736; International Filing Date Aug. 18, 2020; Report Mail Date Feb. 3, 2021 (21 Pages).
International Search Report and Written Opinion for International Application No. PCT/US2020/054354; International Filing Date Oct. 6, 2020; Report Mail Date Feb. 17, 2021 (26 Pages).
Invitation to Pay Additional Fees and Partial Search Report for International Application No. PCT/US2020/046736; International Filing Date Aug. 18, 2020; Report Mail Date Mar. 11, 2021 (4 Pages).
European Office Action for European Application No. 21712323.1; Report Mail Date Jul. 22, 2024 (4 Pages).
Chinese Office Action for Chinese Application No. 202080089060.9; Report Mail Date Sep. 12, 2024 (28 Pages-with translation).

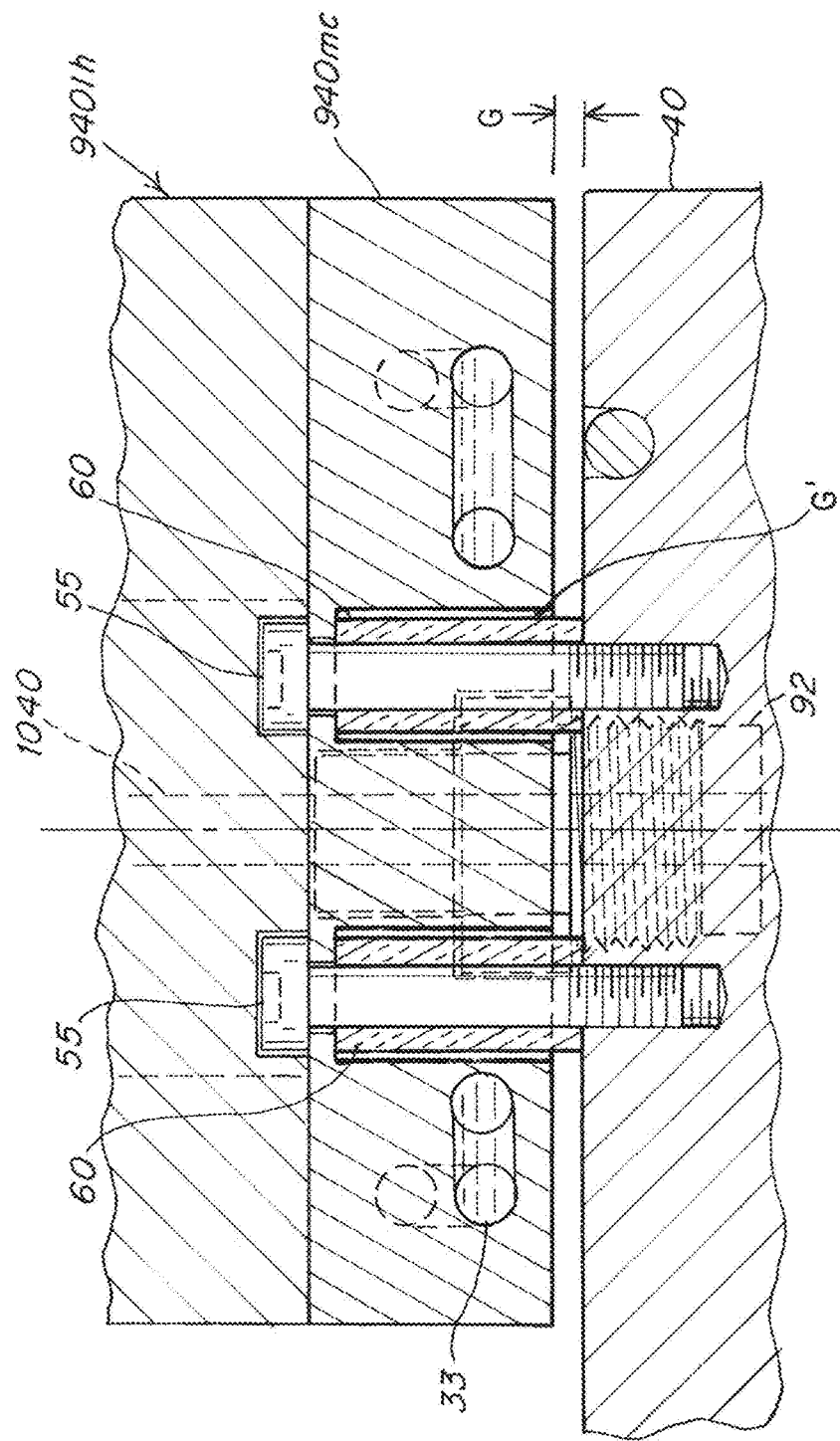

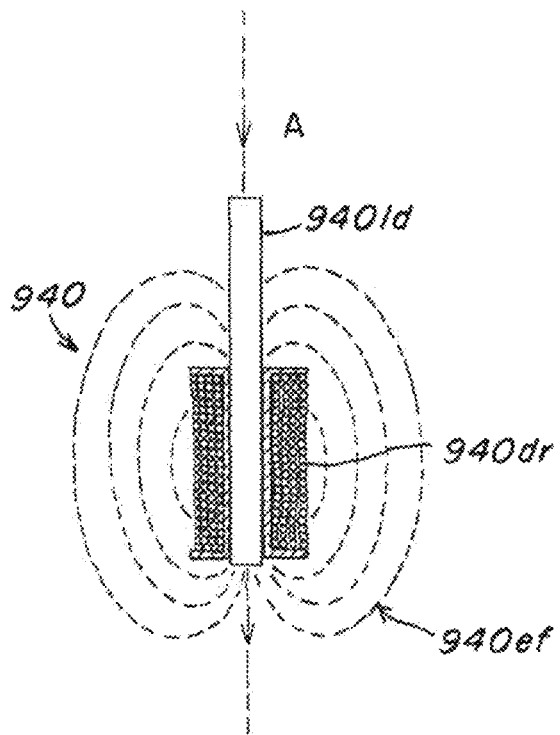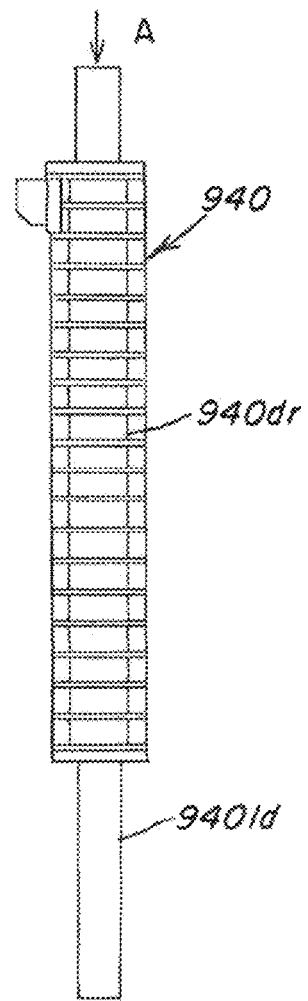
Fig. 3A
Fig. 3B

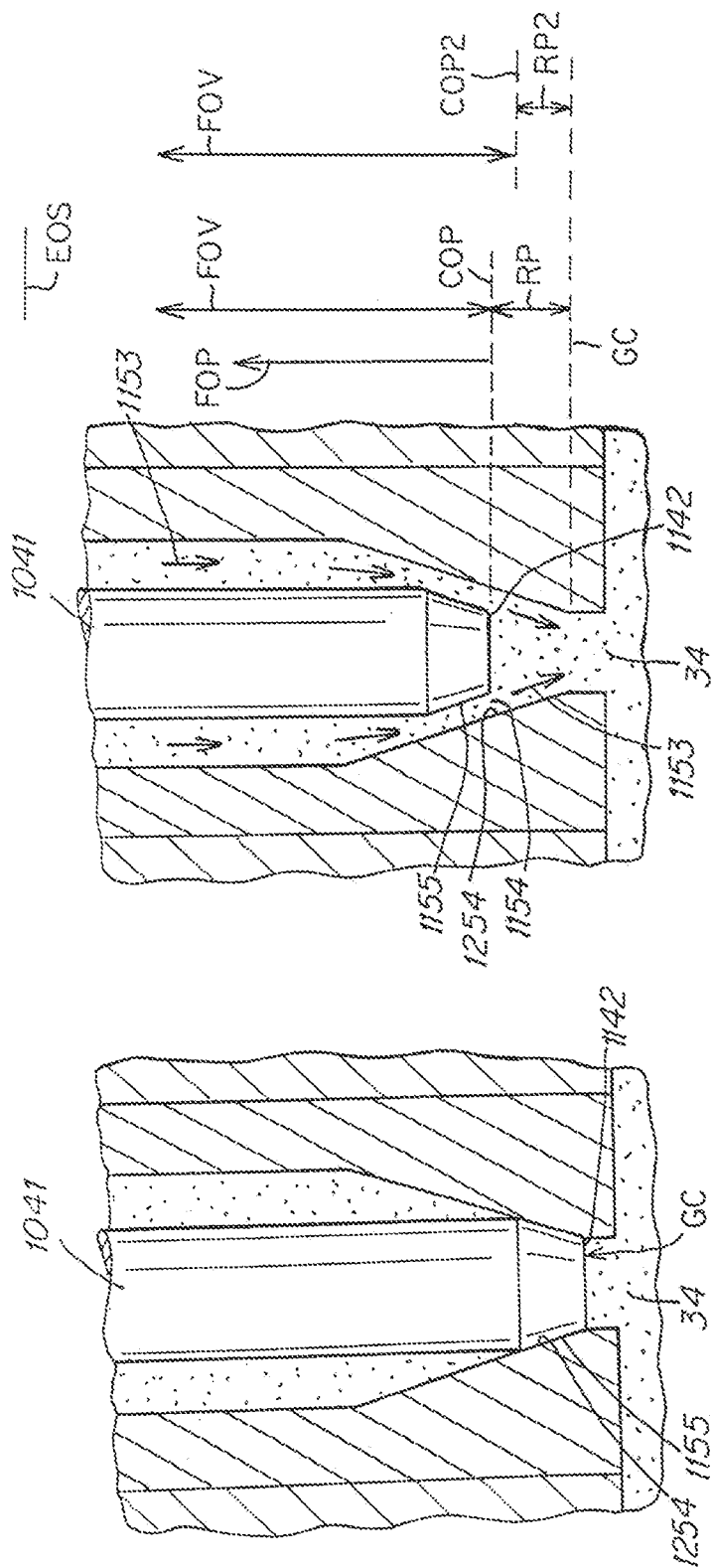

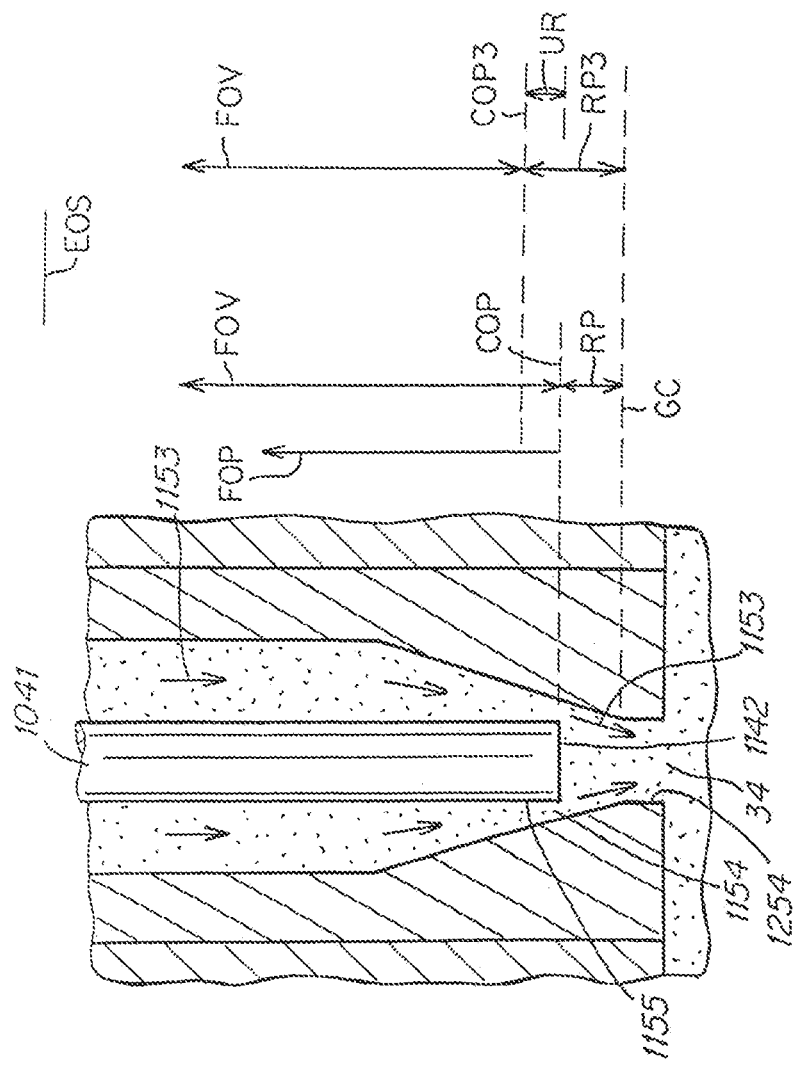
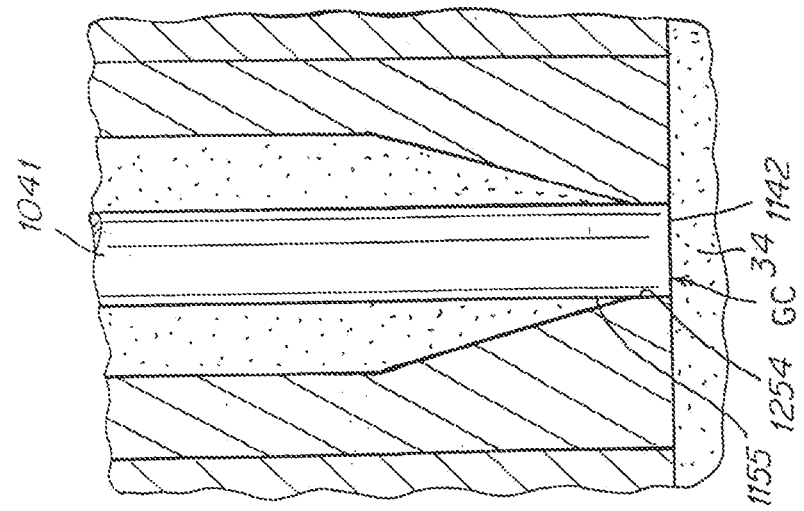
Fig. 23B
Fig. 23A

INJECTION MOLDING APPARATUS WITH INSULATED INTEGRATED ACTUATOR ELECTRONIC DRIVE

RELATED APPLICATIONS

This application is a continuation of and claims the benefit of priority to international application PCT/US20/19669 (7185WO0) filed Feb. 25, 2020 which in turn claims and is entitled to the benefit of priority of U.S. provisional application No. 62/862,277 filed Jun. 17, 2019, the disclosures of both of which are incorporated by reference as if fully set forth herein in their entirety.

This application further claims the benefit of priority to U.S. Provisional Application Ser. No. 63/226,779 (7187US2) filed Jul. 29, 2021, the disclosure of which is incorporated by reference as if fully set forth herein in its entirety.

This application is also a continuation in part of and claims the benefit of priority to U.S. application Ser. No. 17/408,562 filed Aug. 23, 2021 (7185US2) which in turn is a continuation of and claims and is entitled to the benefit of priority to international application PCT/US2020/019669 (7185WO0) filed Feb. 25, 2020 which in turn claims and is entitled to the benefit of priority of U.S. Provisional Application Ser. No. 62/810,204 filed Feb. 25, 2019 and U.S. Provisional Application Ser. No. 62/862,277 filed Jun. 17, 2019 the disclosures of all of which are incorporated by reference as if fully set forth herein.

This application is also a continuation in part of and claims the benefit of priority to U.S. application Ser. No. 17/181,292 filed Feb. 22, 2021 (7187US1) which is in turn a continuation of international application PCT/US2020/046736 (7187WO0) filed Aug. 18, 2020 which in turn claims and is entitled to the benefit of priority of U.S. provisional application No. 62/889,385 (7187US0) filed Aug. 20, 2019, the disclosures of all of which are incorporated by reference as if fully set forth herein.

This application is also a continuation in part of and claims the benefit of priority to U.S. application Ser. No. 17/690,040 filed Mar. 9, 2022 (7187US3) which is in turn a continuation in part of and claims the benefit of priority to U.S. application Ser. No. 17/408,562 filed Aug. 23, 2021 (7185US2) which in turn is a continuation of and claims and is entitled to the benefit of priority to international application PCT/US2020/019669 (7185WO0) filed Feb. 25, 2020 which in turn claims and is entitled to the benefit of priority of U.S. Provisional Application Ser. No. 62/810,204 filed Feb. 25, 2019 and U.S. Provisional Application Ser. No. 62/862,277 filed Jun. 17, 2019 the disclosures of all of which are incorporated by reference as if fully set forth herein.

This application is also a continuation in part of and claims the benefit of priority to U.S. application Ser. No. 17/725,888 filed Apr. 21, 2022 (7188US4), the disclosure of which is incorporated by reference as if fully set forth herein in its entirety.

The disclosures of all of the following are incorporated by reference in their entirety as if fully set forth herein: U.S. Pat. Nos. 5,894,025, 6,062,840, 6,294,122 (7018), U.S. Pat. Nos. 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. No. 6,062,840 (7052), U.S. Pat. No. 6,261,075 (7052US1), U.S. Pat. Nos. 6,599,116, 7,234,929 (7075US1), U.S. Pat. No. 7,419,625 (7075US2), U.S. Pat. No. 7,569,169 (7075US3), U.S. Pat. No. 8,297,836 (7087) U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), International Application WO2011119791 filed Mar. 24, 2011 (7094), U.S. application Ser. No. 10/101,278 filed Mar. 19, 2002 (7070) and PCT Application No. PCT/US11/062099 (7100WO0) and PCT Application No. PCT/US11/062096 (7100WO1), U.S. Pat. Nos. 8,562,336, 8,091,202 (7097US1) and U.S. Pat. No. 8,282,388 (7097US2), U.S. Pat. No. 9,724,861 (7129US4), U.S. Pat. No. 9,662,820 (7129US3), Publication No. WO2015006261 (7135WO0), Publication No. WO2014209857 (7134WO0), International application Publication No. WO2016153632 (7149WO2), International application publication no. WO2016153704 (7149WO4), U.S. Pat. No. 9,205,587 (7117US0), U.S. application Ser. No. 15/432,175 (7117US2) filed Feb. 14, 2017, U.S. Pat. No. 9,144,929 (7118US0), U.S. Publication No. 20170341283 (7118US3), U.S. Pat. No. 9,937,648 (7135US2), U.S. patent Ser. No. 10/569,458 (7162US1), International Application WO2017214387 (7163WO0), International Application PCT/US17/043029 (7165WO0) filed Jul. 20, 2017, International Application PCT/US17/043100 (7165WO1), filed Jul. 20, 2017 and International Application PCT/US17/036542 (7163WO0) filed Jun. 8, 2017 and International Application WO2018129015 (7169WO0), International application WO2018148407 (7170WO0), International application WO2018148407 (7171WO0), international application WO2018175362 (7172WO0), international application WO2018194961 (7174WO0), international application WO2018200660 (7176WO0), international application WO2019013868 (7177WO0), international application WO2019100085 (7178WO0), international application WO2021/034793 (7187WO0).

BACKGROUND OF THE INVENTION

Injection molding systems have been developed for performing injection molding cycles controlled by an electric motor actuator mounted for protection from overheating. The electrical drive systems are typically contained within a master electronic controller device. Such electrical drive systems when incorporated into the circuitry, boards or housing of the master controller can suffer loss of speed of communication and loss of integrity of digital and analog signal communication between the processors of the master controller and the driver components of the electric actuator. Separating the electric drive element from the master controller and mounting the electric drive element on or to or within the housing of the electric actuator can provide improved operation of the master controller as well as improved communication of electronic signals back and forth between the master controller and the driver components of the electric actuator.

SUMMARY OF THE INVENTION

In accordance with the invention there is provided an injection molding apparatus comprising:

a heated manifold (40) that receives a flow of injection fluid from an injection molding machine and distributes the injection fluid (18) to a flow channel that delivers the injection fluid to a gate (32, 34, 36) of a mold cavity (30), an actuator (940, 941, 942) controllably drivable by electric power having a drive axis (Y) and a driver (940dr, 941dr, 942dr) adapted to controllably drive a valve pin along a linear path of travel (X), the valve pin being adapted to vary rate of flow of the injection material to and through the gate, the driver (940dr, 941dr, 942dr) receiving electrical energy or power from an electrical drive (940d, 941d, 942d), the electrical drive (940d, 941d, 942d) comprising an interface that receives and controllably distributes electrical energy or power in controllably varied amounts during the course of an injection cycle to the driver (940dr, 941dr, 942dr), the actuator having a housing (940h, 941h, 942h), the electrical drive (940d, 941d, 942d) being housed within or by the housing (940h, 941h, 942h) or being mounted on or to the housing (940h, 941h, 942h), the housing (940h, 941h, 942h) and the electrical drive (940d, 941d, 942d) being mounted on, to or in close proximity to the heated manifold (40), the apparatus including a cooling device (940mc, 940mc1, 940mc2, 941mc, 942mc) disposed between the heated manifold (40) and the housing (940h, 941h, 942h), the cooling device (940mc, 940mc1, 940mc2, 941mc, 942mc) being adapted to substantially isolate or insulate at least the electrical drive (940d, 941d, 942d) from substantial communication with heat emanating or emitted from the heated manifold (40).

The electric actuator (940, 941, 942) typically comprises a driver (940dr, 941dr, 942dr) adapted to receive and convert electrical energy to driven movement of a rotor or rod arranged to drive the valve pin along the linear path of travel.

In another aspect of the invention there is provided a method of performing an injection molding cycle comprising:

injecting a flow of injection fluid (18) to a heated manifold (40) that distributes the injection fluid (18) to a flow channel through which the injection fluid is controllably delivered to a gate (32, 34, 36) of a mold cavity (30) by controllably driving an actuator (940, 941, 942), distributing electrical energy or power from an electrical drive (940d, 941d, 942d) to a driver (940dr, 941dr, 942dr) of the actuator (940, 941, 942), adapting the driver to controllably drive a valve pin along a linear path of travel according to the distributed electrical energy, configuring the electrical drive (940d, 941d, 942d) as an interface that receives and controllably distributes electrical energy or power in controllably varied amounts during the course of an injection cycle to the driver (940dr, 941dr, 942dr), providing the actuator with a housing (940h, 941h, 942h) that houses the driver (940dr, 941dr, 942dr), housing the electrical drive (940d, 941d, 942d) within or by the housing (940h, 941h, 942h) or mounted the electrical drive on or to the housing (940h, 941h, 942h), mounting the housing (940h, 941h, 942h) and the electrical drive (940d, 941d, 942d) on, to or in close proximity to the heated manifold (40), disposing a cooling device (940mc, 940mc1, 940mc2, 941mc, 942mc) between the heated manifold (40) and the housing (940h, 941h, 942h), and, adapting the cooling device (940mc, 940mc1, 940mc2, 941mc, 942mc) to substantially isolate or insulate at least the electrical drive (940d, 941d, 942d) from substantial communication with heat emanating or emitted from the heated manifold (40).

In another aspect of the invention there is provided an injection molding apparatus (10) comprising: a heated manifold (40) that receives injection fluid from an injection molding machine and distributes the injection fluid (18) to a flow channel that delivers the injection fluid to a gate (32, 34, 36) of a mold cavity (30), the injection molding apparatus (10) comprising:

an actuator (940, 941, 942) having a drive axis (Y) and a driver (940dr, 941dr, 942dr) interconnected to a valve pin and adapted to controllably drive the valve pin along a linear path of travel, the driver (940dr, 941dr, 942dr) receiving electrical energy or power from an electrical drive (940d, 941d, 942d), the electrical drive (940d, 941d, 942d) comprising an interface that receives and controllably distributes electrical energy or power in controllably varied amounts during the course of an injection cycle to the driver (940dr, 941dr, 942dr), the actuator having a housing (940h, 941h, 942h) that houses the driver (940dr, 941dr, 942dr), the electrical drive (940d, 941d, 942d) being housed within or by the housing (940h, 941h, 942h) or being mounted on or to the housing (940h, 941h, 942h), the apparatus including a cooling device (940mc, 940mc1, 940mc2, 941mc, 942mc), the electrical drive (940d, 941d, 942d) being mounted on or to the cooling device (940mc, 940mc1, 940mc2, 941mc, 942mc).

the cooling device (940mc, 940mc1, 940mc2, 941mc, 942mc) being mounted on or to the heated manifold (40) and adapted to substantially isolate or insulate at least the electrical drive (940d, 941d, 942d) from substantial communication with heat emanating or emitted from the heated manifold (40).

In another aspect of the invention there is provided an injection molding apparatus (10) comprising an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (940, 941, 942) comprised of a rotor (940r, 941r, 942r) having a drive axis (Y) and a driver (940dr, 941dr, 942dr) interconnected to the rotor (940r, 941r, 942r) adapted to controllably drive the rotor rotatably around the drive axis Y, the driver (940dr, 941dr, 942dr) receiving electrical energy or power from an electrical drive (940d, 941d, 942d), the electrical drive (940d, 941d, 942d) comprising an interface that receives and controllably distributes electrical energy or power in controllably varied amounts during the course of an injection cycle to the driver (940dr, 941dr, 942dr), the actuator having a housing (940h, 941h, 942h) that houses the rotor (940r, 941r, 942r) and the driver (940dr, 941dr, 942dr), the housing being adapted to support the rotor (940r, 941r, 942r), the electrical drive (940d, 941d, 942d) being housed within or by the housing (940h, 941h, 942h) or being mounted on or to the housing (940h, 941h, 942h), the housing (940*h*, 941*h*, 942*h*) and the electrical drive (940*d*, 941*d*, 942*d*) being mounted on, to or in close proximity to the heated manifold (40), the apparatus including a cooling device (940*mc*, 940*mc*1, 940*mc*2, 941*mc*, 942*mc*) disposed between the heated manifold (40) and the housing (940*h*, 941*h*, 942*h*), the cooling device (940*mc*, 940*mc*1, 940*mc*2, 941*mc*, 942*mc*) being adapted to substantially isolate or insulate at least the electrical drive (940*d*, 941*d*, 942*d*) from substantial communication with heat emanating or emitted from the heated manifold (40).

The cooling device ((940*mc*, 940*mc*1, 940*mc*2, 941*mc*, 942*mc*) is typically adapted to substantially isolate or insulate the housing (940*h*, 941*h*, 942*h*) from substantial communication with heat emanating or emitted from the heated manifold (40).

The electrical drive (940*d*, 941*d*, 942*d*) is typically mounted on or to the cooling device (940*mc*, 940*mc*1, 940*mc*2, 941*mc*, 942*mc*).

The electrical drive (940*d*, 941*d*, 942*d*) can be housed within or by the actuator housing (940*h*, 941*h*, 942*h*) or physically mounted on or to the housing (940*h*, 941*h*, 942*h*) in thermally conductive communication or contact therewith.

The housing is typically mounted on or to the cooling device (940*mc*, 940*mc*1, 940*mc*2, 941*mc*, 942*mc*).

The housing (940*h*, 941*h*, 942*h*) can be mounted in direct heat communicative contact with the cooling device (940*mc*, 940*mc*1, 940*mc*2, 941*mc*, 942*mc*).

The housing (940*h*, 941*h*, 942*h*) can be mounted on or to the cooling device (940*mc*, 940*mc*1, 940*mc*2, 941*mc*, 942*mc*) via a mount (60) comprised of a heat insulative material.

In such an embodiment the mount (60) can be adapted to form a gap (G') between the cooling device (940*mc*, 940*mc*1, 940*mc*2, 941*mc*, 942*mc*) and one or the other or both of the housing (940*h*) and the electric drive (940*d*).

In such an embodiment the mount (60) can be adapted to form a gap (G) between the cooling device (940*mc*, 940*mc*1, 940*mc*2, 941*mc*, 942*mc*) and the manifold (40).

The housing (940*h*, 941*h*, 942*h*) can be interconnected to a rotary to linear converter device (940*l*, 9411, 9421) in an arrangement wherein the valve pin (1040, 1041, 1042) is driven along a linear axis (X) that is non coaxial relative to a drive axis (Y) of the actuator, the rotary to linear converter device being mounted to the cooling device in direct heat communicative contact therewith.

The housing (940*h*, 941*h*, 942*h*) can be interconnected to a rotary to linear converter device (940*l*, 9411, 9421) in an arrangement wherein the valve pin (1040, 1041, 1042) is driven along a linear axis (X) that is non coaxial relative to a drive axis (Y) of the actuator, the rotary to linear converter device being mounted on or to the cooling device (940*mc*, 940*mc*1, 940*mc*2, 941*mc*, 942*mc*) via a mount (60) comprised of a heat insulative material.

In such an embodiment the mount (60) can be adapted to form a gap (G') between the cooling device and one or the other or both of the linear converter device (940*l*), the actuator housing (940*h*) and the electric (940*d*).

In such an embodiment the mount (60) can be adapted to form a gap (G) between the cooling device and the manifold (40).

The housing (940*h*, 941*h*, 942*h*) can be interconnected to a rotational speed control device (46) that is interconnected to a rotary to linear converter device (940*l*, 9411, 9421) in an arrangement wherein the valve pin (1040, 1041, 1042) is driven along a linear axis (X) that is non coaxial relative to a drive axis (Y) of the actuator, the rotary to linear converter device being mounted in direct heat communicative contact with the cooling device (940*mc*, 940*mc*1, 940*mc*2, 941*mc*, 942*mc*).

The housing (940*h*, 941*h*, 942*h*) can be interconnected to a rotational speed control device (46) that is interconnected to a rotary to linear converter device (940*l*, 9411, 9421) in an arrangement wherein the valve pin (1040, 1041, 1042) is driven along a linear axis (X) that is non coaxial relative to a drive axis (Y) of the actuator, the rotary to linear converter device being mounted on or to the cooling device (940*mc*, 940*mc*1, 940*mc*2, 941*mc*, 942*mc*) via a mount (60) comprised of a heat insulative material.

In such an embodiment the mount (60) can be adapted to form a gap (G') between the cooling device and one or the other or both of the linear converter device (940*l*, 940*lh*), the actuator housing (940*h*), the rotational speed control device (46) and the electric drive (940*d*).

In such an embodiment the mount (60) can be adapted to form a gap (G) between the cooling device (940*mc*) and the manifold (40).

The cooling device (940*mc*, 941*mc*, 942*mc*) can be mounted in direct or indirect thermal contact or communication with the heated manifold (40).

The cooling device can comprise a body of highly heat conductive material that can contain one or more channels through which a flow of a selected cool or cooling fluid is routed.

The cooling device can comprises a body of selected heat conductive material that can be actively cooled via application through, on or to the body of selected material cool or cooling fluid.

The cooling device can comprise a Peltier effect device.

The electric actuator (940, 941, 942) typically comprises a driver (940*dr*, 941*dr*, 942*dr*) comprised of one or more of a stator and armature that are interconnected to a rotatably mounted rotor or shaft (940*r*, 941*r*, 942*r*) such that when the drivers (940*dr*, 941*dr*, 942*dr*) rotate on application and receipt of electrical energy or power, the shafts (940*r*, 941*r*, 942*r*) are rotated.

The rotor (940*r*, 941*r*, 942*r*) can have a drive axis (Y), the driver (940*dr*, 941*dr*, 942*dr*) being interconnected to the rotor (940*r*, 941*r*, 942*r*) and adapted to controllably drive the rotor (940*r*, 941*r*, 942*r*) rotatably around the drive axis Y.

The driver (940*dr*, 941*dr*, 942*dr*) typically receives electrical energy or power from the electrical drive (940*d*, 941*d*, 942*d*).

The electrical drive (940*d*, 941*d*, 942*d*) typically receives electrical energy or power from a power source (PS) and controllably distributes the received electrical energy or power in controllably varied amounts during the course of an injection cycle to the drivers (940*dr*, 941*dr*, 942*dr*).

The housing (940*h*, 941*h*, 942*h*) typically houses the rotor (940*r*, 941*r*, 942*r*) and the driver (940*dr*, 941*dr*, 942*dr*) and is adapted to support the rotor (940*r*, 941*r*, 942*r*) such that the rotor is drivably rotatable (940*rt*, 941*rt*, 942*rt*).

The cooling device (940*mc*, 941*mc*, 942*mc*) can be mounted on or to an intermediate mount (940*m*) comprised of a metal material, the intermediate mount (940*m*) being mounted in direct metal to metal contact or communication with the heated manifold (40).

In such an embodiment, the cooling device (940*mc*, 940*mc*1, 940*mc*2, 941*mc*, 942*mc*) can be disposed between the heated manifold (40) and the rotary to linear converter device (940*l*, 9411, 9421), the cooling device (940*mc*, 940*mc*1, 940*mc*2, 941*mc*, 942*mc*) being adapted to substantially isolate or insulate the linear converter device (940*l*, 941*l*, 9421) from substantial communication of heat emanating or emitted from the heated manifold (40).

The electrical drive (940*d*, 941*d*, 942*d*) is typically housed within or by the housing (940*h*, 941*h*, 942*h*) or is physically mounted on or to the housing (940*h*, 941*h*, 942*h*) in thermally conductive communication or contact therewith.

The electrical drive (940*d*, 941*d*, 942*d*) typically includes a pulse-width modulator (PWM) that converts received electrical energy or power into sinusoidal voltage waveforms, each sinusoidal voltage waveform being adapted to drive a corresponding phase-coil of the actuator driver (940*dr*, 941*dr*, 942*dr*).

The pulse-width modulator (PWM) typically comprises an inverter or a comparator.

The pulse width modulator (PWM) typically comprises a three-phase inverter that converts electrical energy or power received from the interface into three sinusoidal voltage waveforms, each one of the three sinusoidal voltage waveforms being adapted to drive a corresponding one of three phase-coils of the actuator driver.

The electrical energy or power received at or by the pulse width modulator (PWM) typically comprises a DC bus voltage.

The interface is typically adapted to receive one or more control signals from a controller (16) of the injection molding apparatus (10) and to convert electrical energy or power received the power source (PS) into sinusoidal waveforms based on the one or more control signals.

The interface is typically comprised of the pulse width modulator (PWM) which converts electrical energy or power received from the power source into sinusoidal waveforms based on the one or more control signals.

The one or more control signals received by the interface can contain control information causing the pulse width modulator (PWM) to convert the received electrical energy or power into sinusoidal waveforms adapted to drive the corresponding phase-coils of the actuator driver to adjust one or more of a position, a velocity or torque of the actuator rotor (940*r*, 941*r*, 942*r*).

The one or more control signals can comprise analog electrical signals received at the electrical drive from the controller (16).

The electrical drive (940*d*, 941*d*, 942*d*) typically comprises one or the other or both of a digital signal receiving (16*r*) and transmitting (16*s*) device, wherein: the digital signal receiving and transmitting device is adapted to receive (16*r*) and transmit (16*s*) digital signals between the electrical drive (940*d*, 941*d*, 942*d*) and the controller (16) of the injection molding apparatus (10); and wherein, the digital signals include the one or more control signals, where the one or more control signals are digital control signals received from the controller.

The digital control signals can include one or more of differential position commands, differential current commands, and differential velocity commands.

The digital signal receiving and transmitting device (16*r*, 16*s*) can be adapted to receive digital signals from the actuator, wherein the digital signals received from the actuator include one or more feedback signals corresponding to operation of one or more of the actuator and the actuator rotor.

The pulse width modulator (PWM) can convert the electrical energy or power received from the interface into sinusoidal waveforms adapted to drive the corresponding phase-coils of the actuator driver based at least in part on the one or more feedback signals.

The one or more feedback signals received from the actuator typically include one or more of an incremental feedback signal and an absolute feedback signal.

The apparatus can include a passive cooler (10, 14, 100, 502, 507, 2000, 2002) having a first thermally conductive surface (502*b*, 103, 104*i*, 2000*is*, 2002*us*) engaged with a housing surface (121*s*, 41, 43, 140, 940*ls*) of the actuator housing (43, 45, 940*h*, 941*h*, 942*h*) and a second thermally conductive surface (11, 130, 502*a*, 2000*ms*) engaged with a plate surface (21, 80*a*, 80*ms*, 140) of a cool or cooled clamp plate (80, 507) in an arrangement such that heat is conducted from the actuator housing to the cool or cooled clamp plate.

The passive cooler is typically comprised of a selected highly heat conductive material.

The apparatus can further comprise a signal converter (1500) for converting signals generated by an injection molding apparatus (10) that is comprised of an injection molding machine (IMM) having a drivably rotatable barrel screw (BS) that generates an injection fluid (18), a heated manifold (40) that receives an injection fluid (18) from the injection molding machine (IMM) and distributes the injection fluid (18) to one or more gates (32, 34, 36), a mold (300) having a cavity (30) communicating with the gates to receive the injection fluid (18), wherein the injection molding machine (IMM) includes a machine controller (MC) or a control unit (HPU) that generates one or more directional control valve compatible signals (VPS), wherein the direction control valve compatible signals (VPS) are compatible for use by a signal receptor, interface or driver of a standard fluid directional control valve (12) to instruct the fluid directional control valve (12) to move to a position that routes a source of drive fluid to flow in a direction that drives an interconnected fluid drivable actuator (940*f*, 941*f*, 942*f*) to move in a direction that operates to begin an injection cycle and to move in a direction that operates to end an injection cycle, wherein the signal converter (1500) is interconnected to the machine controller (MC) or control unit (HPU), the signal converter (1500) receiving and converting the directional control valve compatible signals (VPS) to a command signal (MOPCS, PDCVS) that is compatible with a signal receptor or interface of an electrically powered actuator (940*e*, 941*e*, 942*e*) or a signal receptor or interface of a proportional directional control valve (V, V1, V2) that drives a fluid driven actuator (940*p*, 941*p*, 942*p*), wherein the signal converter (1500) includes a processor that converts the command signals (MOPCS, PDCVS) into a form, frequency, power or format that is usable by the signal receptor or interface of the electrically powered actuator (940*e*, 941*e*, 942*e*) or by the signal receptor or interface of the proportional directional control valve (V, V1, V2) to respectively cause the electrically powered actuator (940*e*, 941*e*, 942*e*) or the proportional directional control valve (V, V1, V2) to be driven in a direction that operates to either begin an injection cycle or to end an injection cycle.

The directional control valve compatible signals (VPS) can comprise a voltage signal of predetermined voltage or magnitude indicative of a predetermined rotational position of the barrel screw (BS) of the injection molding machine (IMM) that generates pressurized injection fluid (18) within the apparatus.

The apparatus (10) can further comprise one or more sensors (950, 951, 952, SN, SC, SPSR, BPSR) that detect and generate one or more sensor signals indicative of one or more of rotational or linear position of an actuator (940*e*,

941e, 942e, 940p, 941p, 942p) or its associated valve pin (1040, 1041, 1042), pressure or temperature of the injection fluid (18) within a fluid channel (19) of the manifold (40) or within a nozzle channel (42, 44, 46) or within the cavity (30) of the mold (300) or within a barrel of the injection molding machine (IMM), the apparatus (10) including an actuator controller (16) that receives and uses the one or more sensor signals in a program that:

instructs the actuator (940e, 941e, 942e, 940p, 941p, 942p) or its associated valve pin (1040, 1041, 1042) to travel during the course of the injection cycle to positions that correspond to a predetermined profile of injection fluid pressures, linear or rotational pin positions, linear actuator or valve pin positions, barrel screw positions, barrel pressures or actuator drive fluid pressures or that, instructs the actuator (940e, 941e, 942e, 940p, 941p, 942p) or its associated valve pin (1040, 1041, 1042) such that the valve pin is withdrawn from a closed gate position upstream at a reduced velocity over a selected path of upstream travel, or that, instructs the actuator (940e, 941e, 942e, 940p, 941p, 942p) or its associated valve pin (1040, 1041, 1042) to travel such that the valve pin is driven downstream at a reduced velocity over a selected path of travel where a distal tip end of the pin travel from upstream of the gate to a gate closed position, or that, instructs the actuator (940e, 941e, 942e, 940p, 941p, 942p) or its associated valve pin (1040, 1041, 1042) to travel such that the valve pin is driven upstream or downstream to an intermediate position between a gate closed position and a fully upstream position where the valve pin is maintained in the intermediate position for a selected period of time during the course of the injection cycle wherein, in the intermediate position, the distal tip end of the valve pin restricts flow of injection of the injection to less than a maximum flow.

In another aspect of the invention there is provided a method of performing an injection molding cycle comprising operating the apparatuses described above.

In another aspect of the invention there is provided an injection molding apparatus (10) comprising an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (940, 941, 942) comprised of a rotor (940r, 941r, 942r) having a drive axis (Y) and a driver (940dr, 941dr, 942dr) interconnected to the rotor (940r, 941r, 942r) adapted to controllably drive the rotor rotatably around the drive axis Y, the driver (940dr, 941dr, 942dr) receiving electrical energy or power from an electrical drive (940d, 941d, 942d), the electrical drive (940d, 941d, 942d) comprising a pulse-width modulator (PWM) that converts received electrical energy or power into sinusoidal voltage waveforms, each sinusoidal voltage waveform being adapted to drive a corresponding phase-coil of the actuator driver (940dr, 941dr, 942dr), the actuator having a housing (940h, 941h, 942h) that houses the rotor (940r, 941r, 942r) and the driver (940dr, 941dr, 942dr), the housing being adapted to support the rotor (940r, 941r, 942r), the electrical drive (940d, 941d, 942d) being housed within or by the housing (940h, 941h, 942h) or being mounted on or to the housing (940h, 941h, 942h), the housing (940h, 941h, 942h) and the electrical drive (940d, 941d, 942d) being mounted on, to or in close proximity to the heated manifold (40), the apparatus including a cooling device (940mc, 940mc1, 940mc2, 941mc, 942mc) disposed between the heated manifold (40) and the housing (940h, 941h, 942h), the cooling device (940mc, 940mc1, 940mc2, 941mc, 942mc) being adapted to substantially isolate or insulate at least the electrical drive (940d, 941d, 942d) from substantial communication with heat emanating or emitted from the heated manifold (40).

In another aspect of the invention there is provided a method of performing an injection molding cycle comprising operating the apparatus described above.

In another aspect of the invention there is provided an injection molding apparatus (10) comprising an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (940, 941, 942) comprised of a rotor (940r, 941r, 942r) having a drive axis (Y) and a driver (940dr, 941dr, 942dr) interconnected to the rotor (940r, 941r, 942r) adapted to controllably drive the rotor rotatably around the drive axis Y, the driver (940dr, 941dr, 942dr) receiving electrical energy or power from an electrical drive (940d, 941d, 942d), the electrical drive (940d, 941d, 942d) comprising an interface that receives and controllably distributes electrical energy or power in controllably varied amounts during the course of an injection cycle to the driver (940dr, 941dr, 942dr), the actuator having a housing (940h, 941h, 942h) that houses the rotor (940r, 941r, 942r) and the driver (940dr, 941dr, 942dr), the housing being adapted to support the rotor (940r, 941r, 942r), the electrical drive (940d, 941d, 942d) being housed within or by the housing (940h, 941h, 942h) or being mounted on or to the housing (940h, 941h, 942h), the apparatus including a cooling device (940mc, 940mc1, 940mc2, 941mc, 942mc), the electrical drive (940d, 941d, 942d) being mounted on or to the cooling device (940mc, 940mc1, 940mc2, 941mc, 942mc).

the cooling device (940mc, 940mc1, 940mc2, 941mc, 942mc) being mounted on or to the heated manifold (40) and adapted to substantially isolate or insulate at least the electrical drive (940d, 941d, 942d) from substantial communication with heat emanating or emitted from the heated manifold (40).

In another aspect of the invention there is provided a method of performing an injection molding cycle comprising operating the apparatus described above.

In another aspect of the invention there is provided an injection molding apparatus (10) comprising an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (940, 941, 942) comprised of a rotor (940r, 941r, 942r) having a drive axis (Y) and a driver (940dr, 941dr, 942dr) interconnected to the rotor (940r, 941r, 942r) adapted to controllably drive the rotor rotatably around the drive axis Y, the driver (940dr, 941dr,

942*dr*) receiving electrical energy or power from an electrical drive (940*d*, 941*d*, 942*d*), the electrical drive (940*d*, 941*d*, 942*d*) comprising an interface that receives and controllably distributes electrical energy or power in controllably varied amounts during the course of an injection cycle to the driver (940*dr*, 941*dr*, 942*dr*), the actuator having a housing (940*h*, 941*h*, 942*h*) that houses the rotor (940*r*, 941*r*, 942*r*) and the driver (940*dr*, 941*dr*, 942*dr*), the housing being adapted to support the rotor (940*r*, 941*r*, 942*r*), the electrical drive (940*d*, 941*d*, 942*d*) being housed within or by the housing (940*h*, 941*h*, 942*h*) or being mounted on or to the housing (940*h*, 941*h*, 942*h*), the housing (940*h*, 941*h*, 942*h*) and the electrical drive (940*d*, 941*d*, 942*d*) being mounted or disposed in a location spaced or remote from the heated manifold (40) that substantially isolates or insulates at least the electrical drive (940*d*, 941*d*, 942*d*) from substantial communication with heat emanating or emitted from the heated manifold (40).

In another aspect of the invention there is provided a method of performing an injection molding cycle comprising operating the apparatus described above.

In each of the apparatuses described herein, the apparatus preferably further comprises a controller (16) mounted or disposed in a location remote from the electric drive (940*d*, 941*d*, 942*d*) and the heated manifold (40), the electric drive and the controller (16) being interconnected and adapted to exchange signals that control operation of the actuator (940, 941, 942).

In each of the embodiments described herein where a gap (G, G') is formed via use of a mount (60), the gap (G, G') typically serves as a heat insulator or heat insulative gap (G, G') where air that is disposed in the gap (G, G') separating the surface of the mount from heat conductive contact with a surface of the manifold (40) or cooling device (940*mc*) is non heat conductive relative to metal materials and thus the air typically functions as a heat insulator.

BRIEF DESCRIPTION OF THE DRAWINGS

The accompanying drawings contain numbering of components and devices that correspond to the numbering appearing in the following Summary.

FIG. 1B is a view similar to FIG. 1A showing the actuator housing (941*h*) and electric drive being mounted in a spaced relationship on or to the cooling device via mounts (60) that are typically comprised of a heat insulative material such as titanium, bismuth, stainless steel, lead, chromium or the like.

FIG. 2BB is a closeup sectional view of the standoffs or mounts by which the rotary to linear converter 940*l* and its housing 940*lh* (together with the speed reducing device 46 and actuator 940 to which the converter 940*l* is subassembled) is mounted to the heated manifold (40).

FIG. 2I is a sectional view of the FIG. 2H apparatus taken along lines 2I-2I.

FIG. 3A is a schematic side sectional view of the armature and drive rod components of a linear drive proportional solenoid that can be substituted for the assembly of rotary motion enabling components of the rotary electric actuators described herein to enable direct linear actuation movement of the drive rod by the armature when energized with electricity.

FIG. 3B is a schematic side sectional view of the armature and drive rod components of a linear motor that can be substituted for the assembly of rotary motion enabling components of the rotary electric actuators described herein to enable direct linear actuation movement of the drive rod by the armature when energized with electricity.

FIG. 13A is a side partial sectional view of another embodiment having an actuator 10 with the motor rotor 940r, 940dr coaxial with the valve pin axis X, the actuator housing being mounted to, on or in close physical proximity to the heated manifold (40) via mounting of the actuator (940) to a cooling device (940mc, 940mc1, 940mc2, 941mc, 942mc) with the cooling device being disposed between the heated manifold (40) and the actuator housing (940h, 941h, 942h) and the electric drive (940d), the cooling device being adapted to substantially isolate or insulate at least the electrical drive (940d, 941d, 942d) from substantial communication with heat emanating or emitted from the heated manifold (40), the actuator being further mounted in a passive cooling engagement and arrangement with the top clamp plate 20 via a highly heat conductive metal device 502 having an engagement surface 502b for engagement with an outside surface 12ls of the actuator 12 and another surface 502a for engagement with a surface 80a of the cool top clamp plate 80. The actuator of this embodiment is further mounted in a spaced relationship to the cooling device via mounts 60 comprised of a heat insulative material such as titanium, bismuth, stainless steel, lead, chromium or the like.

FIG. 14A is a top front perspective view of another embodiment having an actuator with the motor rotor 940r, 940dr coaxial with the valve pin axis X, the actuator housing being mounted to, on or in close physical proximity to the heated manifold (40) via mounting of the actuator (940) to a cooling device (940mc, 940mc1, 940mc2, 941mc, 942mc) with the cooling device being disposed between the heated manifold (40) and the actuator housing (940h, 941h, 942h) and the electric drive (940d), the cooling device being adapted to substantially isolate or insulate at least the electrical drive (940d, 941d, 942d) from substantial communication with heat emanating or emitted from the heated manifold (40), the actuator being further mounted in a passive cooling engagement and arrangement with the top clamp plate 20 via metal device 500 having heat conductive members 502, 507 having an engagement surfaces 502b, 507u for heat conductive communication and engagement with an outside surface 12ls of the actuator 12 and another surface 502a, 507a for engagement with a surface 80a of the cool top clamp plate 80. The actuator of this embodiment is further mounted in a spaced relationship to the cooling device 940mc via mounts 60 comprised of a heat insulative material such as titanium, bismuth, stainless steel, lead, chromium or the like.

FIGS. 22A-22B show tapered end valve pin positions at various times and positions between a starting closed position as in FIG. 22A and various upstream opened positions, RP representing a selectable path length over which the velocity of withdrawal of the pin upstream from the gate closed position to an open position is reduced relative to the velocity of upstream movement that the valve pin would normally have over the uncontrolled velocity path FOV when pin velocity is at its maximum;

FIGS. 23A-23B show an apparatus having a valve pin that has a cylindrically configured tip end, the tips ends of the pins being positioned at various times and positions between a starting closed position as in FIG. 23A and various upstream opened positions, RP wherein RP represents a path of selectable length over which the velocity of withdrawal of the pin upstream from the gate closed position to an open position is reduced relative to the velocity of upstream movement that the valve pin would normally have over the uncontrolled velocity path FOV when the pin velocity is at its maximum.

DETAILED DESCRIPTION OF THE INVENTION

The embodiments of FIGS. 1A through 14 utilize an electric actuator housing (940h, 941h, 941h) that is mounted on or to a cooling device (940mc, 940mc1, 940mc2, 941mc, 942mc) that comprises an actively cooled device comprised of a body of highly heat conductive material such as steel, copper or the like. The highly heat conductive body of the cooling device typically contains fluid flow channels (33) through which a cool or cooled fluid such as water, oil, air, brine (260) is routed or pumped to proactively cool the thermally conductive body of the cooling device (940mc, 940mc1, 940mc2, 941mc, 942mc). The cooling device can be alternatively actively cooled by routing or applying a cool or cooled substance (such as air, gas or liquid) over the exterior surface of the cooling mechanism. The cooling device can also comprise a thermoelectric cooler or solid-state Peltier effect device that is typically comprised of an array of alternating n- and p-type semiconductor plates that with application of electric current exploit the Peltier effect. Solid solutions of bismuth telluride, antimony telluride, and bismuth selenide are preferred materials for Peltier effect devices because they provide the best performance from 180 to 400 K and can be made both n-type and p-type.

Figure 15:
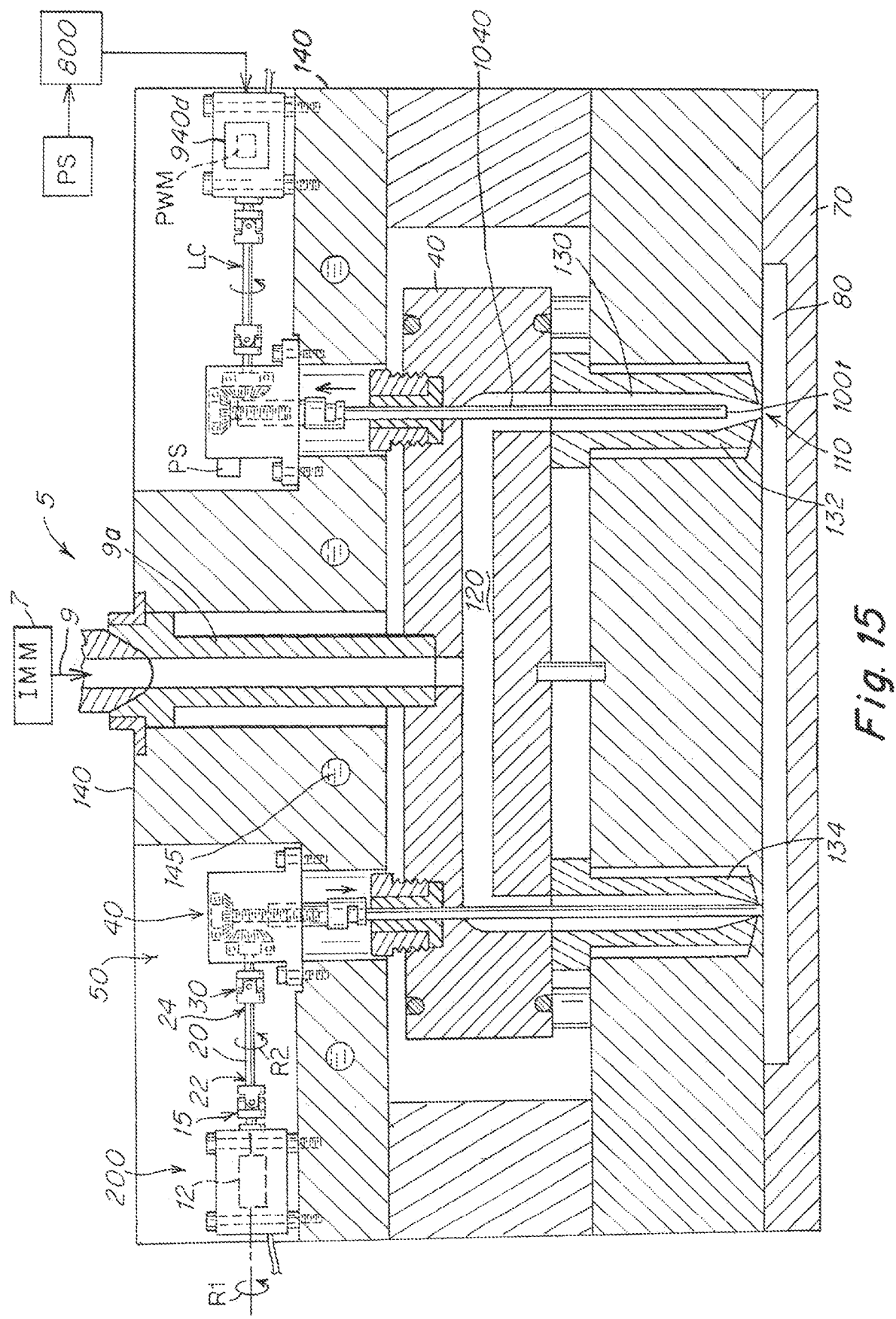
FIG. 15 is a side sectional schematic view of an injection molding system showing electric actuators with electric drive 940d mounted on or to the actuator housing, the actuators and electric drive 940d being mounted in an extended spaced apart relationship relative to the heated manifold such that the actuator and electric drive 940d are isolated or insulated from significant heat communication with the heated manifold 40. In the embodiment shown the actuator and electric drive are mounted to a cool or cooled top clamp plate and are interconnected to a rotary to linear drive converter device, the linear drive converter device also being mounted to the top clamp plate.
Figure 16:
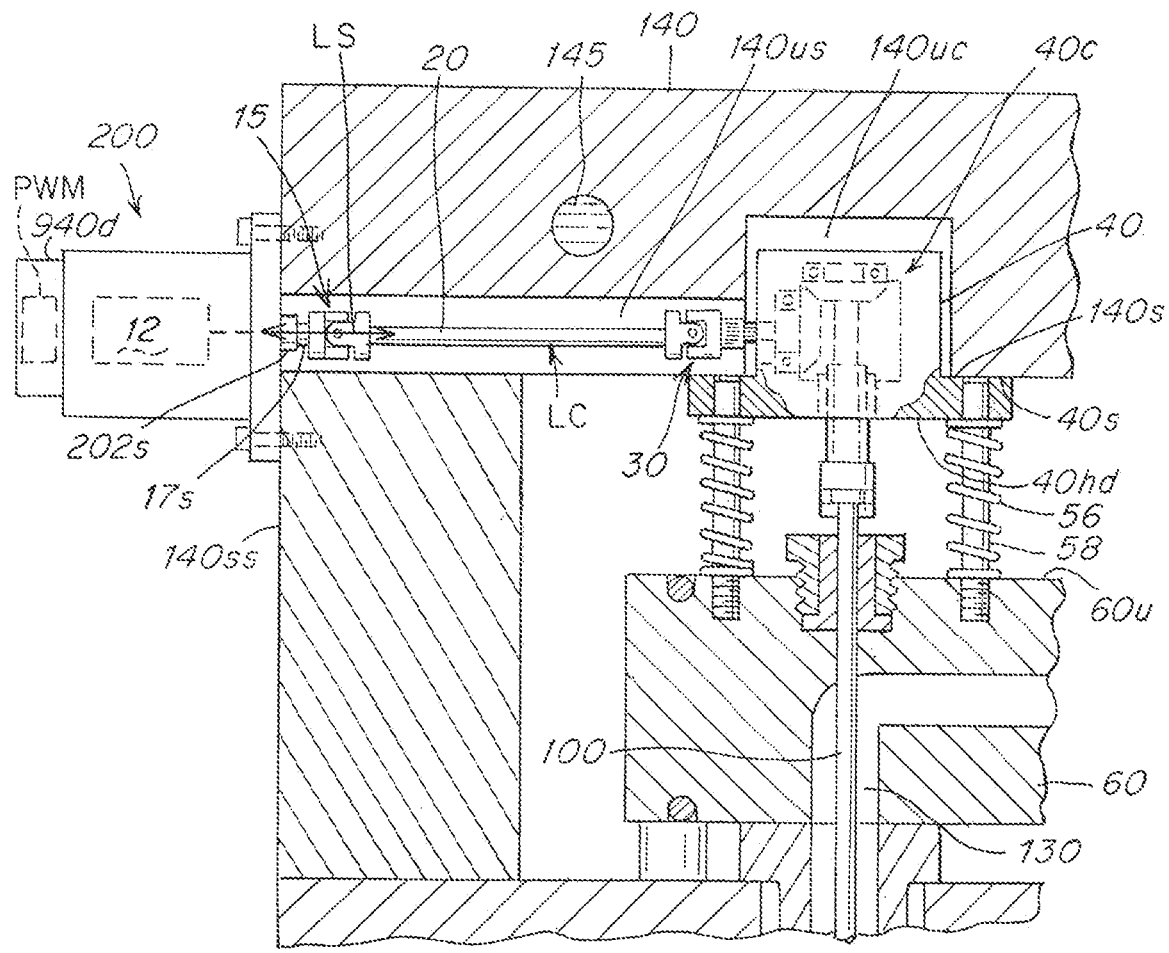
FIG. 16 is a side sectional schematic view of another embodiment of an injection molding system having electric actuators with electric drive 940d mounted on or to the actuator housing, the actuators and electric drive 940d being mounted in an extended spaced apart relationship relative to the heated manifold such that the actuator and electric drive 940d are isolated or insulated from substantial or significant heat communication with the heated manifold 40. In the embodiment shown the actuator and electric drive are mounted to a cool or cooled top clamp plate 140 and are interconnected to a rotary to linear drive converter device, the linear drive converter device also being mounted to the top clamp plate.

In an alternative embodiments such as disclosed in FIGS. 15, 16, the electric drive (940, 941d, 942d) can be insulated or isolated from substantial communication of heat generated by or emanating from the heated manifold (40) by disposing or mounting the electric drive together with the electric actuator (940, 941, 942) on which the electric drive is mounted or housed in location that is spaced apart or remote from the heated manifold (40) such that heat generated by the heated manifold (40) cannot substantially transmit to the electric drive (940d, 941d, 942d).

Figure 1:
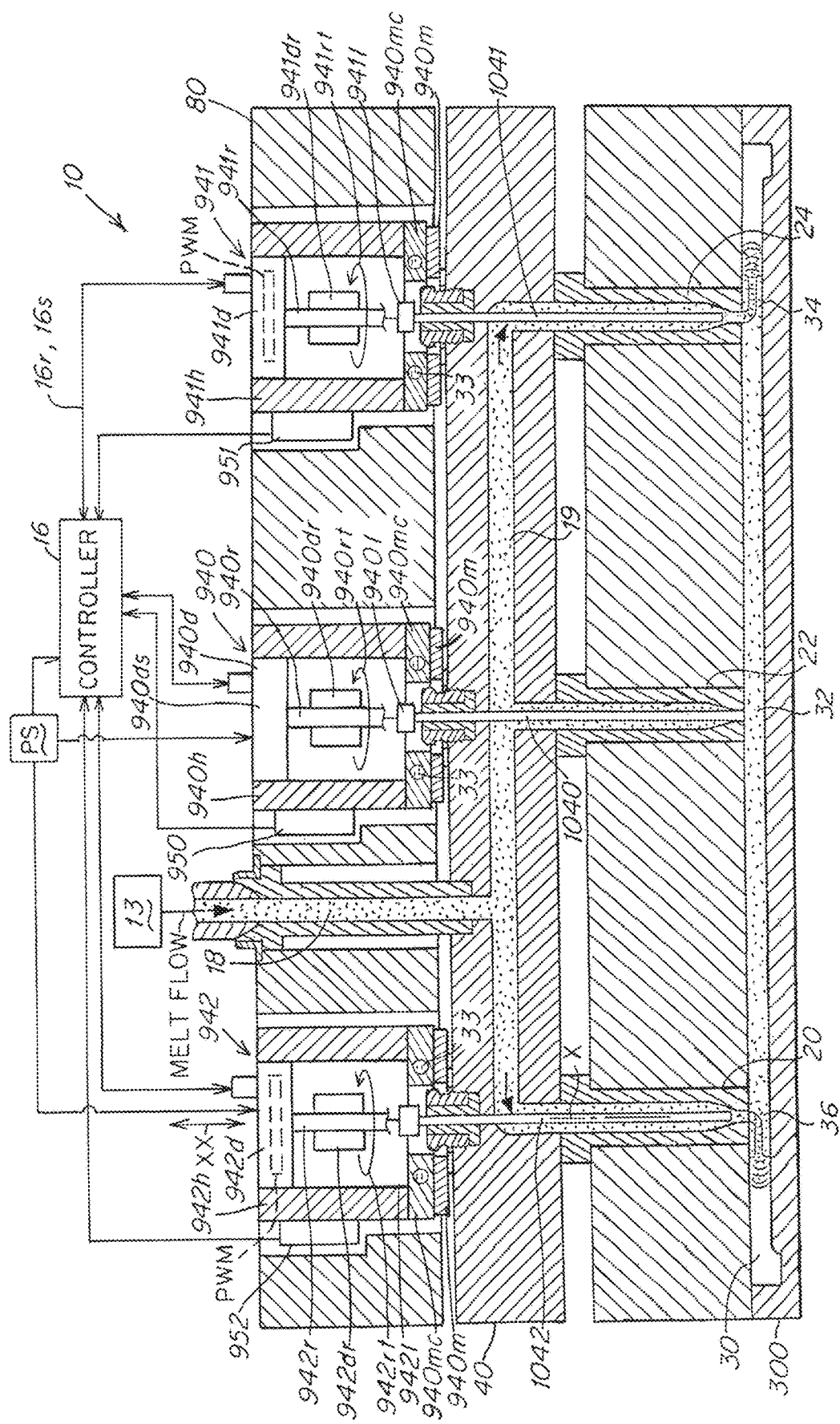
FIG. 1 is a side schematic view of an injection molding apparatus having a center valve with associated actuator (940) and two downstream valves with associated actuators (941, 942) that are opened to a mold cavity in a predetermined sequence after the center valve is first opened, the actuators (940, 941, 942) each comprising an electric motor having an electric drive (940*d*, 941*d*, 942*d*) that is incorporated into or physically onto the housing (940*h*, 941*h*, 942*h*) of the actuator such that the electric drive (940*d*, 941*d*, 942*d*) is in direct thermal communication with the housing (940*h*, 941*h*, 942*h*) of the actuator, the housings of each of the actuators (940, 941, 942) being mounted on or to or in close physical proximity to a heated manifold with a cooling device (940*mc*, 940*mc*1, 940*mc*2, 941*mc*, 942*mc*) being disposed between the heated manifold (40) and the housing (940*h*, 941*h*, 942*h*) that is adapted to substantially isolate or insulate at least the electrical drive (940*d*, 941*d*, 942*d*) from substantial communication with heat emanating or emitted from the heated manifold (40).

As shown in FIG. 1 a typical injection molding apparatus has a center valve with an associated actuator (940) and two downstream valves with associated actuators (941, 942) that are opened to a mold cavity 30 in a predetermined sequence as described herein after the center valve is first opened, the actuators (940, 941, 942) each comprising an electric motor having an electric drive (940d, 941d, 942d).

Figure 1A:
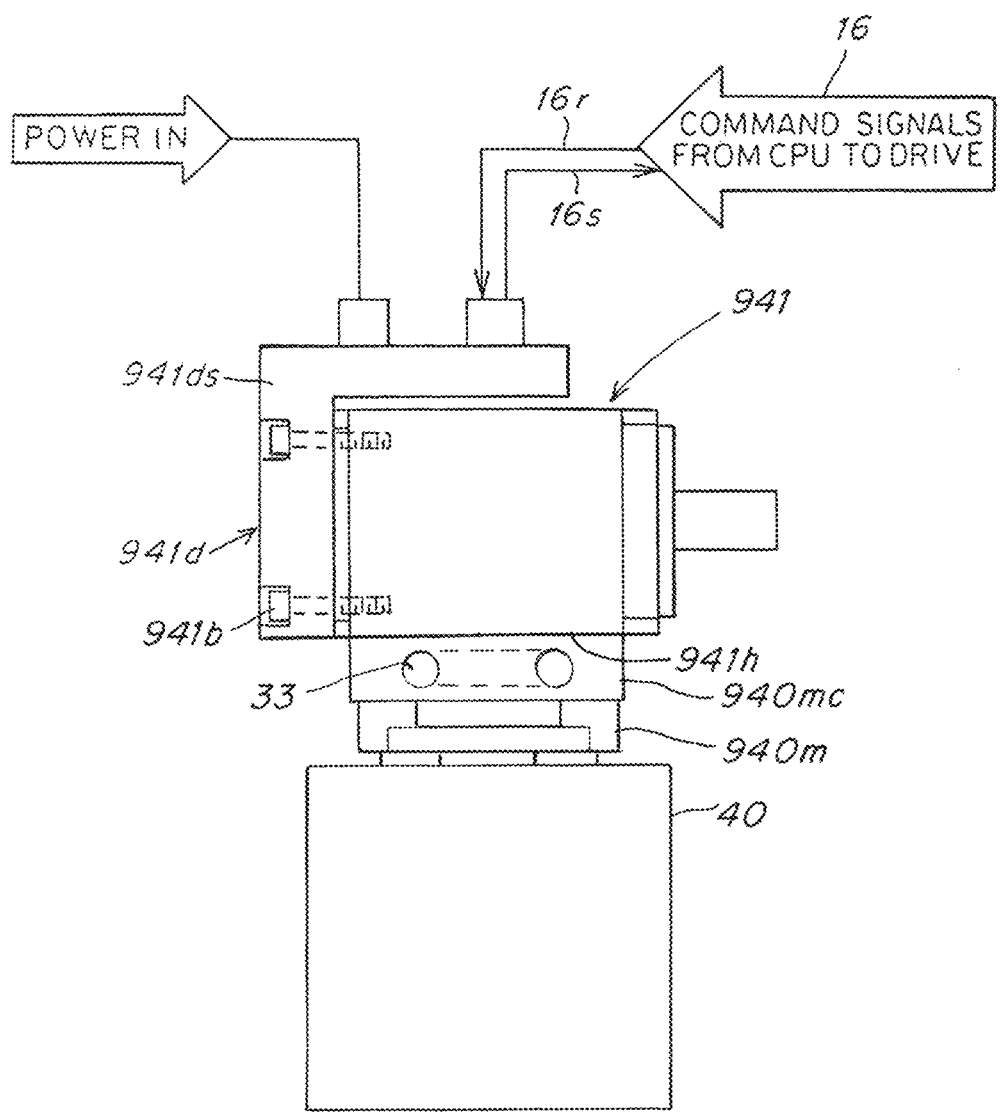
FIG. 1A is a side schematic view of an electric actuator (941) comprised of a housing (941*h*) and an electric drive (941*d*) that is readily attachable to and detachable from the housing (941*h*) of the actuator via a conventional attachment and detachment mechanism such as bolts (941*b*) with a cooling device (940*mc*, 940*mc*1, 940*mc*2, 941*mc*, 942*mc*) being disposed between the heated manifold (40) and the housing (940*h*, 941*h*, 942*h*) and the electric drive (940*d*), the cooling device being adapted to substantially isolate or insulate at least the electrical drive (940*d*, 941*d*, 942*d*) from substantial communication with heat emanating or emitted from the heated manifold (40).

The electric drive (940d, 941d, 942d) can be housed within the same housing (940h, 941h, 942h) as the driver components of the electric actuator (940, 941, 941), or the electric drive (940d, 941d, 942d) can be housed within a physically separate thermally conductive housing (941ds) such as shown in FIG. 1A that is readily attachable to and detachable from the housing (941h) that houses the driver components (stator, armature) and rotor component of the electric actuator via conventional device such as bolts, screws, clamps, magnets or the like (941b). As shown in FIG. 1A, the thermally conductive housing (941ds) mounted on the actuator housing is disposed in substantial thermally conductive communication or contact with the actuator housing (941h) which is in turn mounted via the actively cooled device (940mc) and the mount device (940mm) to the heated manifold (40). As shown the cooling device (940mc) with fluid receiving and cooling channels (33) is disposed between the electric drive (941d), the housing (941h) and the heated manifold (40) in an arrangement such that at least the electric drive (941d) and typically also the housing (941h) are isolated or insulated from substantial communication with heat emanating or emitted from the heated manifold (40).

In all embodiments of FIGS. 1 through 16, the electric drive (940d, 941d, 942d) is mounted on, to or within the actuator housing (940h, 941h, 942h) in some manner such that the drive components such as a Pulse Width Modulator (PWM) and associated electrical components are isolated or insulated from substantial communication with heat emanating or emitted from the heated manifold (40).

Figure 21A:
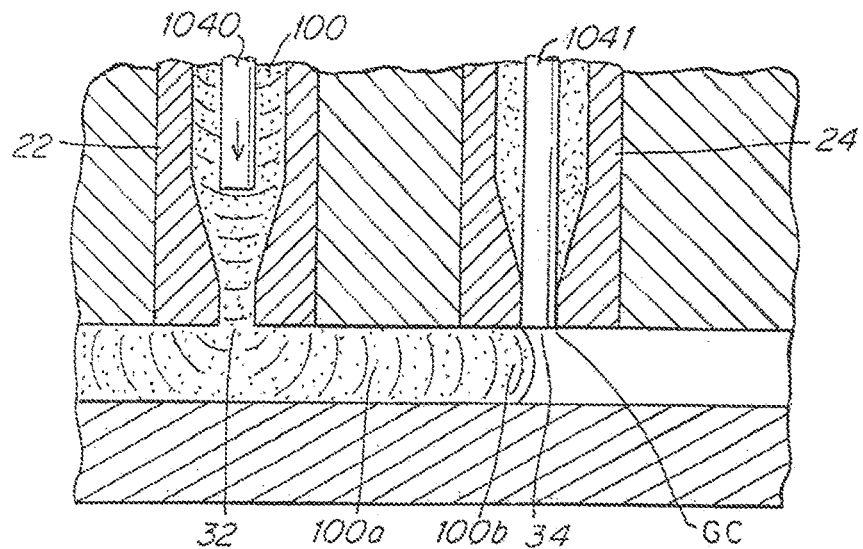
Figure 21B:
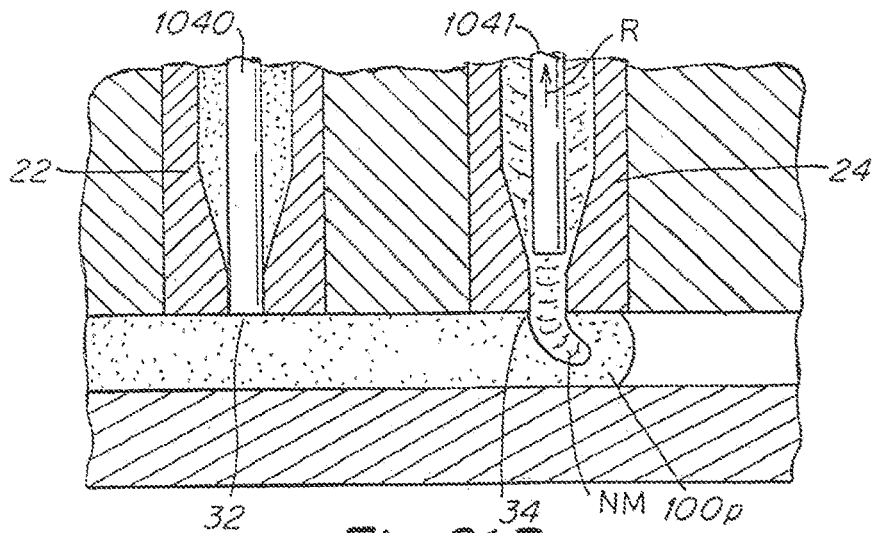
Figure 21C:
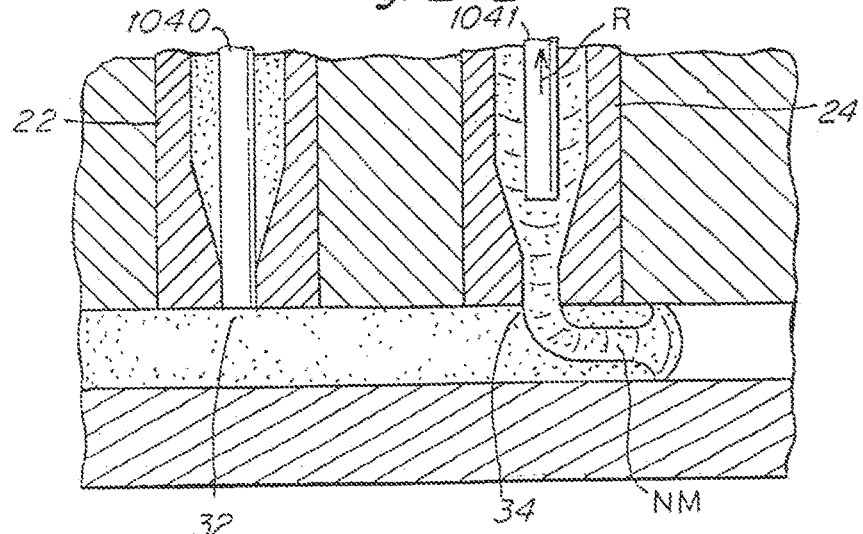

As shown in FIGS. 1, 21A-21E the injection cycle is a cascade process where injection is effected in a sequence from the center nozzle 22 first and at a later predetermined time from the lateral nozzles 20, 24. As shown in FIG. 21A, 22A the injection cycle is started by first opening the pin 1040 of the center nozzle 22 and allowing the fluid material 100 (typically polymer or plastic material) to flow up to a position 100a in the cavity just before 100b the distally disposed entrance into the cavity 34, 36 of the gates of the lateral nozzles 24, 20 as shown in FIG. 1. After an injection cycle is begun, the gate of the center injection nozzle 22 and pin 1040 is typically left open only for so long as to allow the fluid material 100b to travel to a position 100p just past the positions 34, 36. Once the fluid material has travelled just past 100p of the lateral gate positions 34, 36, the center gate 32 of the center nozzle 22 is typically closed by pin 1040 as shown in FIGS. 21B, 21C, 21D and 21E. The lateral gates 34, 36 are then opened by upstream withdrawal of lateral nozzle pins 1041, 1042 as shown in FIGS. 21B-21E. As described below, the rate of upstream withdrawal or travel velocity of lateral pins 1041, 1042 can be controlled as described below.

In alternative embodiments, the center gate 32 and associated actuator 940 and valve pin 1040 can remain open at, during and subsequent to the times that the lateral gates 34, 36 are opened such that fluid material flows into cavity 30 through both the center gate 32 and one or both of the lateral gates 34, 36 simultaneously.

When the lateral gates 34, 36 are opened and fluid material NM is allowed to first enter the mold cavity into the stream 102p that has been injected from center nozzle 22 past gates 34, 36, the two streams NM and 102p mix with each other. If the velocity of the fluid material NM is too high, such as often occurs when the flow velocity of injection fluid material through gates 34, 36 is at maximum, a visible line or defect in the mixing of the two streams 102p and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102p, the appearance of a visible line or defect in the final molded product can be reduced or eliminated.

The rate or velocity of upstream withdrawal of pins 1041, 1042 starting from the closed position is controlled via controller 16 which controls the rate and direction of drive of the electric actuators 940, 941, 942.

The user programs controller 16 via data inputs on a user interface to instruct the electric actuators to drive pins 1041, 1042 at an upstream velocity of travel that is reduced relative to a maximum velocity that the actuators can drive the pins 1041, 1042 to travel. Such reduced pin withdrawal rate or velocity is executed until a position sensor such as 951, 952 detects that an actuator 941, 952 or an associated valve pin (or another component), has reached a certain position such as the end point COP, COP2, FIGS. 22B, 23B of a restricted flow path RP, RP2. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds.

Figure 21D:
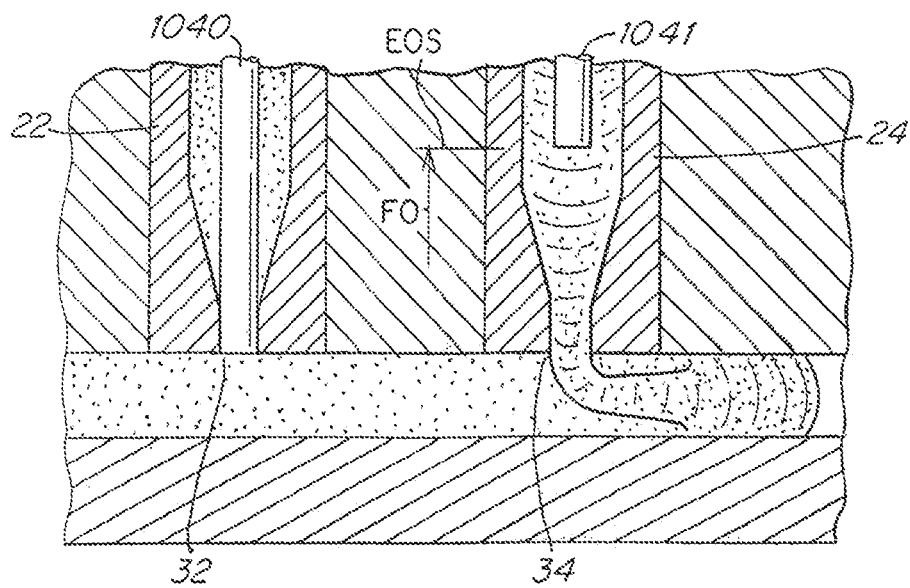
Figure 21E:
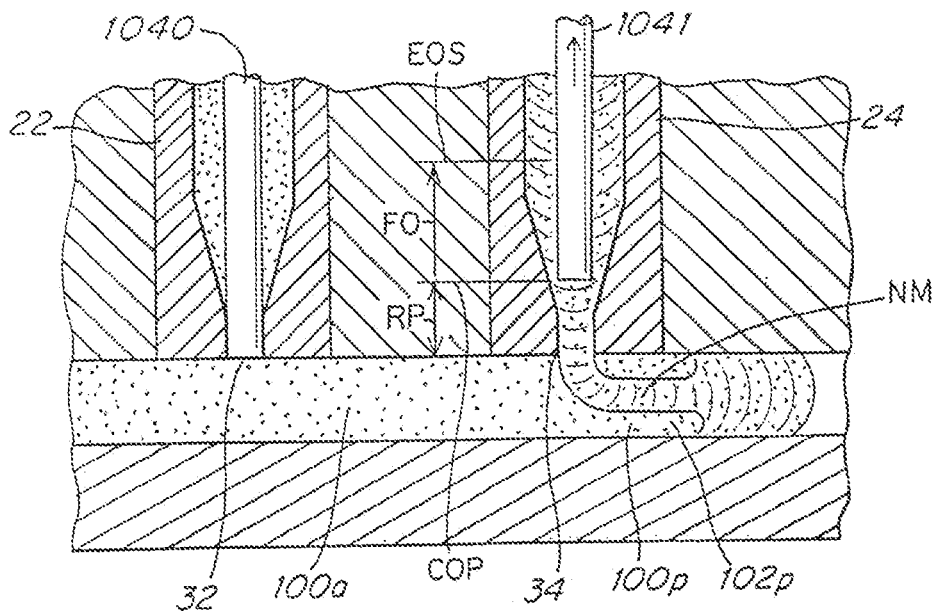

FIG. 1 shows position sensors 950, 951, 952 for sensing the position of the motors 940, 941, 942 and their associated valve pins (such as 1040, 1041, 1042) and feed such position information to controller 16 for monitoring purposes. As shown, fluid material 18 is injected from an injection machine into a manifold runner 19 and further downstream into the bores 44, 46 of the lateral nozzles 24, 22 and ultimately downstream through the gates 32, 34, 36. When the pins 1041, 1042 are withdrawn upstream to a position where the tip end of the pins 1041 are in a fully upstream open position such as shown in FIG. 21D, the rate of flow of fluid material through the gates 34, 36 is at a maximum. However when the pins 1041, 1042 are initially withdrawn beginning from the closed gate position, FIG. 21A, to intermediate upstream positions, FIGS. 21B, 21C, a gap 1154, 1156 that restricts the velocity of fluid material flow is formed between the outer surfaces 1155 of the tip end of the pins 44, 46 and the inner surfaces 1254, 1256 of the gate areas of the nozzles 24, 20. The restricted flow gap 1154, 1156 remains small enough to restrict and reduce the rate of flow of fluid material 1153 through gates 34, 36 to a rate that is less than maximum flow velocity over a travel distance RP of the tip end of the pins 1041, 1042 going from closed to upstream as shown in FIGS. 1, 21B, 21C, 21E and 22B, 23B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 22B, 23B, the pins 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

RP can be about 1-8 mm in length and more typically about 2-6 mm, more typically 2-4 mm and even more typically 1-3 mm in length. According to the invention, the position of the electric actuators are adjusted in response to sensing of position of a suitable component such as the rotor of an actuator 941, 942 or associated valve pin to less than 100% open. Adjustment of the drive of an actuator 931, 942 thus reduces the velocity of upstream travel of the pins 1041, 1042 for the selected period of time. At the end of the travel or length of path RP, RP2, a position sensor signals the controller 16, the controller 16 determines that the end COP, COP2 has been reached and the valve pin is driven at higher velocity, typically to its end of stroke (EOS) or its 100% open position to allow the actuator pistons and the valve pins 1041, 1042 to be driven at maximum upstream velocity FOV in order to reduce the cycle time of the injection cycle.

Typically the user selects one or more reduced velocities that are less than about 90% of the maximum velocity (namely velocity when the valve 600 is fully open), more typically less than about 75% of the maximum velocity and even more typically less than about 50% of the maximum velocity at which the pins 1041, 1042 are drivable by the electric actuator apparatus. The actual maximum velocity at which the actuators 941, 942 and their associated pins 1041, 1042 are driven is predetermined by selection of the size and configuration of the actuators 941, 942. The maximum drive rate of the electric actuator apparatus is predetermined by the manufacturer and the user of the apparatus and is typically selected according to the application, size and nature of the mold and the injection molded part to be fabricated.

Preferably, the valve pin and the gate are configured or adapted to cooperate with each other to restrict and vary the rate of flow of fluid material 1153, FIGS. 22A-22B, 23A-23B over the course of travel of the tip end of the valve pin through the restricted velocity path RP. Most typically as shown in FIGS. 22A, 22B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 23A, 23B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP.

In one embodiment, as the tip end 1142 of the pin 1041 continues to travel upstream from the gate closed GC position (as shown for example in FIGS. 22A, 23A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), where the pin is no longer restricting flow of injection mold material through the gate. In such an embodiment, at the expiration of the predetermined amount of time when the pin tip 1142 reaches the FOP (full open) position the pin 1041 is immediately driven by at maximum velocity FOV (full open velocity). In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV.

In the alternative examples shown in the FIGS. 22B, 23B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 22B the maximum fluid flow rate for injection material 1153 is reached at the upstream position COP of the tip end 1142. In another example shown in FIG. 22B, 23B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In another alternative embodiment, shown in FIG. 4B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection molding apparatus. In this FIG. 4B example the velocity or drive rate of the pin 1041 is not changed over until the tip end of the pin 1041 or actuator 941 has reached the changeover position COP3. As in other embodiments, a position sensor senses either that the valve pin 1041 or an associated component has travelled the path length RP3 or reached the end COP3 of the selected path length and the controller receives and processes such information and instructs the drive apparatus to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 16 being programmed to instruct the drive system for the actuator to be driven at one or more reduced velocities for the time or path length of an entire closed GC to fully open EOS cycle.

Typically, when the time period for driving the pin 1041 at reduced velocity has expired and the pin tip 1142 has reached the position COP, COP2, the pins 1041, 1042 are driven at the maximum velocity or rate of travel that the actuator system is capable of driving the valve pins 1041, 1042. Alternatively, the pins 1041, 1042 can be driven at a preselected FOV velocity that is less than the maximum velocity at which the pin is capable of being driven when the restriction valve 600 is fully open but is still greater than the selected reduced velocities that the pin is driven over the course of the RP, RP2 path to the COP, COP2 position.

At the expiration of the predetermined reduced velocity drive time, the pins 1041, 1042 are typically driven further upstream past the COP, COP2 position to a maximum end-of-stroke EOS position. The end-of-stroke position EOS is an upstream position selected by the user that can be the maximum upstream position that the pin can be withdrawn to or the EOS position can be a less than maximum upstream position to which the valve pin can be withdrawn. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

As shown in each of the embodiments shown in the Figures the electrical drive (940d, 941d, 942d) is incorporated into, housed within, or physically mounted onto or in direct heat communication with the actuator housing (940h, 941h, 942h) of the actuator such that the electric drive (940d, 941d, 942d) is in direct or indirect thermal communication or contact with the thermally conductive housing (940h, 941h, 942h) of the actuator.

Figure 1B:
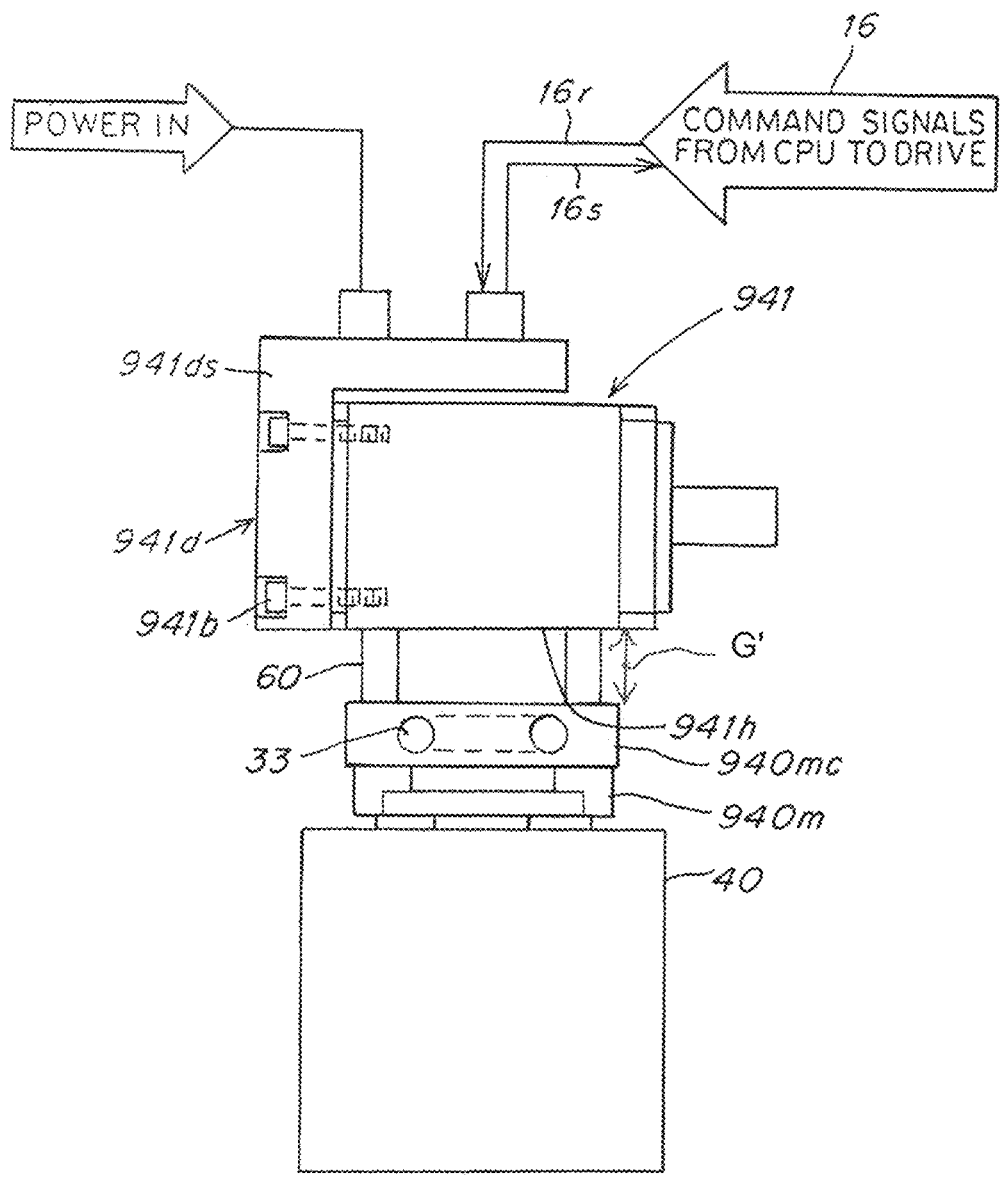

The electrical drive (940d, 941d, 942d) can be housed or mounted in a thermally conductive housing body (940ds) that is readily attachable to and detachable from the actuator housing (940h, 941h, 942h) as shown in FIGS. 1A, 1B such a readily attachable and detachable housing body (940ds) being attachable or mountable to the actuator housing (940h, 941h, 942h) in an arrangement such that the electrical drive (940d, 941d, 942d) is in direct or indirect thermally conductive contact or communication with the actuator housing (940h, 941h, 942h).

As shown, the housings (940h, 941h, 942h) of each of the actuators (940, 941, 942) is mounted on, to or in close physical proximity to a heated manifold (40).

The electric actuators 940, 941, 942 typically comprise a driver 940dr, 941dr, 942dr typically comprised of a stator and armature that are interconnected to a rotatably mounted rotor or shaft 940r, 941r, 942r such that when the drivers 940dr, 941dr, 942dr rotate on application and receipt of electrical energy or power, the shafts 940r, 941r, 942r are simultaneously rotatably moved and driven.

The rotor (940r, 941r, 942r) has a drive axis (Y). The driver (940dr, 941dr, 942dr) is interconnected to the rotor (940r, 941r, 942r) and adapted to controllably drive the rotor rotatably around the drive axis Y.

The drivers (940dr, 941dr, 942dr) receive electrical energy or power from an electrical drive (940d, 941d, 942d). The electrical drive (940d, 941d, 942d) typically comprises an interface that receives electrical energy or power from a power source PS and controllably distributes the received electrical energy or power in controllably varied amounts during the course of an injection cycle to the drivers (940dr, 941dr, 942dr).

The actuator includes a housing (940h, 941h, 942h) that houses the rotor (940r, 941r, 942r) and the driver (940dr, 941dr, 942dr) and is adapted to support the rotor (940r, 941r, 942r) such that the rotor is drivably rotatable 940rt, 941rt, 942rt. The housing (940h, 941h, 942h) is typically thermally or heat conductive such that the housing can deliver heat to a cooler body such as the cooling device (940mc, 940mc1, 940mc2, 941mc, 942mc) described herein or a cooler body such as the top clamp plate with which the actuator housing may be passively cooled. The thermally conductive actuator housing body (940h, 941h, 942h) can receive heat or thermal energy from devices such as the manifold (40) with which the housing (940h, 941h, 942h) could be in thermally conductive communication or contact but for provision and arrangement of the cooling device disclosed herein that prevents or retards such thermal transmission of heat from the manifold (40).

The electrical drive (940d, 941d, 942d) is typically housed within or by the housing (940h, 941h, 942h) or is physically mounted on or to the housing (940h, 941h, 942h) in thermally conductive communication or contact therewith.

The electrical drive (940d, 941d, 942d) typically includes a PWM or pulse-width modulator that converts received electrical energy or power into sinusoidal voltage waveforms, each sinusoidal voltage waveform being adapted to drive a corresponding phase-coil of the actuator driver (940dr, 941dr, 942dr).

The PWM or pulse-width modulator typically comprises an inverter or comparator.

The PWM modulator typically comprises a three-phase PWM inverter that converts electrical energy or power received from the interface into three sinusoidal voltage waveforms, each one of the three sinusoidal voltage waveforms being adapted to drive a corresponding one of three phase-coils of the actuator driver.

The electrical energy or power received at or by the PWM modulator can be a DC bus voltage.

The interface of the electrical drive 940d, 941d, 942d is adapted to receive one or more control signals from a controller 16 of the injection molding apparatus and to convert electrical energy or power received the power source PS into sinusoidal waveforms based on the one or more control signals. The interface is comprised of the PWM or pulse width modulator which converts electrical energy or power received from the power source into sinusoidal waveforms based on the one or more control signals.

The one or more control signals received by the interface of the electrical drive contain control information causing the pulse width modulator to convert the received electrical energy or power into sinusoidal waveforms adapted to drive the corresponding phase-coils of the actuator driver to adjust one or more of a position, a velocity or torque of the actuator rotor 940*r*, 941*r*, 942*r*.

The one or more control signals can comprise analog electrical signals received at the electrical drive from the controller 16.

The electrical drive 940*d*, 941*d*, 942*d* can further comprise one or the other or both of a digital signal receiving (16*r*) and transmitting (16*s*) device, FIG. 1A. The controller (16) includes a digital command or signal generating mechanism such as a computer drive, microcontroller, microcircuit, chipset or the like interconnected to a digital data storage medium to and from which the digital command or signal generating mechanism exchanges digital signals, data or commands. The controller (16) is adapted to send and received digital signals, commands, data to and from a digital signal receiving device (16*r*) contained within the electrical drive (940*d*, 941*d*, 942*d*). The digital commands that are received (16*s*) by the electrical drive (940*d*, 941*d*, 942*d*) are used by the drive (940*d*, 941*d*, 942*d*) to control distribution of electrical energy or power to the driver (940*dr*, 941*dr*, 942*dr*) thus controlling the speed of rotation of the rotor of the actuator (940, 941, 942) during the course of the injection cycle.

The electrical drive (940*d*, 941*d*, 942*d*) can also include a digital signal, data or command sending device (16*s*) that is typically comprised of a microcontroller, microcircuit, chipset or the like and adapted to communicate or send digital signals back to a digital signal receiving device contained within the controller (16).

The digital control signals can include one or more of differential position commands, differential current commands, and differential velocity commands.

The digital signal receiving and transmitting device (16*r*, 16*s*) further can receive digital signals from the actuator, wherein the digital signals received from the actuator include one or more feedback signals corresponding to operation of one or more of the actuator and the actuator rotor.

The one or more feedback signals received by the electrical drive (940*d*, 941*d*, 942*d*) from the actuator can include one or more of an incremental feedback signal and an absolute feedback signal. Such incremental feedback signal or absolute feedback signal sent by the actuator to the electrical drive can be communicated or sent back to the controller (16) by the digital signal sending device (16*s*).

The apparatus shown in FIG. 1A comprises an electric actuator (941) having a housing (941*h*) and an electric drive (941*d*) that is readily attachable to and detachable from the housing (941*h*) of the actuator via a conventional attachment and detachment mechanism such as bolts (941*b*) with a cooling device (940*mc*, 940*mc*1, 940*mc*2, 941*mc*, 942*mc*) being disposed between the heated manifold (40) and the housing (940*h*, 941*h*, 942*h*) and the electric drive (940*d*), the cooling device being adapted to substantially isolate or insulate at least the electrical drive (940*d*, 941*d*, 942*d*) from substantial communication with heat emanating or emitted from the heated manifold (40).

As shown in FIG. 1B, the actuator housing (941*h*) and electric drive can alternatively be mounted in a spaced relationship on or to the cooling device via mounts (60) that are typically comprised of a heat insulative material such as titanium, bismuth, stainless steel, lead, chromium or the like.

Figure 2:
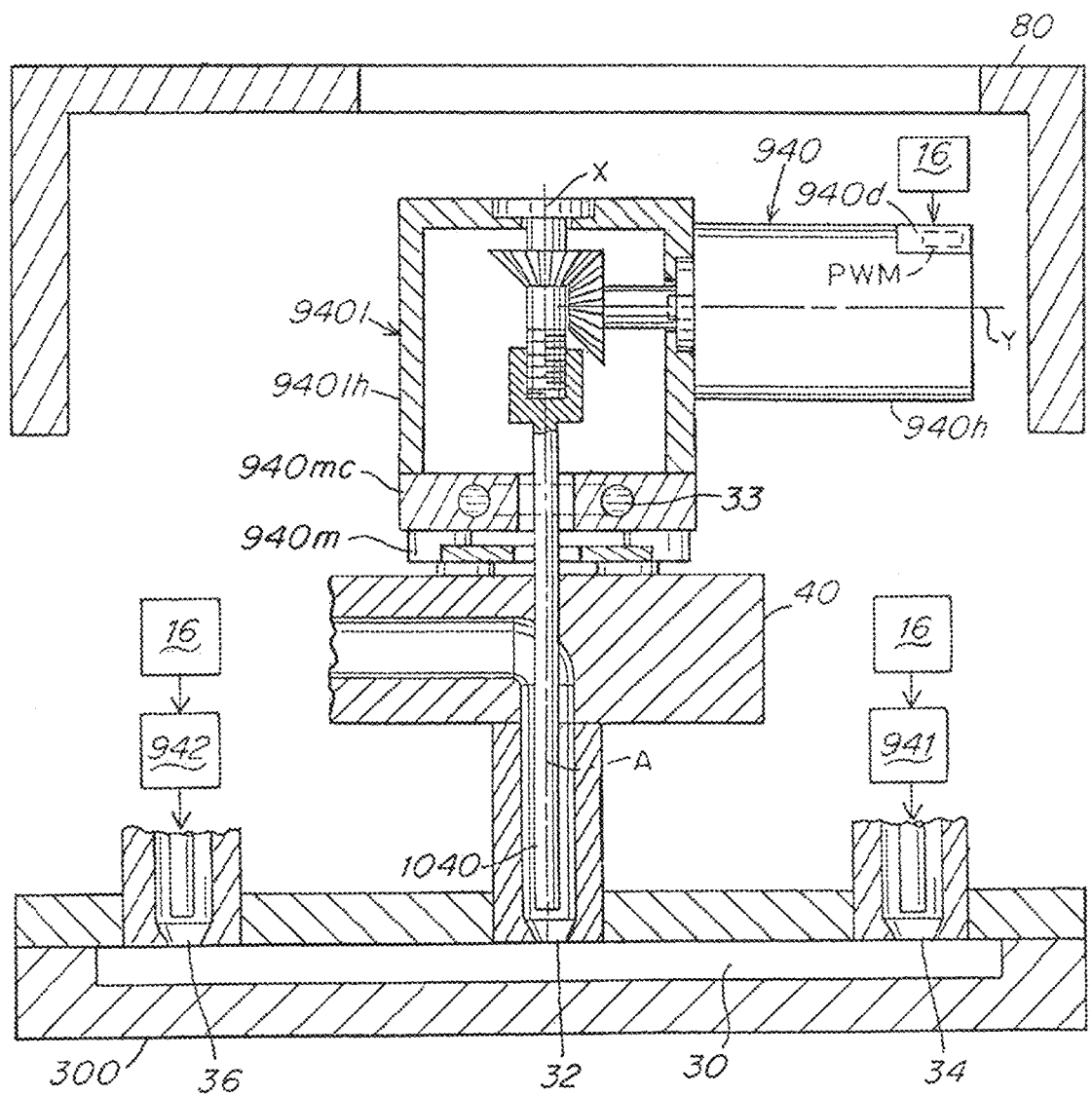
FIG. 2 is a side sectional schematic view of an electric actuator in a apparatus similar to the FIG. 1 apparatus where the actuator (940) has a drive axis Y that is arranged non-coaxially relative to the travel axis of the valve pin (1040), the actuator housing (940*h*) and the electric drive (940*d*) being mounted on, to or in close physical proximity to the heated manifold (40) via mounting of the actuator housing (940*h*) to a rotary to linear travel converter (940*l*, 940*h*) which is in turn mounted on, to or in close physical proximity to a heated manifold with a cooling device (940*mc*, 940*mc*1, 940*mc*2, 941*mc*, 942*mc*) being disposed between the heated manifold (40) and the linear travel converter (940*l*, 940*h*), the actuator housing (940*h*, 941*h*, 942*h*) and the electric drive (940*d*, 941*d*, 942*d*), the cooling device being adapted to substantially isolate or insulate at least the electrical drive (940*d*, 941*d*, 942*d*) from substantial communication with heat emanating or emitted from the heated manifold (40).

FIG. 2 shows an embodiment where the actuator (940) has a drive axis Y that is arranged non-coaxially relative to the travel axis of the valve pin (1040), the actuator housing (940*h*) and the electric drive (940*d*) being mounted on, to or in close physical proximity to the heated manifold (40) via mounting of the actuator housing (940*h*) to a rotary to linear travel converter (940*l*, 940*h*) which is in turn mounted on, to or in close physical proximity to a heated manifold with a cooling device (940*mc*, 940*mc*1, 940*mc*2, 941*mc*, 942*mc*) being disposed between the heated manifold (40) and the linear travel converter (940*l*, 940*h*), the actuator housing (940*h*, 941*h*, 942*h*) and the electric drive (940*d*, 941*d*, 942*d*). The cooling device is adapted and arranged relative to the electric drive to substantially isolate or insulate at least the electrical drive (940*d*, 941*d*, 942*d*) from substantial communication with heat emanating or emitted from the heated manifold (40). The cooling device is also typically adapted and arranged to isolate or insulate the actuator housing (940*h*) and the rotary to linear converter (940*l*) from substantial communication with heat emanating or emitted from the heated manifold (40).

Figure 2A:
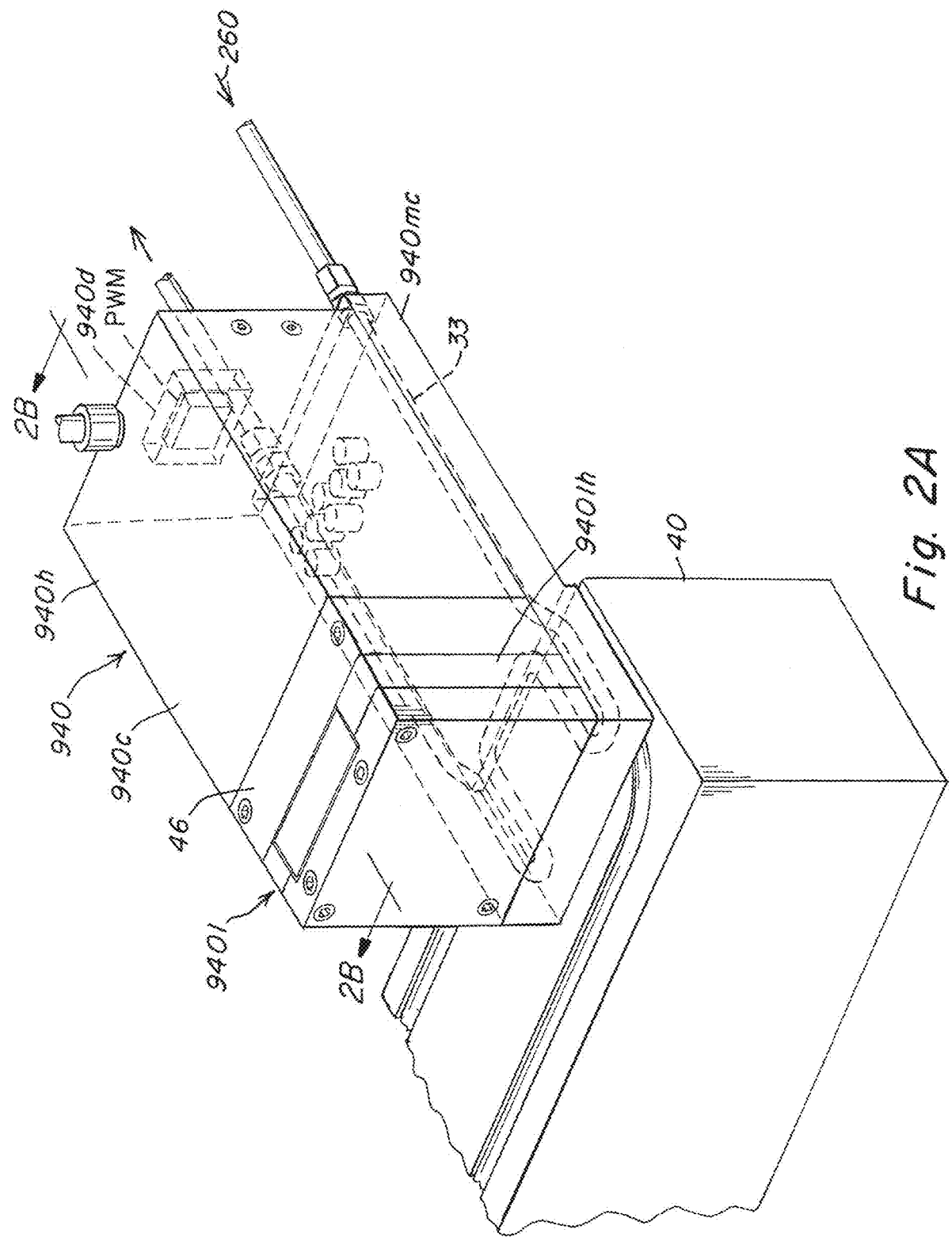
FIG. 2A is a top front perspective view of an embodiment of comprised of an electric actuator (940) having a drive axis Y that is arranged non-coaxially relative to the travel axis of the valve pin (1040), the actuator housing (940*h*) and the electric drive (940*d*) being mounted to or on or in close physical proximity to the heated manifold (40) via mounting of the actuator (940) to a rotational speed reducing device (46) that is in turn mounted to a rotary to linear travel converter (940*l*, 940*h*) which is in turn mounted on or to or in close physical proximity to a heated manifold (40) with a cooling device (940*mc*, 940*mc*1, 940*mc*2, 941*mc*, 942*mc*) being disposed between the heated manifold (40) and the linear travel converter (940*l*, 940*h*), the rotational speed reducing device (46), the actuator housing (940*h*, 941*h*, 942*h*) and the electric drive (940*d*) the cooling device being adapted to substantially isolate or insulate at least the electrical drive (940*d*, 941*d*, 942*d*) from substantial communication with heat emanating or emitted from the heated manifold (40).

FIG. 2A shows an embodiment where the electric actuator (940) has a drive axis Y that is arranged non-coaxially relative to the travel axis of the valve pin (1040), the actuator housing (940*h*) and the electric drive (940*d*) being mounted to or on or in close physical proximity to the heated manifold (40) via mounting of the actuator (940) to a rotational speed reducing device (46) that is in turn mounted to a rotary to linear travel converter (940*l*, 940*h*) which is in turn mounted on or to or in close physical proximity to a heated manifold (40) with the cooling device (940*mc*, 940*mc*1, 940*mc*2, 941*mc*, 942*mc*) disposed between the heated manifold (40) and the rotary to linear travel converter (940*l*, 940*h*), the rotational speed reducing device (46), the actuator housing (940*h*, 941*h*, 942*h*) and the electric drive (940*d*). The cooling device is adapted to substantially isolate or insulate at least the electrical drive (940*d*, 941*d*, 942*d*) from substantial communication with heat emanating or emitted from the heated manifold (40). The cooling device is also typically adapted and arranged to isolate or insulate the actuator housing (940*h*) and the rotary to linear converter (940*l*) and the rotational speed reducing device (46) from substantial communication with heat emanating or emitted from the heated manifold (40).

In this embodiment the rotary to linear converter 940*l* and its housing 940*lh* together with the speed reducing device 46 and actuator 940 to which the converter 940*l* is subassembled are mounted to the heated manifold (40) via standoffs or mounts 60 that are preferably comprised of a heat insulative material such as titanium, bismuth, stainless steel, lead, chromium or the like.

Figure 2B:
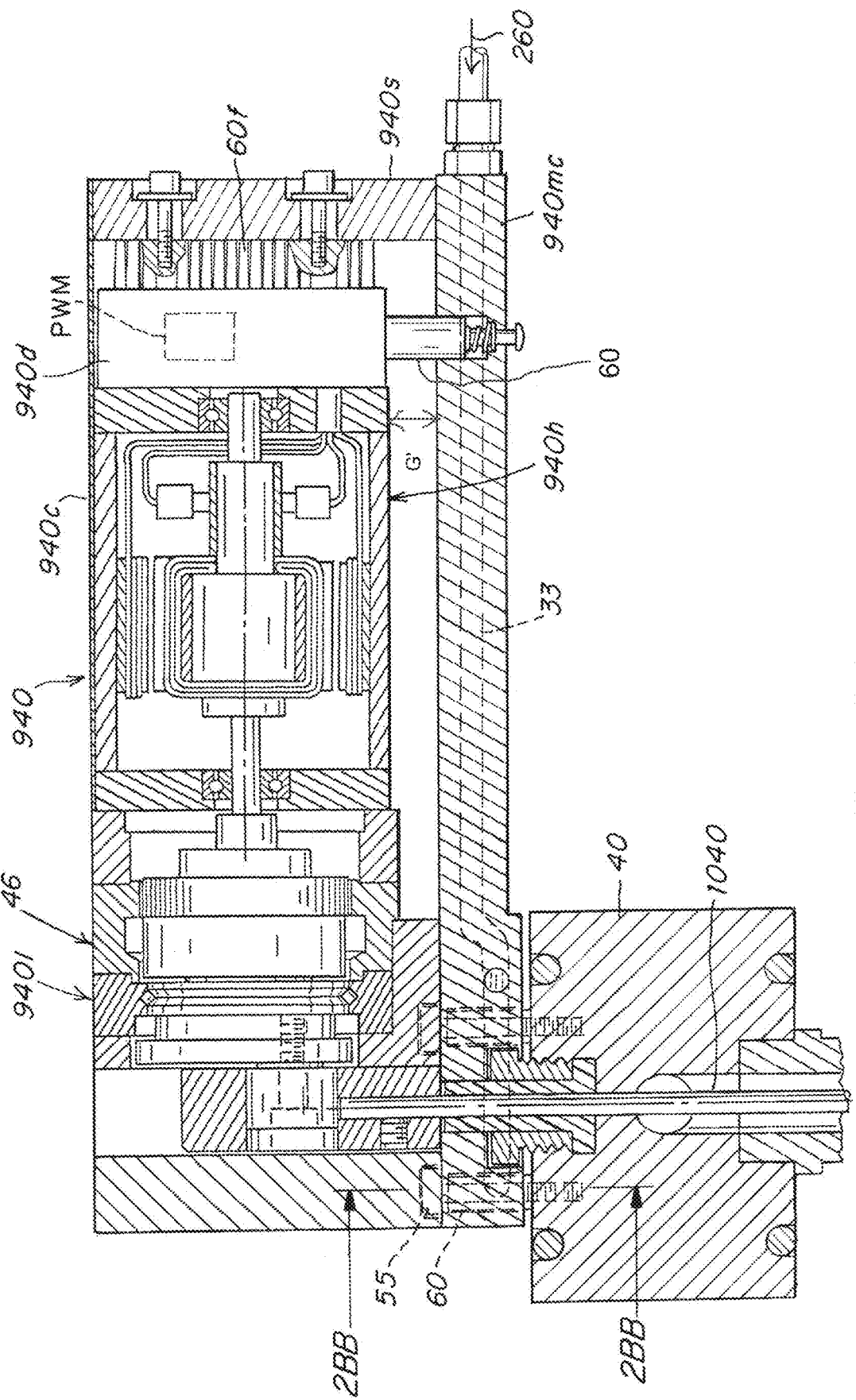
FIG. 2B is a side sectional view of the FIG. 2A apparatus taken along lines 2B-2B.
Figure 2C:
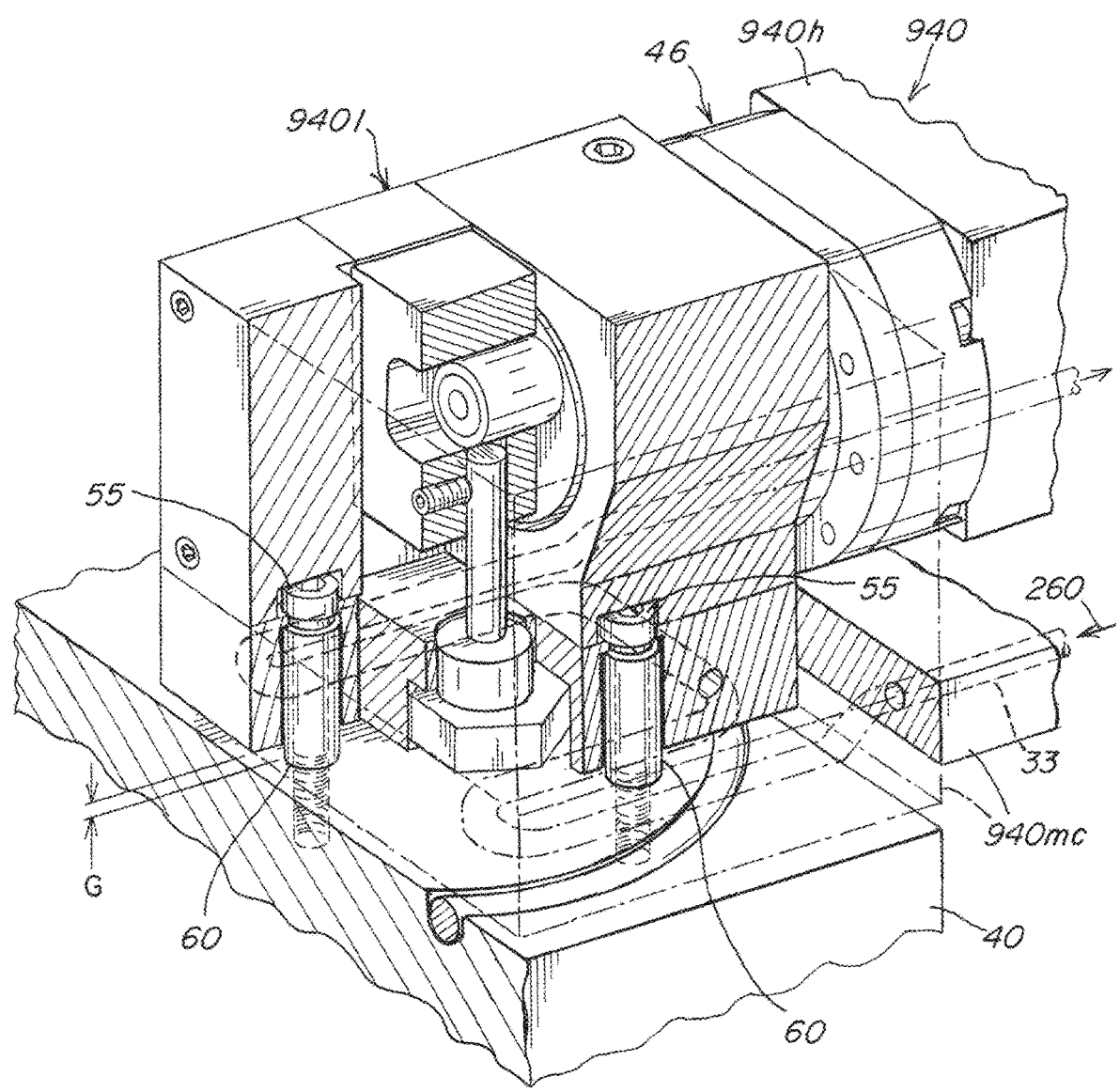
FIG. 2C is a top front partial sectional perspective view of the FIGS. 2B, 2BB subassembly.
Figure 2D:
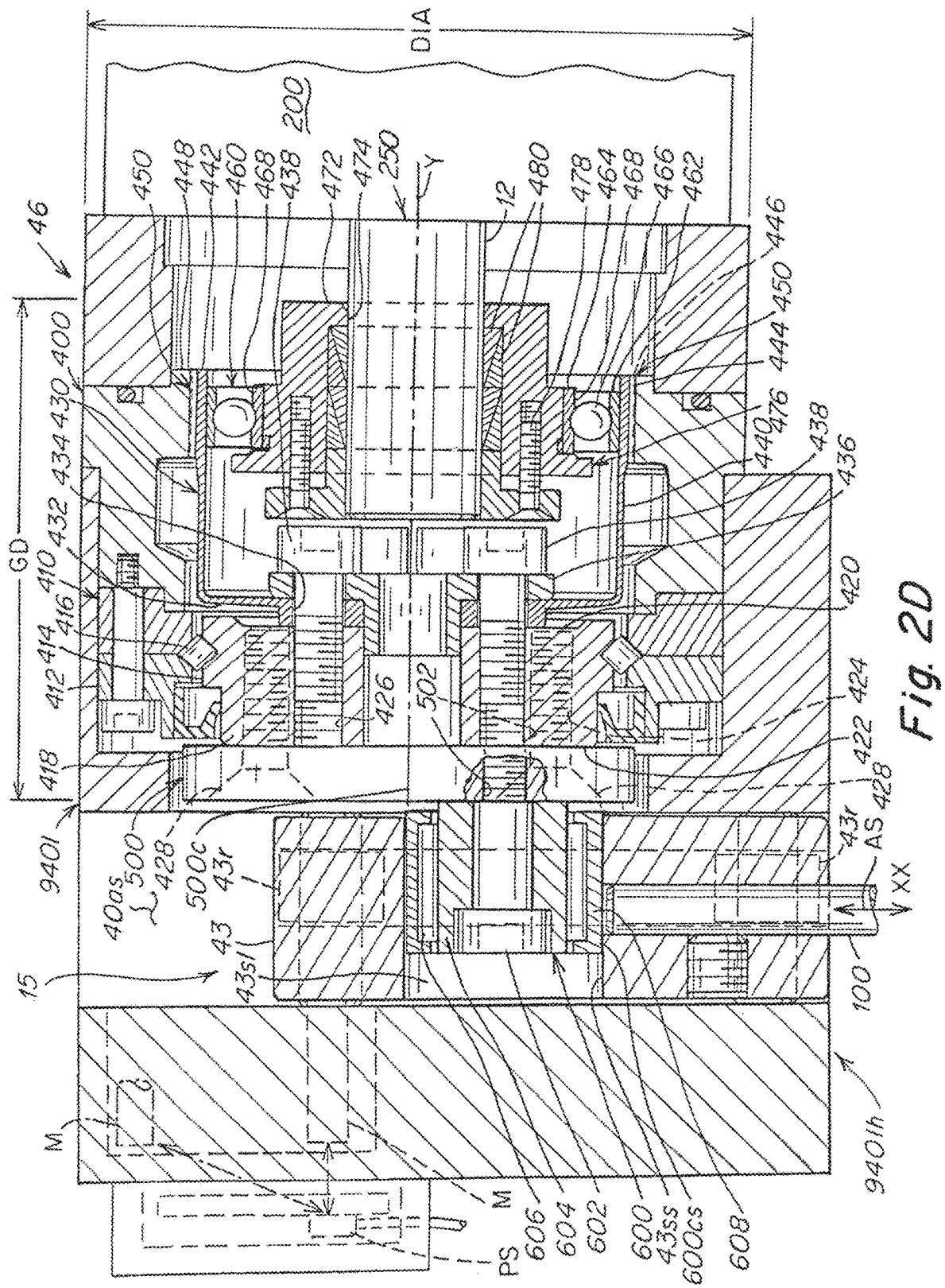
FIG. 2D is a side sectional view of the subassembled rotational speed reducing device 46, a harmonic, and rotary to linear converter device 940*l* components of the subassembly shown in FIGS. 2A, 2B, 2BB, 2C.

As shown in FIG. 2D the rotational speed reducing device 46 comprises a harmonic device and the rotary to linear converter device 940*l* comprises a wheel or disc that uses an eccentric or eccentrically disposed pin or projection to drive the valve pin along pin axis X.

Figure 2E:
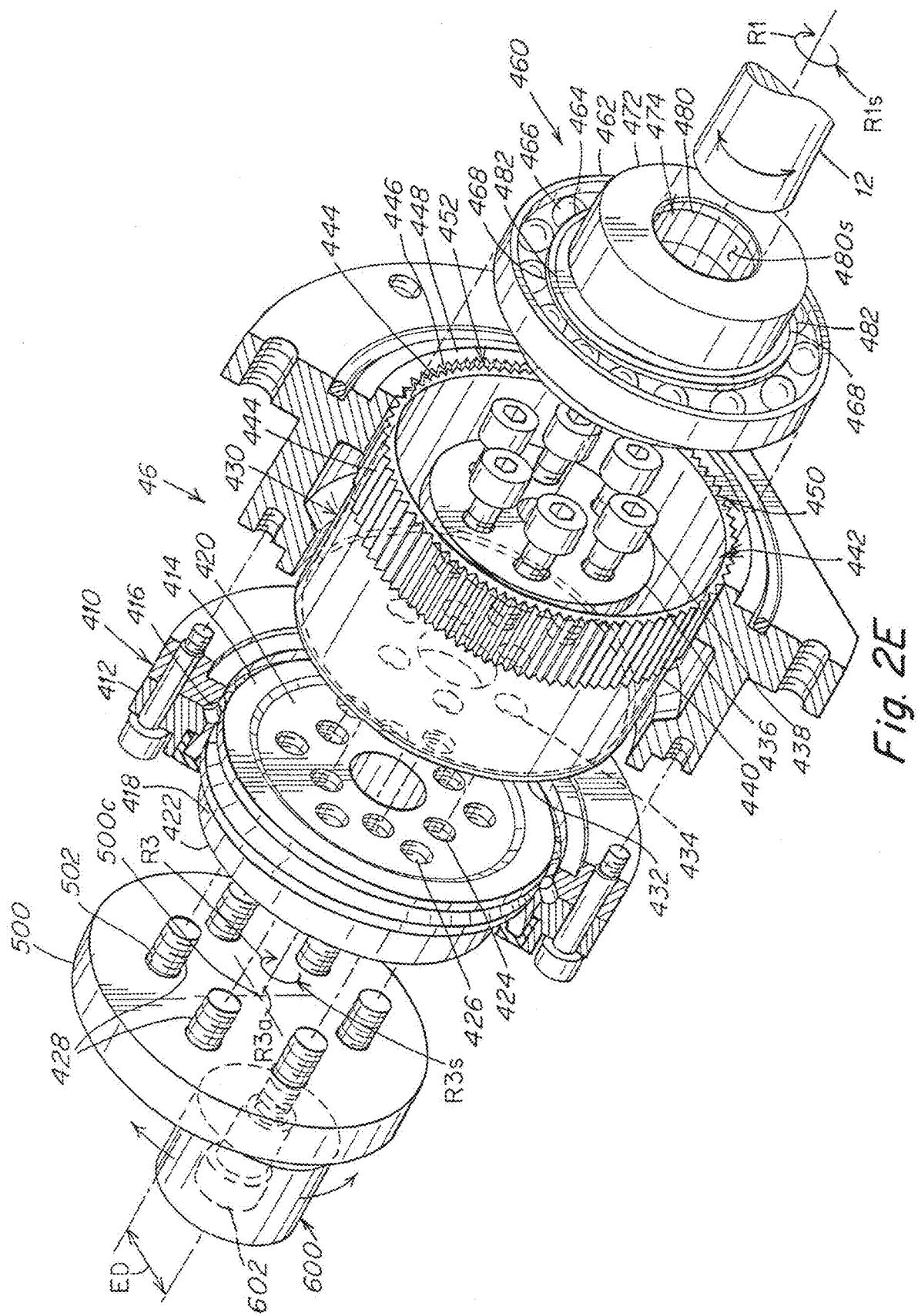
FIG. 2E is a top rear exploded perspective view of the rotational speed reducing device 46 shown in FIGS. 2A, 2B, 2BB, 2C, 2D.
Figure 2F:
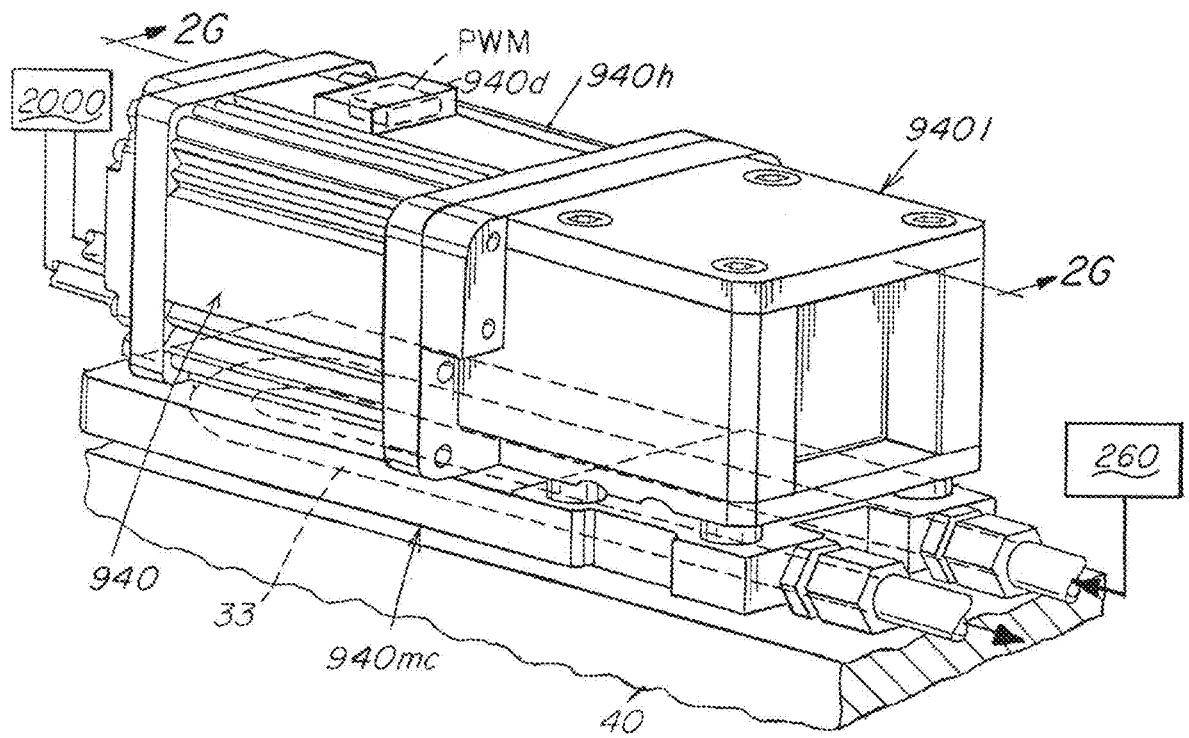
FIG. 2F is a top front perspective view of another embodiment comprised of an actuator having a drive axis Y that is arranged non-coaxially relative to the travel axis of the valve pin (1040), the actuator housing (940*h*) being mounted to, on or in close physical proximity to the heated manifold (40) via mounting of the actuator (940) to a rotary to linear travel converter (940*l*, 940*lh*) which is in turn mounted on, to or in close physical proximity to a heated manifold (40) with a cooling device (940*mc*, 940*mc*1, 940*mc*2, 941*mc*, 942*mc*) being disposed between the heated manifold (40) and the linear travel converter (940*l*, 940*h*), the actuator housing (940*h*, 941*h*, 942*h*) and the electric drive (940*d*), the cooling device being adapted to substantially isolate or insulate at least the electrical drive (940*d*, 941*d*, 942*d*) from substantial communication with heat emanating or emitted from the heated manifold (40).
Figure 2G:
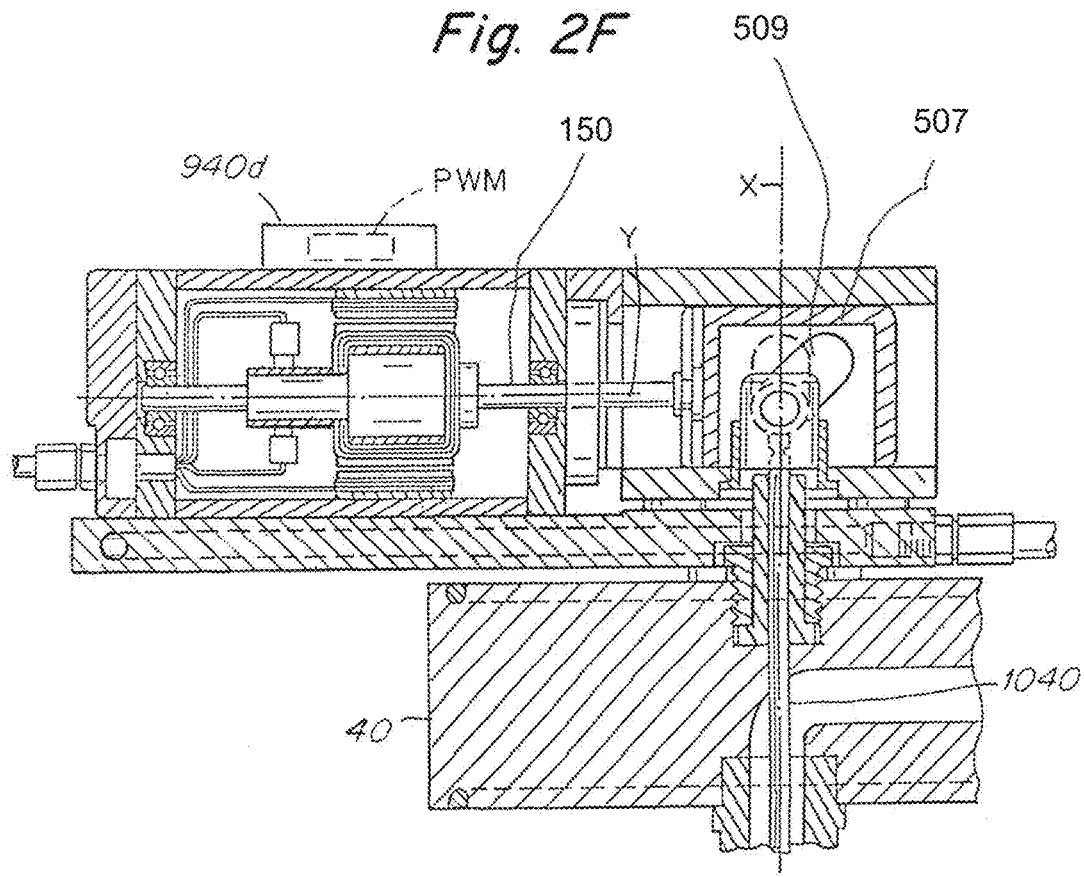
FIG. 2G is a sectional view of the apparatus of FIG. 2F along lines 2G-2G.

FIGS. 2F, 2G show another embodiment comprised of an actuator having a drive axis Y that is arranged non-coaxially relative to the travel axis of the valve pin (1040). The actuator housing (940*h*) is mounted to, on or in close physical proximity to the heated manifold (40) via mounting of the actuator (940) to a rotary to linear travel converter (940*l*, 940*lh*) which is in turn mounted on, to or in close physical proximity to a heated manifold (40) with a cooling device (940*mc*, 940*mc*1, 940*mc*2, 941*mc*, 942*mc*) disposed between the heated manifold (40), the linear travel converter (940*l*, 940*h*), the actuator housing (940*h*, 941*h*, 942*h*) and the electric drive (940*d*). The cooling device is adapted and arranged to substantially isolate or insulate at least the electrical drive (940*d*, 941*d*, 942*d*) from substantial communication with heat emanating or emitted from the heated manifold (40). As shown the FIGS. 2F, 2G cooling device (940*mc*) comprises a single unitary elongated plate on which both the actuator housing (940*h*), electric drive (940*d*), converter (940*l*) and converter housing (940*lh*) are mounted with the cooling device being adapted and arranged to isolate or insulate all of the electric drive (940*d*), the actuator housing (940*h*) and the rotary to linear converter (940*l*) from substantial communication with heat emanating or emitted from the heated manifold (40).

Figure 2H:
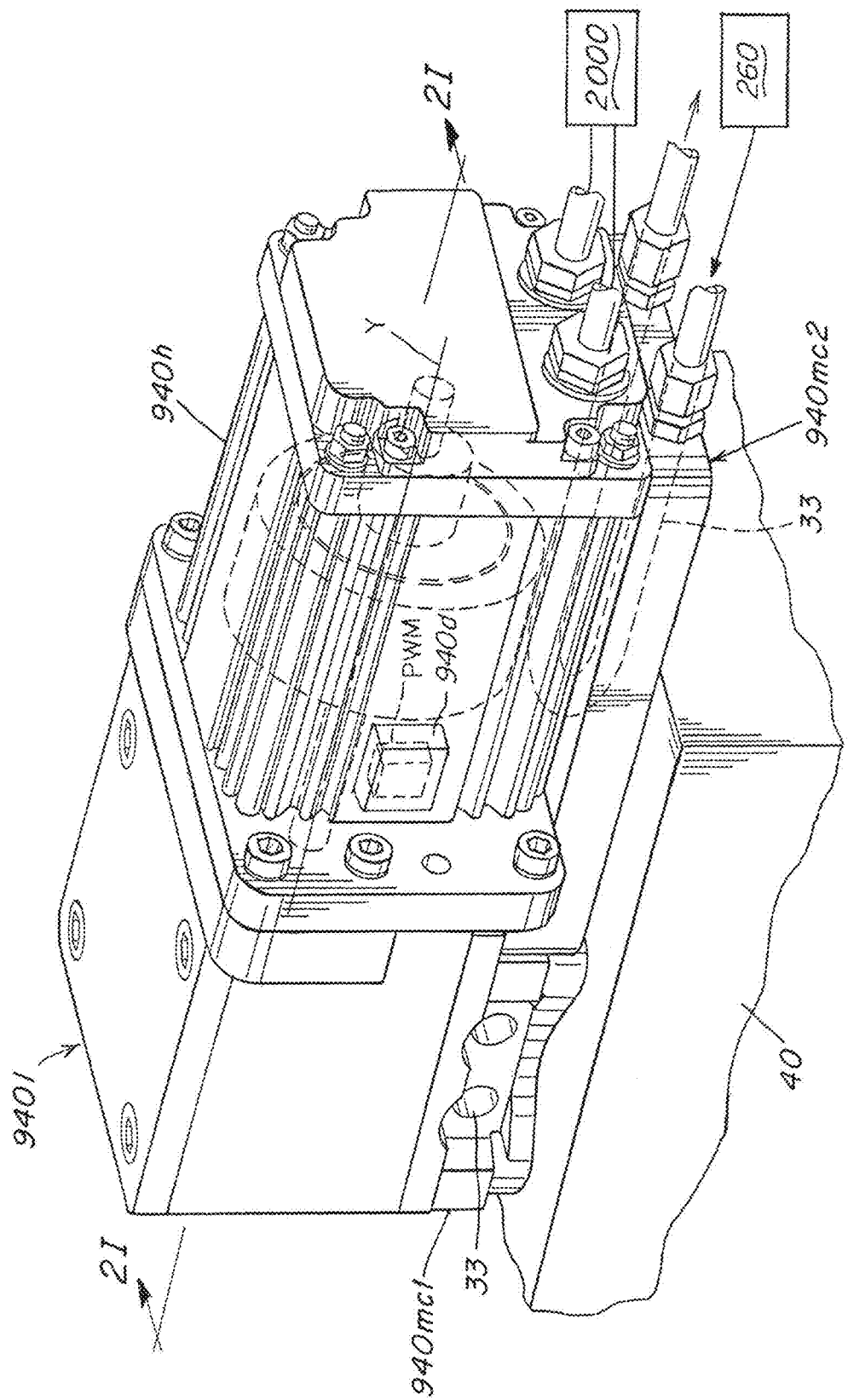
FIG. 2H is a top front perspective view of another embodiment comprised of an actuator having a drive axis Y that is arranged non-coaxially relative to the travel axis of the valve pin (1040), the actuator housing (940*h*) being mounted to, on or in close physical proximity to the heated manifold (40) via mounting of the actuator (940) to a linear travel converter (940*l*, 940*h*) which is in turn mounted on or to or in close physical proximity to a heated manifold (40) with a cooling device (940*mc*, 940*mc*1, 940*mc*2, 941*mc*, 942*mc*) being disposed between the heated manifold (40) and the linear travel converter (940*l*, 940*h*), the actuator housing (940*h*, 941*h*, 942*h*) and the electric drive (940*d*) the cooling device being adapted to substantially isolate or insulate at least the electrical drive (940*d*, 941*d*, 942*d*) from substantial communication with heat emanating or emitted from the heated manifold (40).
Figure 21:
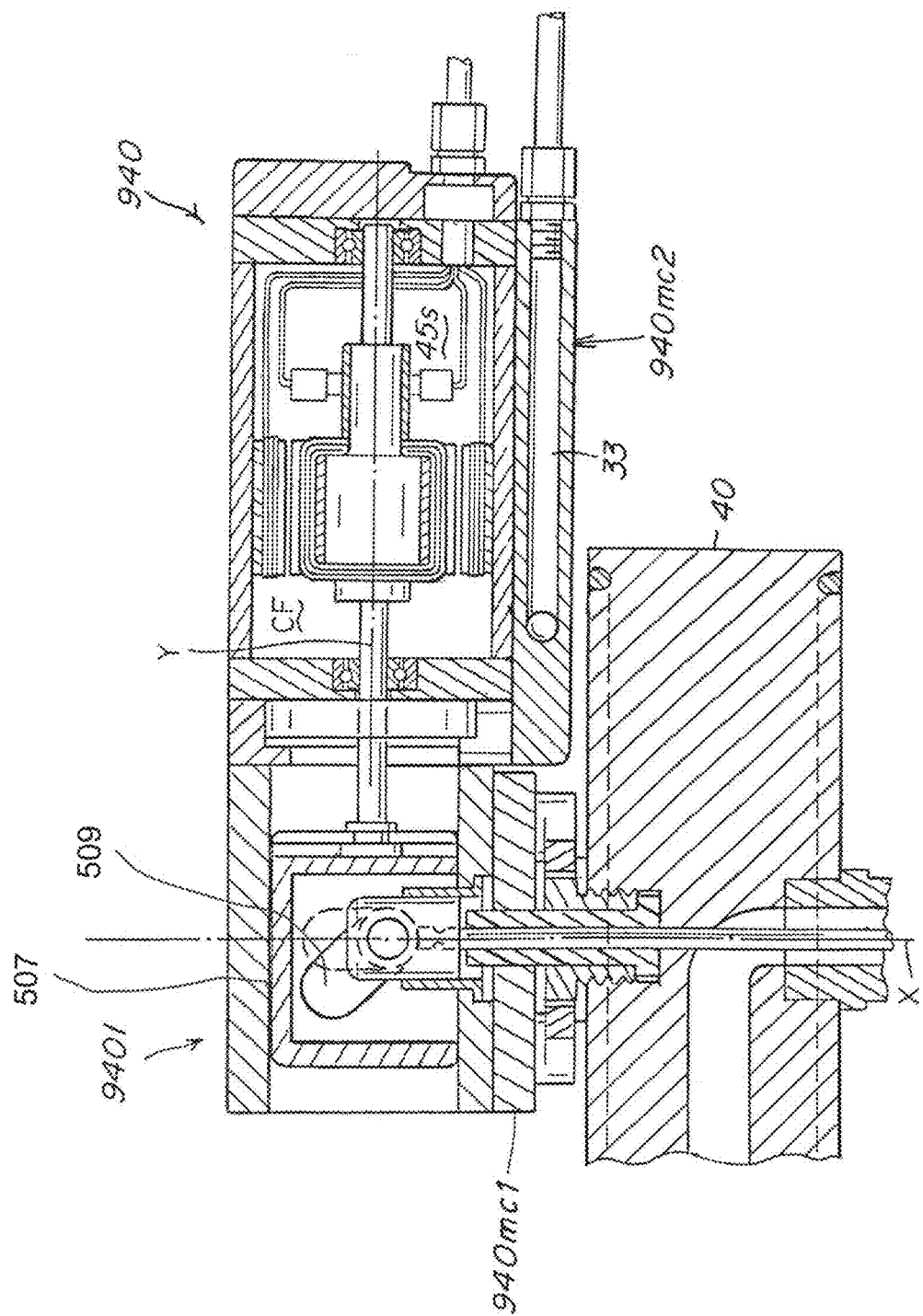
FIGS. 21A-21E are schematic cross-sectional close-up views of the center and one of the lateral gates 34 of the FIG. 1 apparatus showing various stages of the progress of sequential injection.

FIG. 2H shows another embodiment comprised of an actuator having a drive axis Y that is arranged non-coaxially relative to the travel axis of the valve pin (1040), the actuator housing (940*h*) being mounted to, on or in close physical proximity to the heated manifold (40) via mounting of the actuator (940) to a linear travel converter (940*l*, 940*h*) which is in turn mounted on or to or in close physical proximity to a heated manifold (40) with a separate unitary body cooling device such as a plate (940*mc*1) being disposed and arranged between the heated manifold (40) and the rotary to linear travel converter (940*l*, 940*h*). The actuator housing (940*h*) is separately mounted on or to a separate unitary body cooling device (940*mc*2). The cooling devices (940*mc*1, 940*mc*2) are each separately adapted and arranged to substantially isolate or insulate at least the electrical drive (940*d*, 941*d*, 942*d*) from substantial communication with heat emanating or emitted from the heated manifold (40). As shown the rotary to linear converter (940*l*) is mounted to the separate cooling device (940*mc*1) in an arrangement such that the rotary to linear converter (940*l*) and electric drive (940*d*) are substantially isolated or insulated from substantial communication with heat emanating or emitted from the heated manifold (40). And, as shown the actuator housing (940*h*) is mounted to the separate cooling device (940*mc*2) in an arrangement such that the actuator housing (940*h*) and the electric drive (940*d*) are substantially isolated or insulated from substantial communication with heat emanating or emitted from the heated manifold (40). As shown each of the separate cooling devices or plates (940*mc*1, 940*mc*2) separately contain fluid channels (33) for receiving cool or cooled fluid that cools the cooling devices.

In the FIGS. 2F, 2G, 2H, 2I embodiment, the rotary to linear converter 940*l* comprises a travel converter that is comprised of a sliding body 507 fixedly interconnected a linear drive shaft 150 of the actuator. An undersurface of the sliding body 507 is slidably mounted on a mounting surface of a bottom wall of a subassembled body housing such that the sliding body 507 is controllably drivable along the first linear drive axis (Y) by controlled drive of the actuator with the controller 16. As shown in the specific embodiment, the sliding body 507 is formed to include an aperture or slot 509 within the body 507 that is configured and adapted to cause the valve pin 1040 to be driven at one or more selected speeds along axis X in relation to the rotational speed of drive of the actuator 940. The upstream end of the valve pin is fixedly connected to a follower pin around which is typically mounted one or more wheels that are typically rotatably mounted on the follower pin as disclosed in WO2018/194961 the disclosure of which is incorporate herein by reference in its entirety as if fully set forth. The housing, follower pin, valve pin and manifold are assembled such that the guide slot receives the follower pin and wheels in an arrangement where the outside surfaces of the wheels engage against the guide surface of the slot. As the sliding body 507 is moved along axis Y the slot moves along axis X and the follower pin is forced by engagement against the moving slot surface to move along the non coaxial axis X, the valve pin thus moving along the axis X together with movement of the sliding body 507 along axis Y. The speed of movement of the valve pin 1040 depends both on the contour or profile of the surface of guide slot and on the speed of movement of the linear drive member 150 of actuator 940.

In the embodiment of FIGS. 2F to 2I, the slot 509 has a linear or straight configuration such that the speed of movement of valve pin 1040 varies directly or linearly with the speed of movement of linear drive member 150. Alternatively, the slot 509 can have a stepped or curved surface configuration comprised of two separate straight steps of differing slopes or degrees of angle relative to linear movement axis X which results in the velocity of valve pin 1040 increasing when the valve pin is withdrawn upstream and reaches higher upstream positions. Thus the velocity of movement of the valve pin 1040 along the X axis can be changed relative to a constant linear drive member 150 velocity via a stepped or curved slot profile.

As can be readily imagined, the contour or profile of the slot included in member 507 can be selected to be of any stepped, curved or other non linear configuration such that the velocity V of movement of the valve pin 80 along the linear axis X has any selected or predetermined non linear or varying correlation to the velocity of movement of the linear drive member 150, in particular such that the velocity along axis X changes to one or more greater or less preselected velocities over the course of travel of the valve pin 1040 between gate closed and gate full open positions where the velocity of the linear drive member 150 is constant over the same course of travel of the valve pin 1040.

Other configurations of linear converters that cause the pin to be driven at varying velocities over the course of an injection cycle can be used such as disclosed in WO2018/194961.

The term linear converter as used herein means a device that converts the rotary motion of the rotor of an electric motor to linear motion of a valve pin in some manner either coaxially or non coaxially with the linear motion of the valve pin. A linear converter can convert rotary motion of the motor such as shown in the embodiments of FIGS. 2A to 2C, 15, 16. For example in the FIG. 15, 16 embodiments the non coaxial linear converter 46 converts the rotary motion of the motor shaft via a direct rotary to linear connection such as bevel gear 44*g*, screw 44*s*, nut 26 as described in WO2018/129015, the disclosure of which is incorporated herein by reference as if set forth herein in its entirety. In the embodiments shown in FIGS. 2F through 2I the linear converter 940*l* converts the rotary motion of the rotor via an indirect connection through a shaft 150 that is linearly driven coaxially (Y) with the axis of the rotating motor rotor, the linearly driven shaft 150 being interconnected to a sliding member 507 that is adapted to convert the linear motion of the shaft 150 to a non coaxial linear motion X of the valve pin 1040. In the FIGS. 2A through 2E embodiments, the linear converter 15, 40 rotary motion of the motor rotor 12 is converted to non coaxial linear motion (XX) of the valve pin 100 via the eccentric device assembly 15, 43 as described herein and in WO2019/100085 the disclosure of which is incorporated by reference as if fully set forth in its entirety.

Figure 3:
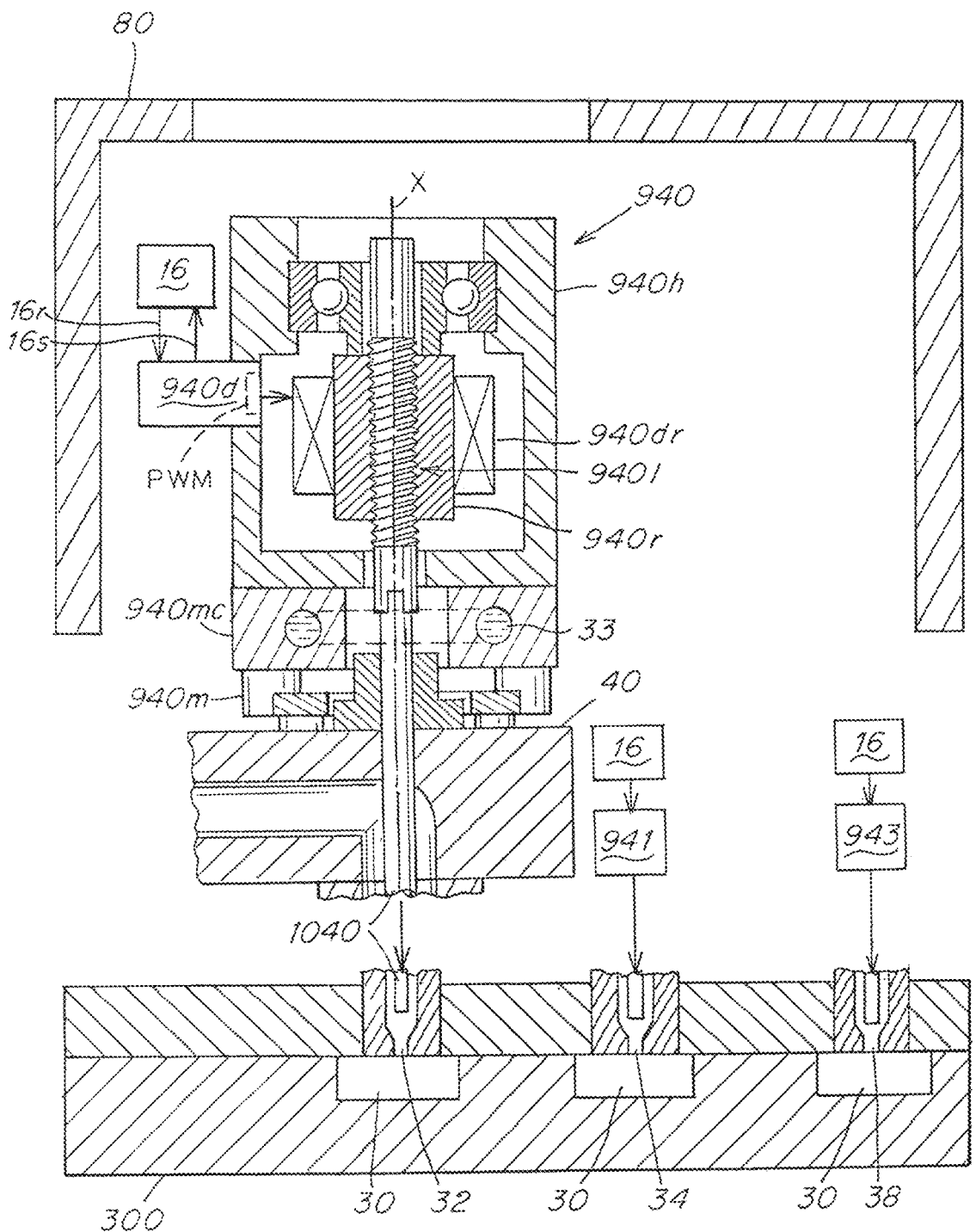
FIG. 3 is a side sectional schematic view of an electric actuator in a apparatus similar to the FIG. 1 apparatus where the actuator (940) has a drive axis Y that is coaxial with the travel axis of the valve pin (1040), the actuator housing (940*h*) being mounted to or on or in close physical proximity to the heated manifold (40) with a cooling device (940*mc*, 940*mc*1, 940*mc*2, 941*mc*, 942*mc*) being disposed between the heated manifold (40) and the actuator housing (940*h*, 941*h*, 942*h*) and the electric drive (940*d*) the cooling device being adapted to substantially isolate or insulate at least the electrical drive (940*d*, 941*d*, 942*d*) from substantial communication with heat emanating or emitted from the heated manifold (40).
Figure 4:
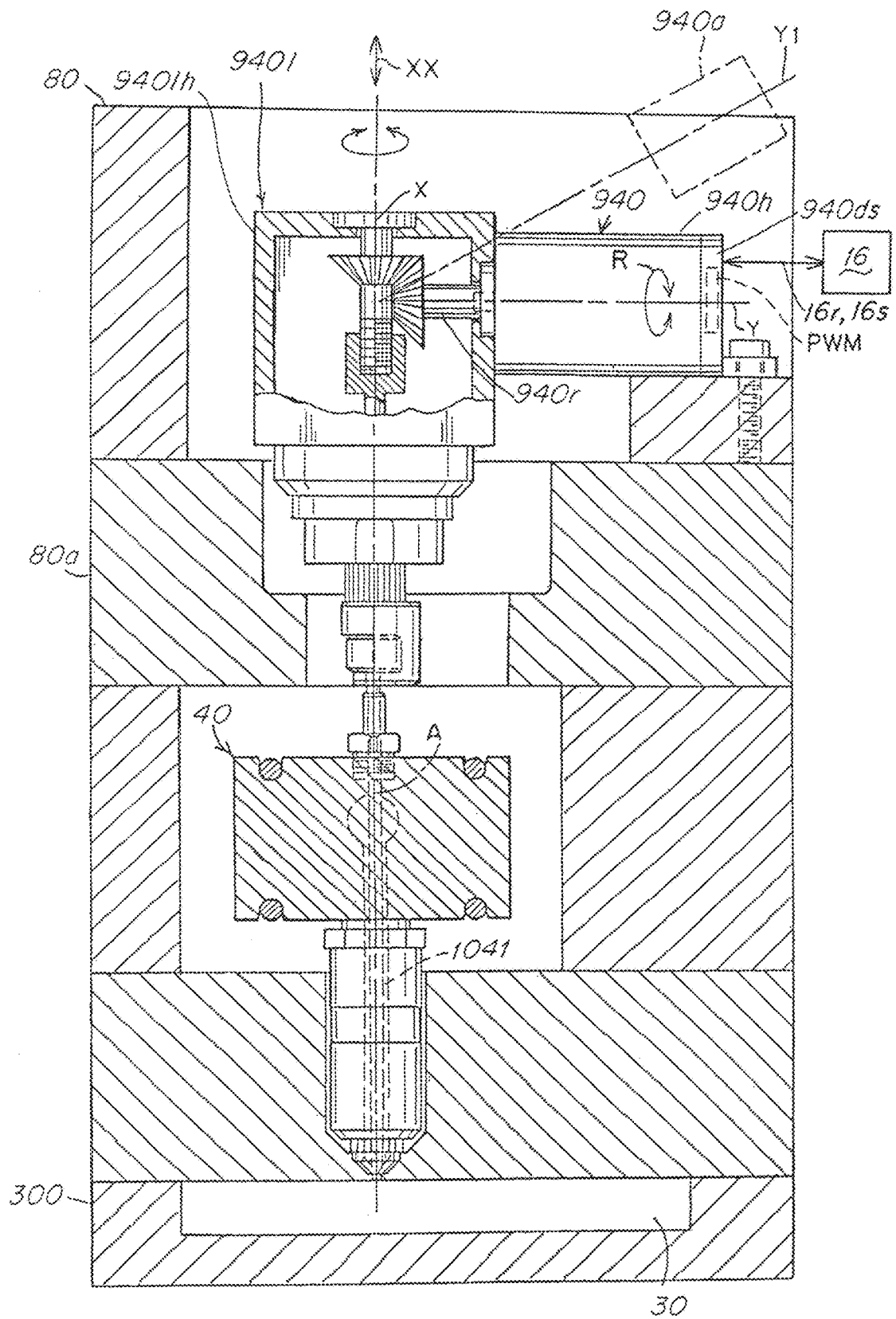
FIG. 4 is a side sectional schematic view of a prior art arrangement of a non coaxial electric actuator without an electric drive where the actuator (940) is mounted on or to a top clamp 80, 80*a* without a cooling device being disposed between the actuator housing 940*h* and the heated manifold 40.
Figure 5:
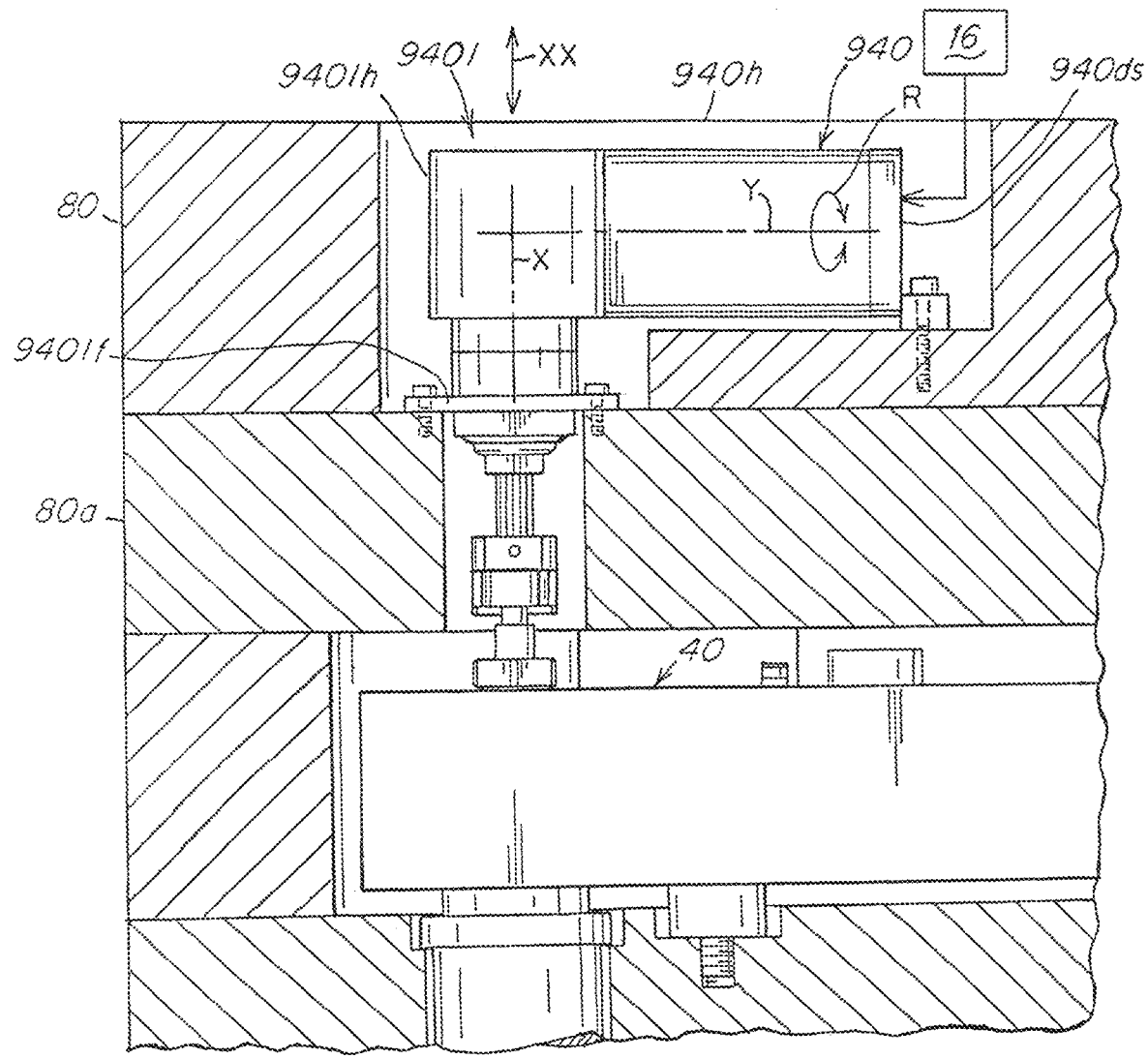
FIG. 5 is a side sectional schematic view of another prior art arrangement of a non coaxial electric actuator without an electric drive where the rotary to linear converter to which the actuator (940) is mounted is mounted on or to a top clamp 80, 80*a* without a cooling device being disposed between the rotary to linear converter 940*l*, 940*lh* or actuator housing 940*h* and the heated manifold 40.

A linear converter 940*l* can alternatively comprise an assembly that converts rotary motion of the rotor to linear motion of the valve pin along the same axis as the rotor such as linear converter 940*l* shown in FIG. 3.

FIG. 3 shows another embodiment of an electric actuator where the actuator (940) has a drive axis Y that is coaxial with the travel axis X of the valve pin (1040), the actuator housing (940*h*) being mounted to or on or in close physical proximity to the heated manifold (40) with a cooling device (940*mc*, 940*mc*1, 940*mc*2, 941*mc*, 942*mc*) being disposed between the heated manifold (40) and the actuator housing (940*h*, 941*h*, 942*h*) and the electric drive (940*d*). In this embodiment, the cooling device is adapted to substantially isolate or insulate at least the electrical drive (940*d*, 941*d*, 942*d*) from substantial communication with heat emanating or emitted from the heated manifold (40). The cooling device is also typically adapted and arranged to isolate or insulate the actuator housing (940*h*) and the rotary to linear converter (940*l*) from substantial communication with heat emanating or emitted from the heated manifold (40).

Linearly driven actuators or linear actuators can alternatively be used in place of rotary electric actuators. One example of a linear actuator that uses electric energy to directly produce linear motion in instead of rotary motion, is a proportional solenoid as shown in FIG. 3A that effects analog positioning of a solenoid plunger or rod 940*ld*, typically a pin driver, as a function of coil current contained in the armature or driver 940*dr*. Another linear actuator alternative is a solenoid or linear motor, FIG. 33, that employs a flux carrying geometry that can produce a high starting force on the plunger, pin driver or rod 940*ld* to cause the plunger, pin driver or rod 940*ld* to be controllably driven along the linear drive axis A. The resulting force (torque) profile as the solenoid progresses through its operational stroke is nearly flat or descends from a high to a lower value. The solenoid can be useful for positioning, stopping midstroke, or for low velocity linear actuation movement of the plunger or rod 940*ld*, especially in a closed loop control system. The proportional concept is more fully described in SAE publication 860759 (1986) the disclosure of which is incorporated by reference in its entirety as if fully set forth herein.

The linear motor, FIG. 3B, produces a linear force along its drive axis A. A typical mode of operation is as in a Lorentz-type actuator, in which applied force is linearly proportional to applied current and magnetic field. Thus a linear actuator 940, FIGS. 3A, 3B, that effects linear driven movement of a rod, pin driver or plunger or equivalent element 940*ld* can be employed as an alternative to a rotary driven electric motor for interconnection to a valve pin 50, 1040 to effect controllable driven linear movement of the valve pin 50, 1040, 1041 along its axis X of reciprocal movement as described hereinabove.

A linear actuator is particularly suited for use in a configuration where the drive axis of the actuator and the pin movement axis X are coaxially arranged A linear actuator as described can be used to drive any pin drive member 940*ld* as an alternative to the rotor based actuators described herein.

Figure 6:
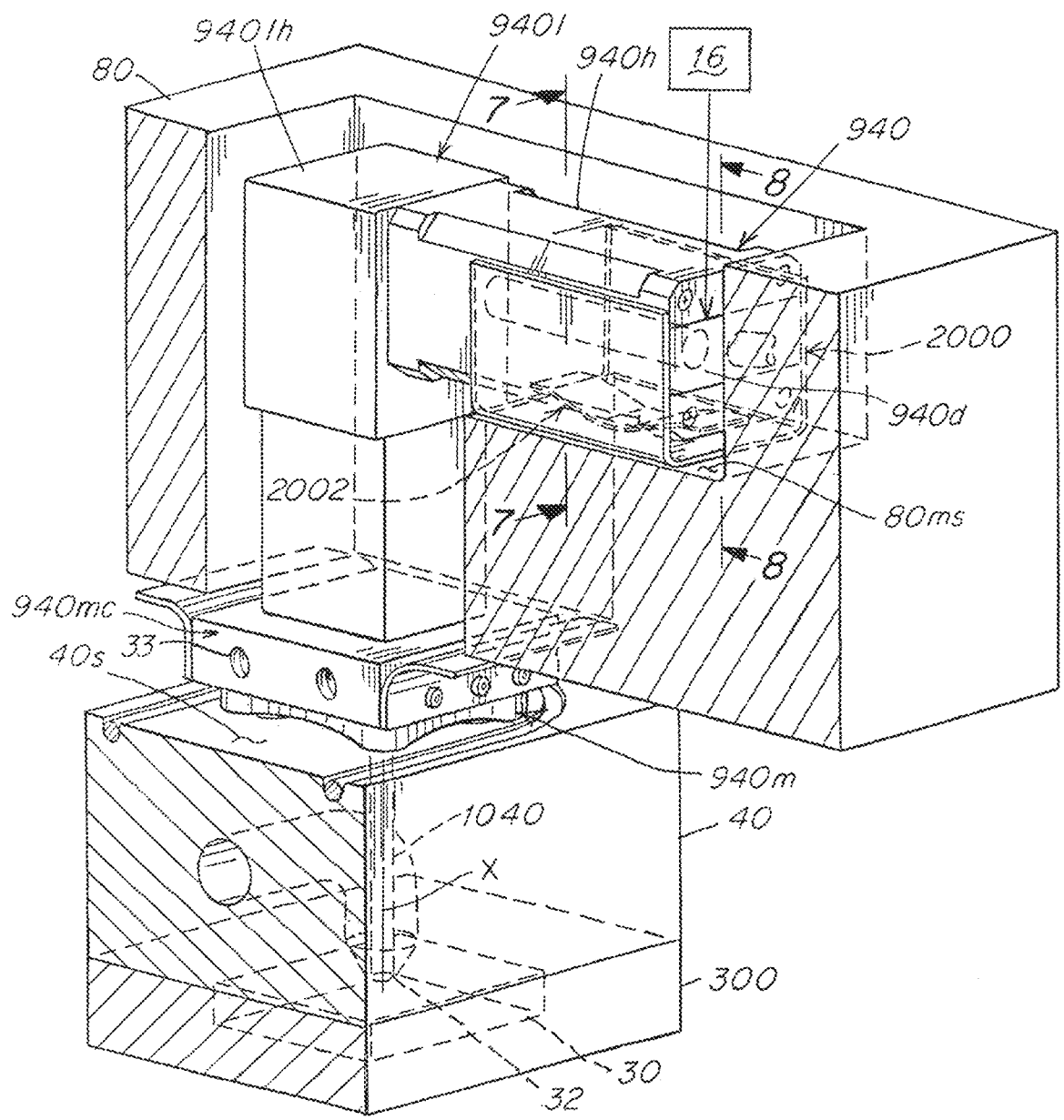
FIG. 6 is a top rear partially sectional perspective view of another electric actuator in an apparatus similar to the FIGS. 1, 2 apparatus where the actuator (940) has a drive axis Y that is arranged non-coaxially relative to the travel axis X of the valve pin (1040), the actuator housing (940*h*) being mounted to, on or in close physical proximity to the heated manifold (40) via mounting of the actuator (940) to a linear travel converter (940*l*, 940*h*) which is in turn mounted on or to or in close physical proximity to a heated manifold (40) with a cooling device (940*mc*, 940*mc*1, 940*mc*2, 941*mc*, 942*mc*) being disposed between the heated manifold (40) and the linear travel converter (940*l*, 940*h*), the actuator housing (940*h*, 941*h*, 942*h*) and the electric drive (940*d*), the cooling device being adapted to substantially isolate or insulate at least the electrical drive (940*d*, 941*d*, 942*d*) from substantial communication with heat emanating or emitted from the heated manifold (40).

FIG. 6 shows another embodiment where the actuator (940) has a drive axis Y that is arranged non-coaxially relative to the travel axis X of the valve pin (1040), the actuator housing (940*h*) being mounted to, on or in close physical proximity to the heated manifold (40) via mounting of the actuator (940) to a linear travel converter (940*l*, 940*h*) which is in turn mounted on or to or in close physical proximity to a heated manifold (40) with a cooling device (940*mc*, 940*mc*1, 940*mc*2, 941*mc*, 942*mc*) being disposed between the heated manifold (40) and the linear travel converter (940*l*, 940*h*), the actuator housing (940*h*, 941*h*, 942*h*) and the electric drive (940*d*). The cooling device is adapted to substantially isolate or insulate at least the electrical drive (940*d*, 941*d*, 942*d*) from substantial communication with heat emanating or emitted from the heated manifold (40). The cooling device is also typically adapted and arranged to isolate or insulate the actuator housing (940*h*) and the rotary to linear converter (940*l*) from substantial communication with heat emanating or emitted from the heated manifold (40).

Figure 7:
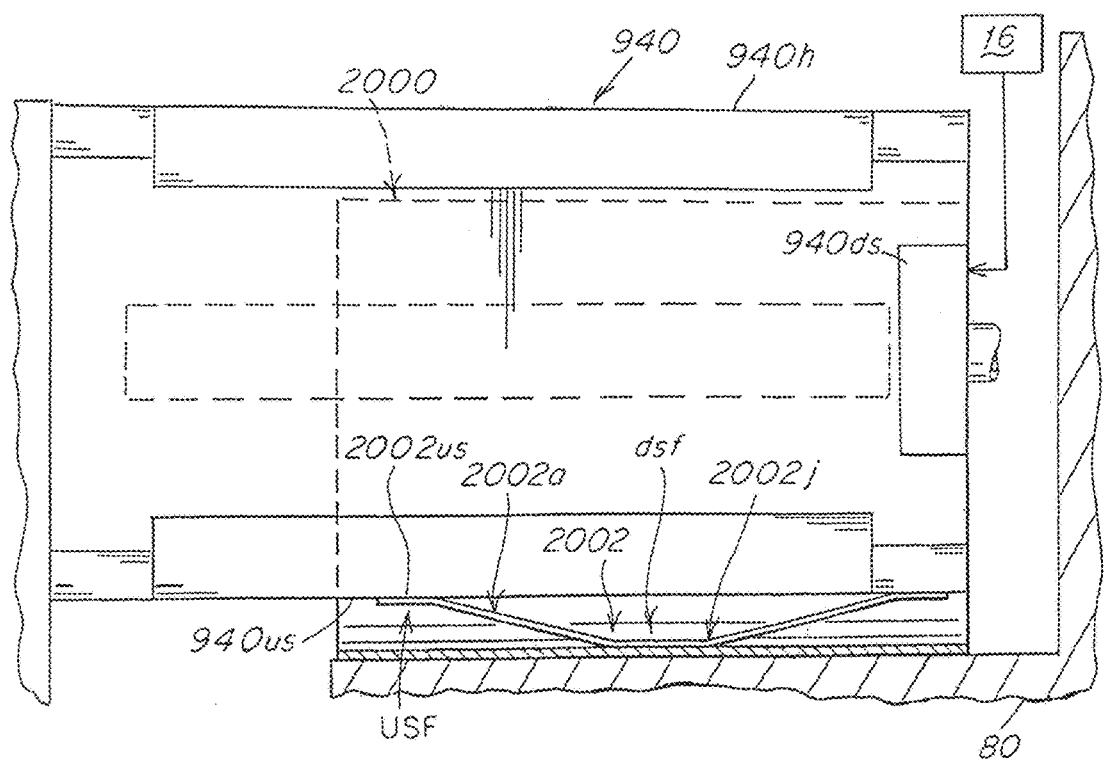
FIG. 7 is a sectional view taken along lines 7-7 of FIG. 6.
Figure 8:
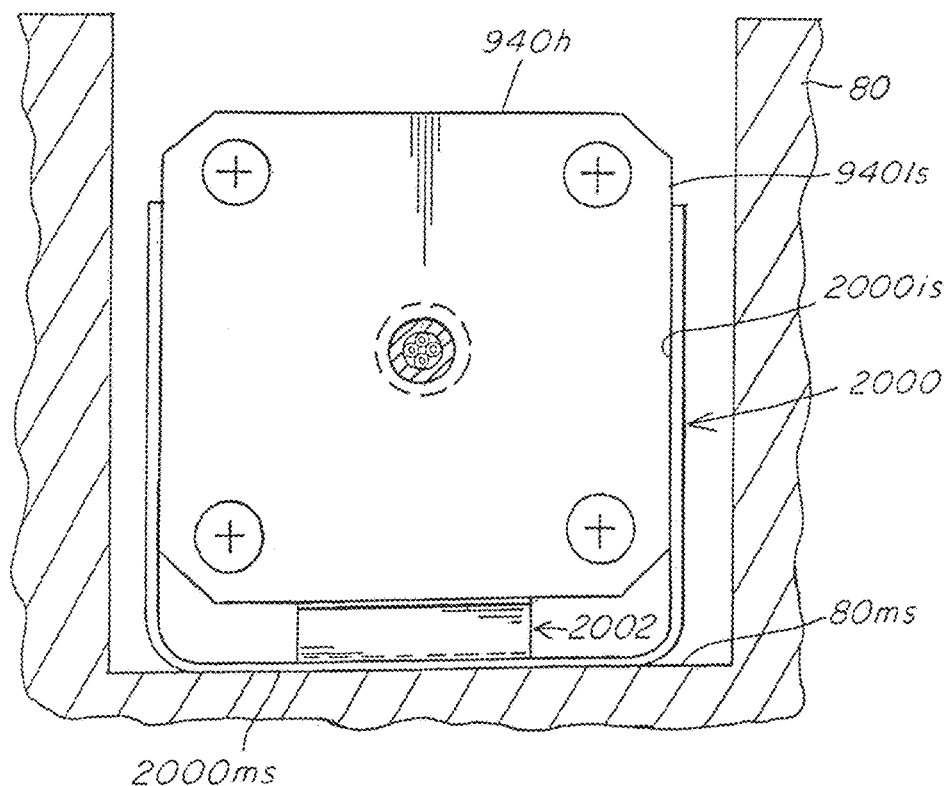
FIG. 8 is a sectional view taken along lines 8-8 of FIG. 6.

The FIG. 6 embodiment includes a passive cooling device comprised of a mount (2000) as shown in FIGS. 7, 8. The mount (2000) is preferably comprised of a thermally conductive material having first (2000*is*) and second (2000*ms*) heat conductive surfaces that are disposed between the clamping plate (80) and the actuator housing (940*h*). A surface (940*ls*) of the actuator housing (940*h*) is mounted in thermal communication or contact with the first heat conductive surface (2000*is*) and a surface (80*ms*) of the clamping plate (80) is mounted in thermal communication or contact with the second conductive surface (2000*ms*). The second conductive surface (2000*ms*) of the mount (20000) is adapted to be urged into compressed (dsf) thermally conductive contact or communication with the surface (80*ms*) of the clamping plate (80).

The mount (2000), FIGS. 6, 7, 8 includes a resiliently compressible spring (2002) disposed between the actuator housing (940*h*) and the clamping plate (80) that is adapted to urge (dsf) the surface (2000*ms*) of the mount (2000) into compressed thermally conductive contact or communication with the surface (80*ms*) of the clamping plate (80).

The spring (2002), FIGS. 6, 7, 8 comprises one or more resiliently compressible arms (2002*a*) that are resiliently bendable 2002*j* and have an actuator engagement surface (2002*us*) adapted to engage a complementary surface (940*us*) of the actuator housing (940*h*). The spring (2002), the mount (2000) and the clamping plate are arranged such that the resiliently compressible arms (2002*a*) bend when the actuator housing (940*h*), mount (2000) and clamping plate (80) are assembled together with the manifold (40) to cause the actuator engagement surface (2002*us*) to compressibly engage (USF) the complementary surface (940*us*) and to urge the surface (2000*ms*) of the mount (2000) into compressed (dsf) thermally conductive contact or communication with the surface (80*ms*) of the clamping plate (80) when the heated manifold (80) is brought to operating temperature.

Figure 9:
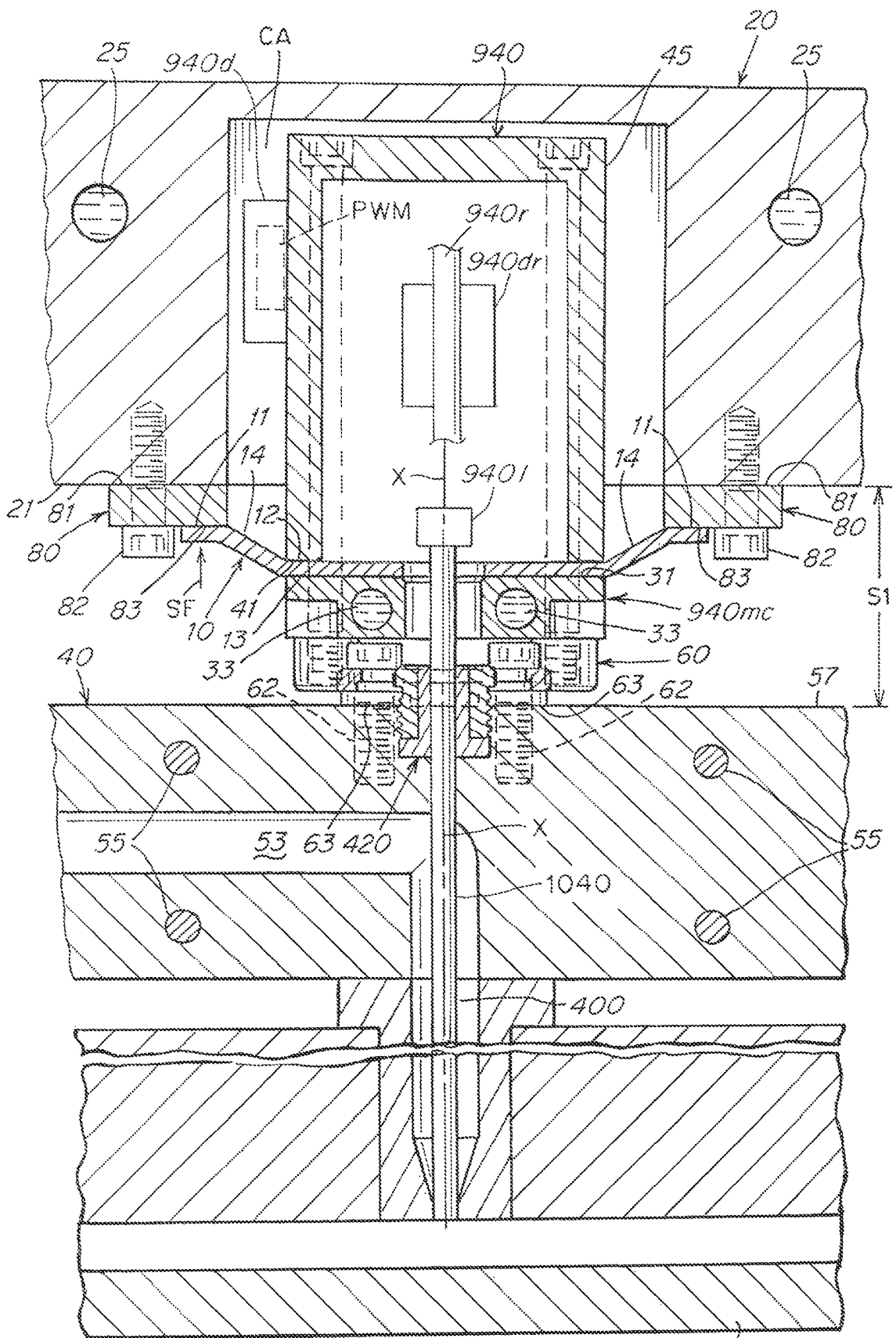
FIG. 9 is a side sectional view of another embodiment having an actuator with the motor rotor 940*r*, 940*dr* coaxial with the valve pin axis X, the actuator being mounted to, on or in close physical proximity to the heated manifold (40) via mounting of the actuator (940) to a cooling device (940*mc*, 940*mc*1, 940*mc*2, 941*mc*, 942*mc*) with the cooling device being disposed between the heated manifold (40) and the actuator housing (940*h*, 941*h*, 942*h*) and the electric drive (940*d*), the cooling device being adapted to substantially isolate or insulate at least the electrical drive (940*d*, 941*d*, 942*d*) from substantial communication with heat emanating or emitted from the heated manifold (40), the actuator being further mounted in a passive cooling engagement and arrangement with the top clamp plate 20 via a highly heat conductive plate 10 having wings 14 with engagement surfaces 11 for engaging the top clamp plate which itself is cool relative to the manifold 40.
Figure 10:
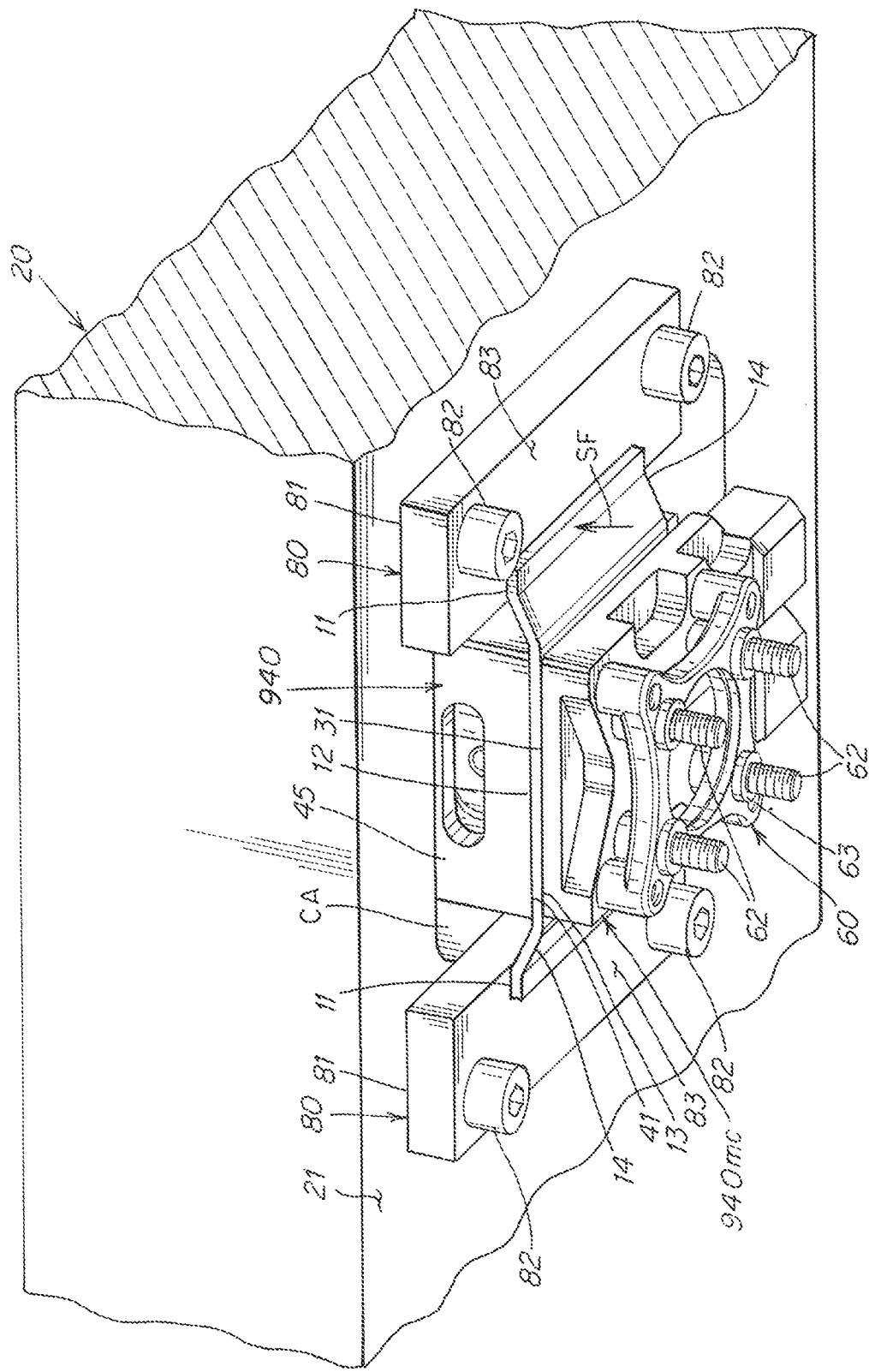
FIG. 10 is a closeup perspective view of the passive cooling device and cooling device 940*mc* shown in FIG. 9.

In the FIGS. 9, 10 embodiment a bottom surface 41 of the body 45 of the actuator 40 is mounted in thermally conductive contact with a top surface 12 of the highly thermally conductive cooling or mounting plate 10. The bottom or downstream surface 13 of the cooling or mount plate 10 is in turn mounted in compressed contact with the top or upstream facing surface 31 of highly thermally conductive metal cooling block 30. The cooling block 940*mc* is proactively cooled with water pumped through cooling channels 33 during active operation of the entire apparatus. As shown the cooling block is mounted on a mount 60 the bottom surfaces 63 of which are mounted in direct contact with the top surface 57 of the heated hotrunner 40. During operation of the apparatus, the cooled cooling block 940*mc* serves to maintain the actuator 40 cool and/or relatively insulated from the heated manifold 40. In the embodiment shown in the Figures, the cooling block 30 is mounted on the intermediate mount 60 which itself is mounted in engagement contact with the body or top surface 57 of the heated manifold 50 via bolts 62. Heat from the heated manifold 50 is thus thermally conducted or transferred through the bolts 62 and through the mount 60, block 30 and mount 10 to the actuator 40.

As shown in FIGS. 9, 10, the highly thermally conductive cooling mount 10 has lateral extensions or wings 14 that are configured and arranged to have an upper or upstream facing surface(s) 11 that make compressed contact with a lower surface 21 of the cooled clamp plate 20 thus enabling heat that may otherwise flow from the manifold 50 to/through the cooling block 30 and the plate 10 and the actuator 40 to be conductively transferred to the cooled clamp plate 20. Once the actuator 40 together with winged cooling plate 10 and in the position shown in FIGS. 1-9 on cooling device 30 and mount 60 onto surface 57, the rest of the system is assembled and arranged such that the clamp plate 20 is mounted a spaced distance S upstream of the heated manifold 50. The actuator 40 and its associated components plate 30 and mount 60 collectively have a mounting height AH extending upstream from the surface 57 of the heated manifold 50. The receiving cavity 20 of the clamp plate 20 has a receiving depth CH of sufficient size together with space S to accommodate receipt of the mounting height AH of the assembly of the actuator 40, plates 100, and cooling device 30.

Thus in the FIGS. 9, 10 embodiment, some portion of the heat that is conducted to the body of the actuator 40 from the heated manifold 40 is re-routed or conducted to the wings 14 via heat conductive engagement of the surfaces 13 and 31. Such heat that is conducted to the wings 14 is in turn conducted to the clamp plate surface 21 via engagement with the spring-loaded heat conductive surface 11, the clamp plate 20 acting as a heat sink to help lower the temperature of the body 45 of the actuator 40.

As shown the system is adapted and arranged so that when assembled, the clamp plate 20 is thermally isolated from the heated manifold by an insulating air space S by which the clamp plate 20 is spaced apart from the upstream surface 57 of the manifold 50. Typically, the clamp plate 20 is maintained in such a thermally isolated position relative to the manifold 50, the clamp plate having little to no direct thermally conductive contact with the manifold 50 other than incidentally through a less than about 2 inch square area of contact that may exist between a spacer 48 and the clamp plate 20 and between the spacer 48 and the manifold 50, the spacer 48 being disposed between the clamp plate 20 and the manifold for purposes of ensuring proper positioning of the manifold 50 relative to the clamp plate 20. The clamp plate 20 is typically cooled with a cooling fluid pumped and flowing through cooling channels 25 in the body of the clamp plate 20. Thus, thermally conductive direct contact between the surfaces 11 and the clamp plate surface 21 enable heat to transfer from the body 45 of the actuator 40 to the clamp plate 20, the heat being readily dissipated by the cooled clamp plate 20.

The winged cooling plate 10 is comprised of a highly thermally conductive material. The cooling plate assembly 10, 30, 60 has an assembled height ASH when mounted to the manifold surface 57 that extends from the downstream-most mounting surface 63 of the mount 60 to the upstream facing engagement surface 11 of the wings 14 of the cooling plate 10, FIGS. 4-6. The length of the spacing distance S is predetermined relative to the assembled height ASH such that when the components of the system including the clamp plate 20 and manifold 50 are assembled and connected together with the mold 300, the upstream facing surfaces 11 of the wings 14 engage the downstream facing surface 21 of the clamp plate 20 under a selected amount of compression created by the downstream bending of wings 14 resulting in upward spring force SF being exerted by wings 14 urging surfaces 11 in an upstream direction into compressed engagement with surface 21 of cooled clamp plate 20. Thus the system is adapted to have an assembled configuration where on assembly together of the clamp plate 20, mold 300, manifold 50, actuator 40 and mount 10, the spring force in the wings 14 is loaded thus urging the surfaces 11 into thermally conductive compressed engagement with the surface 21.

The compressed contact between thermally conductive metal surfaces 11 and 21 enables heat flow between the bodies 10, 20 having the metal surfaces.

The cooling device 30 is typically cooled to less than about 100 degrees Fahrenheit and is actively cooled by water injection flow during an injection cycle. When the injection molding machine 70 is shut down, all of the other components of the apparatus including the cooling device are also typically shut down causing the actuator 40 to be more prone and subject to being heated up by the manifold 50. The manifold 50 is very large in size and mass and thus takes a longer time to cool down on shutting the apparatus down. Thus immediately after shut down of the apparatus, the cooling block 30 is not proactively working to maintain the actuator 40 cool while the manifold 50 simultaneously remains at a very high temperature thus causing elevated heat transfer from the manifold 50 through the mount 60 and the block 30 to the actuator 40. The thermally conductive plate-mount 10 serves to divert the manifold heat via the wings 14 to the relatively cool clamp plate 20 which is itself a very large mass of material which is not easily heated up by the hot manifold on shut down. The thermally conductive mount 10 thus essentially cools the actuator 40 or at least works to minimize or lessen the amount of heat transfer from the manifold 50 to the actuator 40 without active cooling by the cooling device 30.

In the embodiment shown in FIGS. 9, 10, a spacer 80 is compressibly connected to selected position on the downstream facing surface 21 of the clamp plate 20 such that the upstream facing surface 11 of the wings 14 engage a downstream facing surface 83 of the spacers 80 rather than directly to the clamp plate surface 21. The spacers 80 are comprised of a highly thermally conductive material so that heat conducts readily from the wings 14 to the spacers 80 and in turn from the spacers to the clamp plate body 20. The spacers 80 can be employed to increase the size of the insulating air space S1 or for otherwise accommodating thickness, height or other size variations in the components 10, 30, 60 or other components that may be employed to assemble and mount the cooling plate 10. As in the FIGS. 1-7 embodiment, the size, depth and height of the various components of the system shown in FIGS. 8, 9 are preselected such that when the components of the system are all assembled, in particular when the clamp plate 20 and manifold are mounted to the mold 300 and the spacers 48 and 80 are assembled and connected to the clamp plate 20, the upstream facing surfaces 11 of the wings 14 engage the downstream facing surface 83 of the spacers 80 under a selected amount of compression created by the downstream bending of wings 14 resulting in upward spring force SF being exerted by wings 14 urging surfaces 11 in an upstream direction into compressed engagement with surfaces 83 of spacers 80. As in other embodiments, the clamp plate 20 is preferably thermally isolated from the heated manifold 50.

Figure 11:
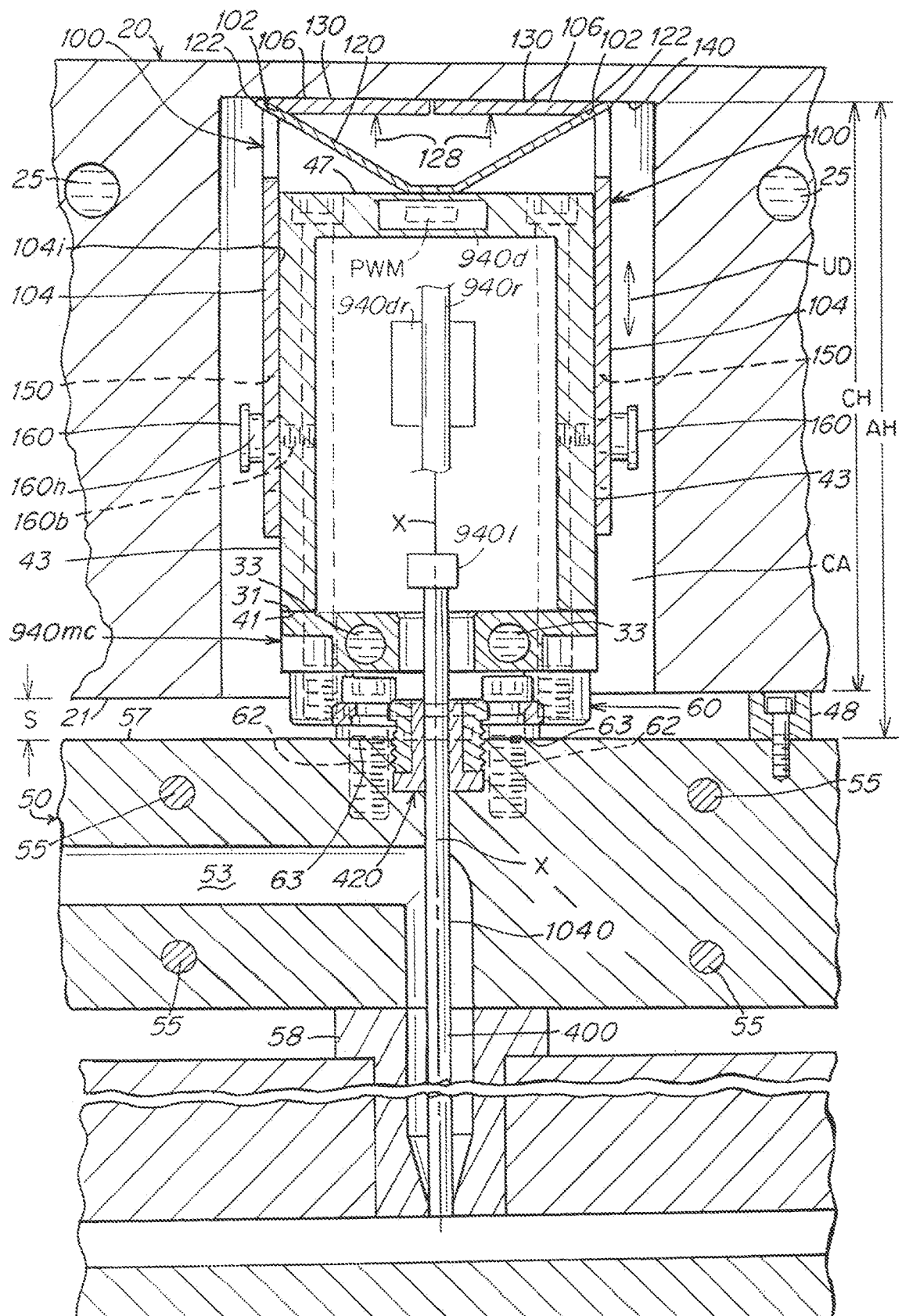
FIG. 11 is a side sectional view of another embodiment having an actuator with the motor rotor 940*r*, 940*dr* coaxial with the valve pin axis X, the actuator housing being mounted to, on or in close physical proximity to the heated manifold (40) via mounting of the actuator (940) to a cooling device (940*mc*, 940*mc*1, 940*mc*2, 941*mc*, 942*mc*) with the cooling device being disposed between the heated manifold (40) and the actuator housing (940*h*, 941*h*, 942*h*) and the electric drive (940*d*), the cooling device being adapted to substantially isolate or insulate at least the electrical drive (940*d*, 941*d*, 942*d*) from substantial communication with heat emanating or emitted from the heated manifold (40), the actuator being further mounted in a passive cooling engagement and arrangement with the top clamp plate 20 via a highly heat conductive flanged metal plate or device 100 having side and end engagement surfaces 104*i*, 130 for engaging a surface 43 of the actuator housing and also engaging a surface 140 of the top clamp plate 20 which itself is cool relative to the manifold 40.
Figure 12:
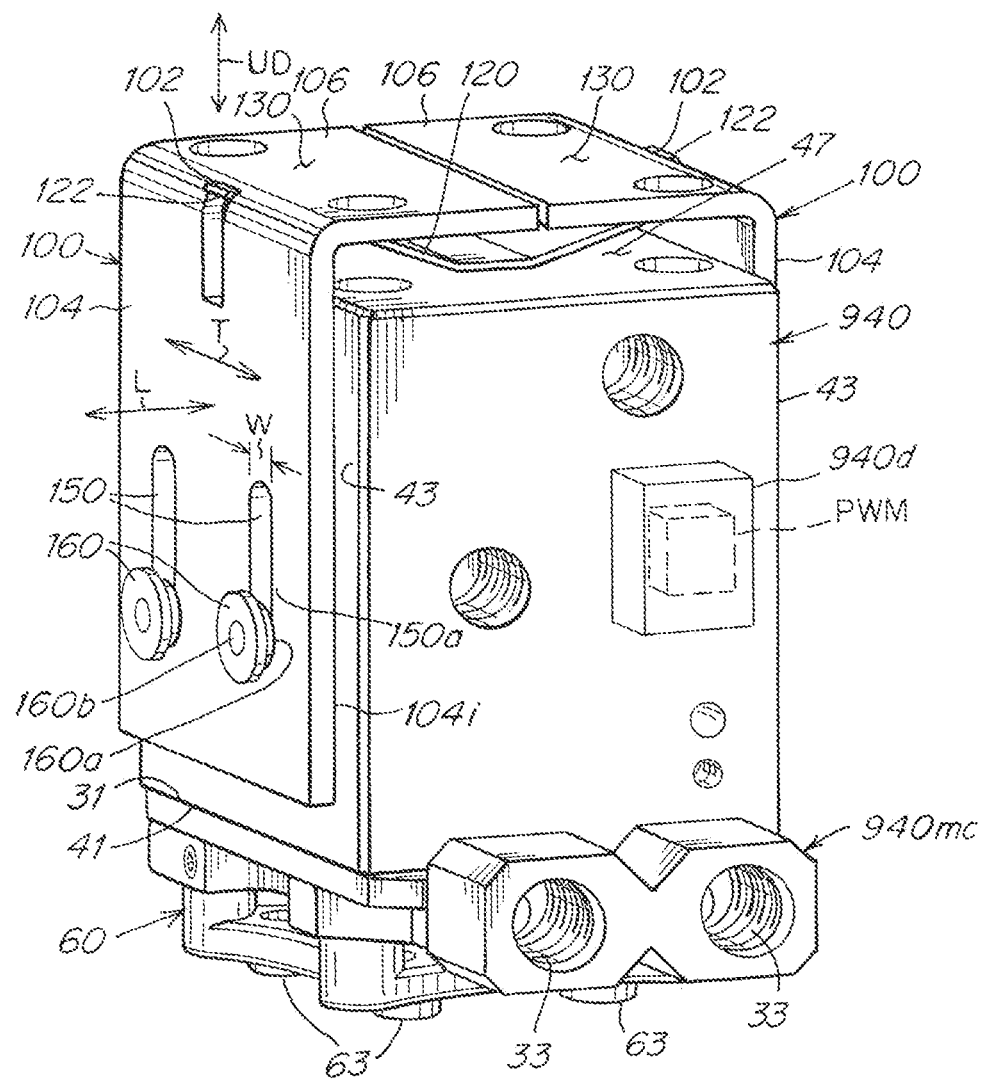
FIG. 12 is a front perspective view of the assembly shown in FIG. 11.

In an alternative embodiment shown in FIGS. 11, 12 the actuator 940 is mounted to the manifold 40, separated from direct contact with the manifold 40 by the cooling device 30 and the mount 60 for the cooling device. The FIGS. 11, 12 apparatus has cooling or heat deflector plates 100 which are flanged as shown. The plates 100 have one or more slots 150 that slidably receive projections 160 from a sidewall 43 of the actuator 40 such that the plates 150 can be slid or moved in an upstream or downstream direction 180 relative to the actuator 40. The projections 160 comprise a bolt 160*b* that extends laterally through the slots 150, the bolts having a diameter that is complementary to the width W of the slots 150 so that the plate 100 is prevented from travelling in front to back direction T and is slidable in an up and down direction UD. The projections 160 preferably have a head portion 160*h* having a diameter that is wider than the width W of the slot 150, the head portion 160*h* having an inwardly facing surface 160*a* that engages the outwardly facing edge surfaces 150*a* of the slots 150 thus preventing the plates 100 from moving in a lateral direction L away from the outside lateral surface 43 of the body of the actuator 40. As shown, the bolts 160*b* are screwed and secured a selected distance into the depth of the body of the actuator 40 as shown in FIG. 10 so as to stably position the projections 160 and the head 160*h* and inwardly facing surface 160*a* relative to the the side edges 150*a* of the slots 150 such the inside surfaces 104*i* of the sides 104 of the plates 100 are held in engaged contact with the outside surface 43 of the actuator 40.

The inside surfaces 104*i* that are engaged with the outside surface 43 of the actuator are thus in heat conductive contact with the sidewall 43 or other outside surface of the actuator 40 as may alternatively be selected for engagement of the plates 100 therewith. As shown, the plates 100 have a top flanged portion 106 that extends and is disposed between a top end surface 47 of the actuator 40 and a downstream facing surface 140 of the top clamp plate 20. The top flanged portion 106 of the cooling or deflector plates 100 have a top or upstream facing surface 130 that is urged by spring force 128 of spring 120 into engagement and heat conductive contact with the downstream facing surface 140 of the top clamp plate. A plate or leaf spring 120 is disposed in engagement with the top surface 47 of the actuator 40.

The leaf spring 120 is configured and arranged having a pair of laterally extending arms 120 having terminal ends 122 that engage with a pair of receiving or bearing surfaces 102 of the plate(s) 100.

As shown in FIGS. 11, 12 the ends 122 of the spring 120 engage with the plates at about the area of the bend in the plates 100 that forms the flange. When the arms 120 of the springs are compressed, the ends 122 of the arms exert an upstream directed spring force 128 against the plates 100 that urges the upstream facing surfaces 130 of the plates 100 into heat conductive engagement with the downstream facing surface 140 of the top clamp plate.

In such an alternative embodiment, heat that is conducted to the body of the actuator 940 from the heated manifold 40 is re-routed or conducted to the side portions 104 of the plates 100 via heat conductive engagement of the inside surfaces 104*i* of the sides 104 with the outside surfaces 43 of the actuator 940. Such heat that is conducted to the side portions 104 is in turn conducted to the top portions 106 which is in turn conducted to the body of the clamp plate 20 via the spring-loaded 128 heat conductive contact between the top surface 130 of the top portions 106 with the surface 140 of the top clamp plate 20.

As shown in FIGS. 11, 12 the body of the actuator 940 is mounted directly on and in heat conductive engagement with the cooling block 940*mc*. The actuator 940 in combination with the cooling plates 100 and cooling device is mounted and secured via bolts 62 onto the upstream facing surface 57 of the heated manifold 40. As shown the actuator 940 and associated components have a certain height AH that they extend upstream from the surface 57. Once the actuator 40 together with its accompanying plates 100 and spring 120 has been mounted in the position shown in FIGS. 10, 11 on cooling device 30 and surface 57, the rest of the system is assembled such that the clamp plate 20 is mounted a spaced distance S upstream of the heated manifold 50. The mounting height AH of the assembly of the actuator 40, plates 100, and cooling device 30 and the depth CH of the receiving aperture CA in the clamp plate 20 are preselected so that when the components of the system including the clamp plate 20 and manifold 50 are assembled and connected together with the mold 300, the upstream facing surface 130 of the plates 100 engage the downstream facing surface 140 of the clamp plate 20 under compression created by compression of springs 120 resulting in the spring force 128 urging surface 130 in an upstream direction into compressed engagement with surface 140.

When the system is assembled as described with the upstream surface 130 of the plates engaging the downstream surface 140 of the clamp plate under compression 128, the inside surfaces 104*i* of the plates 100 are free to slide upstream and downstream UD against the outside surface 43 of the actuator 40, the plates themselves being free to slide upstream and downstream UD to accommodate any changes in the distance AH that can or may occur as a result of expansion or contraction of the length, width or depth of the manifold 50, plates 30, 60 or 20 or the actuator body 40 or other components of the system when the assembled system is raised to elevated operating temperature or lowered from operating temperature to room temperature.

As shown in FIGS. 11, 12 the system is adapted and arranged so that when assembled, the clamp plate 20 is thermally isolated from the heated manifold by an insulating space S by which the clamp plate is spaced apart from the manifold 40. The insulating space S results from the preselection of the actuator height AH relative to the cavity height CH where the spring force 128 occurs on assembly of the clamp plate 20 together with the mold 300 and manifold 50. Typically, the clamp plate 20 is isolated from and mounted to either or both the mold 300 and manifold 50 such that the clamp plate 20 is maintained in a thermally isolated position relative to the manifold 50 spaced by S, the clamp plate having little to no direct thermally conductive contact with the manifold 50 other than incidentally through a less than about 2 inch square area of contact that may exist between a spacer 48 or other component and the clamp plate 20, the spacer 48 being in similar conductive contact with the manifold 50. The spacer 48 is disposed between the clamp plate 20 and the manifold 50 for purposes of ensuring the proper positioning of the manifold 50 relative to the clamp plate 20. The clamp plate 20 may alternatively be mounted to the mold 300 without conductive contact with the manifold 50 such that insulating space S is maintained.

The clamp plate 20 is typically cooled with a cooling fluid disposed and flowing through cooling channels 25 in the body of the clamp plate 20. Thus, thermally conductive direct contact between the slidable plates 100 and the clamp plate 20 enable heat to transfer from the body of the actuator 40 to the clamp plate, the heat being readily dissipated by the cooled clamp plate 20.

As shown in FIGS. 11, 12 the downstream facing surfaces 60*a* of a downstream mount 60 for the cooling device 940*mc* are mounted in compressed contact with the top surface 57 of the manifold 40 when the system is fully assembled. The cooling block 940*mc* is proactively cooled with water pumped through cooling channels 33 during active operation of the entire apparatus. During operation of the apparatus, the cooled cooling block 940*mc* serves to maintain the actuator 40 cool and/or relatively insulated from the heated manifold 40. In the embodiment shown, the cooling block 940*mc* is mounted on an intermediate mount 60 which itself is mounted in engagement contact with the body or upstream facing surface 57 of the heated manifold 50 via bolts 62. Heat from the heated manifold 50 is thus thermally conducted or transferred to the actuator 40 through the bolts 62, mount 60 and block 30.

In all embodiments of the invention, the mold 300 is preferably also thermally isolated from the manifold, there being on incidental contact between certain components such as an injection nozzle with both the manifold and the mold.

FIG. 15 shows an embodiment where electric actuators with electric drive 940*d* are mounted in an extended spaced apart relationship relative to the heated manifold such that the actuator and electric drive 940*d* are isolated or insulated from significant heat communication with the heated manifold 60. In the embodiment shown the actuator and electric drive are mounted to a cool or cooled top clamp plate and are interconnected to a rotary to linear drive converter device, the linear drive converter device also being mounted to the top clamp plate.

FIG. 16 shows another embodiment where electric actuators with electric drive 940*d* are mounted in an extended spaced apart relationship relative to the heated manifold such that the actuator and electric drive 940*d* are isolated or insulated from substantial or significant heat communication with the heated manifold 60. In the embodiment shown the actuator and electric drive are mounted to a cool or cooled top clamp plate 140 and are interconnected to a rotary to linear drive converter device, the linear drive converter device also being mounted to the top clamp plate.

As shown in the FIGS. 15, 16 embodiments, the axis of the rotor and the axis of travel of the valve pin are non coaxially arranged with a rotary to linear converter 40 arranged to convert rotary motion of the motor shaft to linear motion of the valve pin along a different axis from the axis of the motor rotor or shaft.

FIG. 15 shows a generic system or apparatus 5 comprising an injection molding machine IMM that feeds a selected fluid 9 into an inlet 9*a* that in turns feeds into a distribution channel 120 of a heated manifold 60. As shown the manifold is disposed between an upstream mounted top clamp plate 140 and a downstream mounted mold 70 that forms a cavity 80 in which the part to be molded is formed from injection fluid 9 that is routed into the cavity via downstream gate 110 that communicates with nozzle channel 130 in which valve pin 100 is disposed for controlled upstream and downstream reciprocal movement along linear axis A between gate open and gate closed positions, the gate open position shown in FIG. 1 with respect to nozzle 132 and the gate open position shown with respect to nozzle 134. As shown the valve 50 comprises an electrically powered actuator 200 having, typically an electric motor having a rotor 12 rotatably driven by an electrically powered coil such as disclosed in U.S. Pat. No. 6,294,122 the disclosure of which is incorporated by reference as if fully set forth herein. The valve 50 includes a rigid, typically comprised of metal such as steel, elongated shaft 20 that is coupled to the rotating rotor 12 via coupling 15 at an upstream end 22 of the shaft 20 and a rotary to linear converter 40 that is coupled to a downstream end 24 of the elongated shaft 20 by coupling 30 such as a universal joint. The elongated and rigid configuration of the shaft 20 is selected so that the motor 200 and rotor 12 is necessarily disposed and mounted in a location or position that is isolated or insulated from transmission of heat from the heated manifold 60. The shaft 20 is selected to be comprised of a rigid metal material so that energy and torque force R2*s* derived from driven rotation R2 of the shaft 20 is reliably transmitted from the remotely mounted motor 200 to the rotary to linear converter assembly 40. The converter 40 comprises a housing 40*h* that houses a rotary to linear device. In the embodiment shown in FIG. 1, the rotary to linear device comprises a bevel gear 42*g* that has a gear shaft 42 coupled to the elongated shaft 20 and mounted to housing 40*h* by bearings 42*b* for rotation R2 in unison with the shaft 20, rotation R2 of the gear shaft 42 in turn drivably rotates the bevel gear 42*g*. Bevel gear 42*g* is meshed with complementary bevel gear 44*g* that is rotatably mounted to the housing 40*h* via screw shaft 44 that is rotatably mounted to housing 40*h* via bearings 44*b*. As shown, the bevel gears 42*g*, 44*g* and their respective shafts 42, 44 are configured and arranged to transmit rotation around elongated shaft axis DA to a valve pin drive axis A that is non coaxial with axis DA. Driven rotation of bevel gear 42*g* results in driven rotation of screw shaft 44 that is screwably engaged with linearly travelling nut 26 which is in turn coupled to the head 100*h* of valve pin 100. Thus driven rotation of screw shaft 44 results in rotation of screw threads 44*s* that in turn results in linear driven movement along axis A of nut 26 and its interconnected valve pin 100. When the system 5 is assembled and the heated manifold 60 is heated to a typical high operating temperature, the manifold 60 body will tend to physically expand in size thus causing translational movement of the body of the manifold 60 relative to the top clamp plate 140 and the mold body 70. Similarly components of the valve assembly such as the converter housing 40*h* and valve pin 100 that may be mounted to the heated manifold will translationally move in several directions such as laterally LS, axially AS and from front to back FBS, FIG. 8, namely in a direction in and out of the page as shown in FIGS. 4-7, while the motor 200 is stationarily mounted on the top clamp plate 140 or to another stationary structure of the system 5. To accommodate such in and out or front to back FBS movement, the joints 15, 30 are adapted to enable the shaft 20 to pivot in or along the FBS direction or axis together with movement of the housing 40 or motor 200 along the same FBS direction or axis. Joints 15, 30 that comprise a universal joint comprised of hinges such as hinges 15*h*1, 15*h*2 that may be pivotably connected to each other by a cross shaft 15*cs*. The cross shaft 15*cs* connections connects the hinge such that the two hinges 15*h*1, 15*h*2 can co rotate with each other along their respective rotational axes and simultaneously also to pivot in the FBS axis or direction relative to each other around the axis of the connecting cross shaft 15*cs* while still continuing to co rotate when the rigid shaft 20 is being rotatably driven. Thus any components that may be mounted to the manifold 60 such as the converter housing 40 or valve pin 100 may translationally move relative to the motor 200 when the system is brought to operating temperature.

Couplings 15, 30 can comprise any flexible connection mechanism or connector such as a spline, socket, universal joint or other flexible coupling. The flexible connection mechanism or connector 15, 30 further enables and accommodates translational movement of the converter housing 40*h* relative to the top clamp plate 140 and motor 200 in the axial direction AS and in a front to back, in and out or radial direction such axial and front to back movement occurring also when the heated manifold 60 expands upon being heated up to a typical high operating temperature. Where the connectors comprise universal joints, the hinges of the joints 15, 30 such as hinges 15*h*1, 15*h*2 enable and accommodate such axial and front to back movement by being typically pivotably connected to each other by a cross shaft 15*cs*. The cross shaft 15*cs* connections connects the hinge such that the two hinges 15*h*1, 15*h*2 can co rotate with each other along their respective rotational axes and also to pivot relative to each other around the axis of the connecting cross shaft 15*cs* while still continuing to co rotate when the rigid shaft 20 is being rotatably driven.

FIG. 16 shows an alternative embodiment of the FIG. 15 embodiment where the electrically powered actuator 200 is mounted on side surface 140*ss* of the top clamp plate 140 and the elongated shaft 20 and converter 40 are mounted within apertures or channels 140*us*, 140*uc* formed on the interior or underside of the top clamp plate. Again, the top clamp plate 140 is typically cooled via water that flows through cooling channels 145 bored within the top clamp plate 140. In the FIG. 5 embodiment, the converter 40 is mounted to the heated manifold 60 via bolts 58 and springs 56. The bolts 58 cause the converter housing 40*h* and its interconnected valve pin 100 to travel radially R together with radial expansion or travel of the heated manifold thus minimizing the necessity for prevention of pin decoupling or pin deformation due to radial expansion of the heated manifold 60. The springs 56 are resiliently compressibly engaged between an upstream surface 60*u* of the manifold 60 and a downstream surface 40*hd* of the housing 40*h* to cause an upstream facing heat conductive surface 40*s* of the housing 40 to compressibly engage with a downstream facing heat conductive surface 140*s* of the cooled top clamp plate thus working to cause heat from the manifold 60 that is transmitted to housing 40 to be transmitted from housing 40 to the cooled top clamp plate 140 thus cooling the converter housing 40 and the converter components 40*c* generally.

Figure 17:
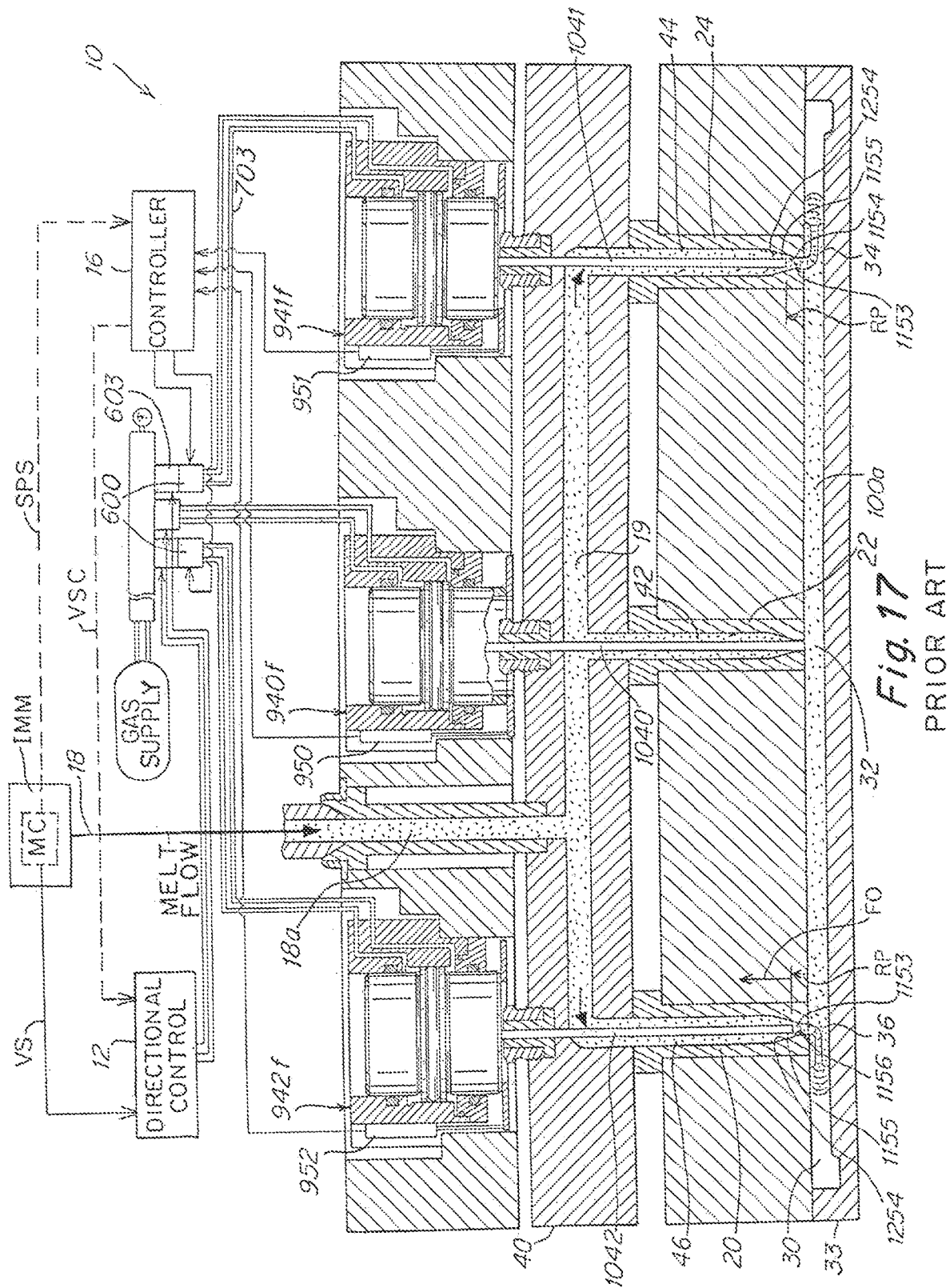
FIG. 17 is a side schematic view of a prior art injection molding apparatus in which an injection molding machine (IMM) includes a stock or standard IMM controller or signal generator that sends a standard IMM controller signal to the solenoid of a directional flow control valve that directs the position of the valve to move between a valve gate closed and valve gate open position.

FIG. 17 shows a conventional prior art pneumatically (or hydraulically) driven apparatus 10 with a central nozzle 22 feeding molten material 18 from an injection molding machine IMM through a main inlet 18*a* to a distribution channel 19 of a manifold 40. The IMM typically comprises a barrel (not shown) and a controllably rotatably drivable or driven screw BS that initiates and ends an injection cycle at selected points in time when the screw BS is rotatably driven to generate flow of injection fluid 18. The beginning of an injection cycle is typically defined at a selected point in time when the screw BS is initially rotated from a standstill position or at a time that occurs shortly after the time when the screw BS is initially begun rotating. The end of the cycle is typically defined by a time at which the screw BS is stopped from rotating following and after the selected time that defines the beginning of the cycle when the screw BS is drivably rotated. The distribution channel 19 commonly feeds three separate nozzles 20, 22, 24 which all commonly feed into a common cavity 30 of a mold 300. One of the nozzles 22 is controlled by fluid driven actuator 940*f* and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

Figure 18:
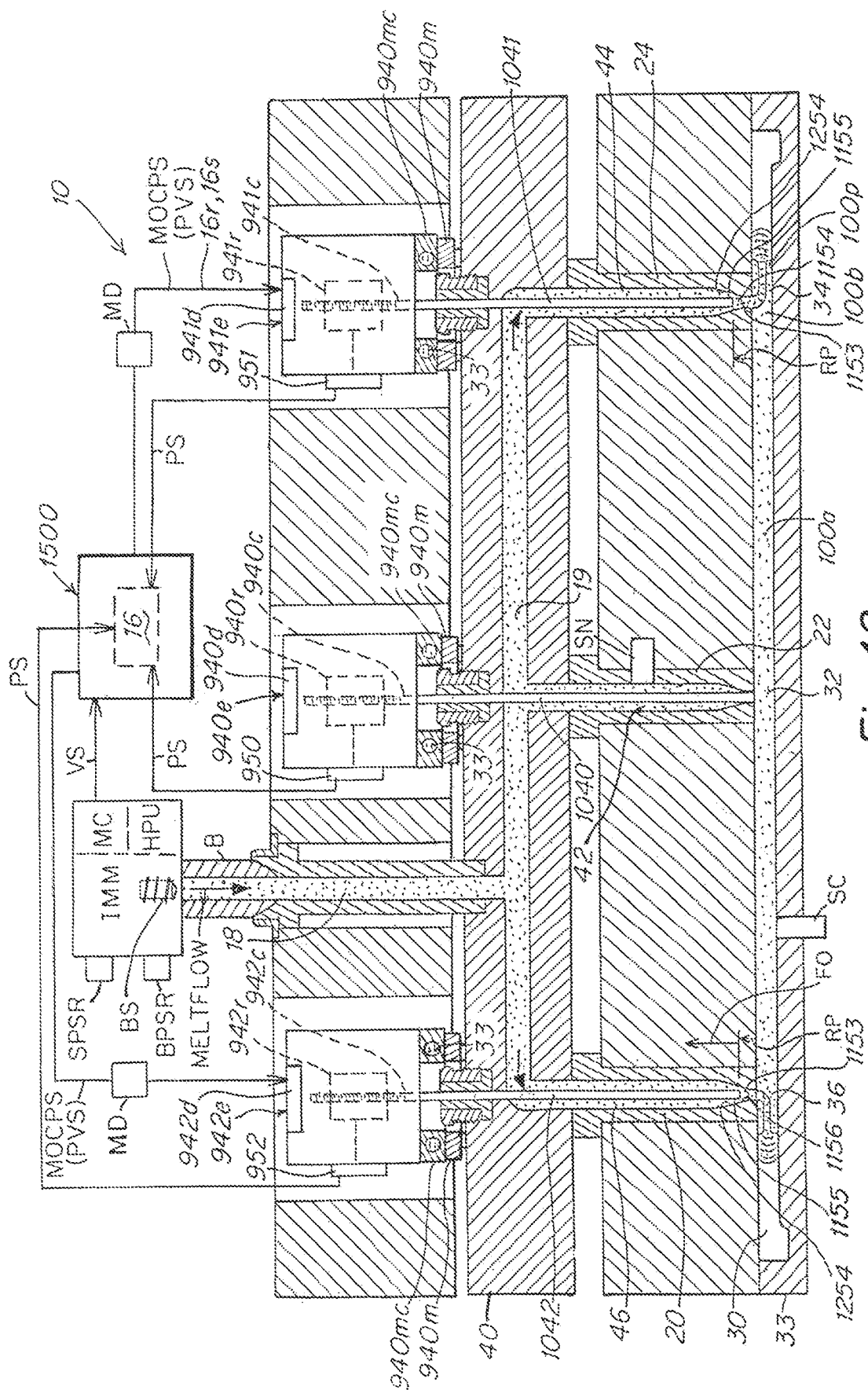
FIG. 18 is a side schematic view of one embodiment of an injection molding apparatus according to the invention where the valve gates include an electrically powered or electric motor containing actuator, the apparatus including a machine signal converter that receives a standard signal generated by an injection machine controller converts the signal to a control signal compatible with the signal receptor of the electrically powered actuators used in the apparatus, the converter routing the converted signal to the actuator processor.

As shown in FIGS. 17 and 18 the injection cycle using apparatuses according to the present invention are most preferably a cascade process as described in U.S. Pat. No. 1,056,945, the disclosure of which is incorporated by reference as if fully set forth herein, where injection is effected or initiated in a sequence from the center nozzle 22 first and at a later predetermined time from the lateral nozzles 20, 24.

As described for example in U.S. Pat. No. 1,056,945, the injection cycle is started by first opening the pin 1040 of the center nozzle 22 and allowing the fluid material 100 (typically polymer or plastic material) to flow up to a position the cavity just before the distally disposed entrance into the cavity 34, 36 of the gates of the lateral nozzles 24. After an injection cycle is begun, the gate of the center injection nozzle 22 and pin 1040 is typically left open only for so long as to allow the fluid material to travel to a position just past the positions at which the downstream gates 34, 36 are located. Once the fluid material has travelled just past the lateral or downstream gate positions 34, 36, the center gate 32 of the center nozzle 22 is typically closed by pin 1040. The lateral or downstream gates 34, 36 are then opened by upstream withdrawal of lateral nozzle pins 1041, 1042. The rate of upstream withdrawal or travel velocity of lateral pins 1041, 1042 is typically carried out such that one or both of the downstream pins 1041, 1042 are first withdrawn upstream over some portion of the full upstream withdrawal path of the pins 1041, 1042 at a first relatively slow speed or velocity and subsequently at a higher speed as described in detail in U.S. Pat. No. 9,011,736, the disclosure of which is incorporated by reference as if fully set forth herein. The center gate 32 and associated actuator 940*f* and valve pin 1040 can remain open at, during and subsequent to the times that the lateral or downstream gates 34, 36 are opened such that fluid material flows into cavity 30 through both the center gate 32 and one or both of the lateral gates 34, 36 simultaneously. When the lateral or downstream gates 34, 36 are opened and fluid material is allowed to first enter the mold cavity into the stream that has been injected from center nozzle 22 past gates 34, 36, the two streams mix with each other. If the velocity of the fluid material is too high, such as often occurs when the flow velocity of injection fluid material through gates 34, 36 is at maximum, a visible line or defect in the mixing of the two streams will appear in the final cooled molded product at the areas where gates 34, 36 inject into the mold cavity. By injecting fluid at a reduced flow rate for a relatively short period of time at the beginning when a downstream gate 34, 36 is first opened and following the time when fluid first enters the first downstream flowing stream, the appearance of a visible line or defect in the final molded product can be reduced or eliminated.

The rate or velocity of upstream and downstream travel of pins 1041, 1042 starting from either the gate closed position or the fully open upstream position is controlled via an actuator controller 16 which controls the rate and direction of flow of pneumatic or hydraulic fluid from the drive system 14 to the actuators 940*f,* 941*f,* 942*f*. A predetermined profile of valve pin or actuator positions versus elapsed time can be input into the actuator controller 16 as the basis for controlling upstream and downstream travel of the valve pin(s) 1041 et al. at one or more selected velocities over the course of travel of the valve pin through the stroke length either upstream or downstream. For example the actuator controller 16 can include instructions that instruct the actuators to move at a reduced velocity relative to one or more selected higher velocities of withdrawal. The higher velocity is typically selected to be the highest velocity at which the system is capable of driving the actuators. Typically, the instructions instruct the actuators to move the valve pins upstream from the gate closed position at a reduced velocity over the course of travel where the tip end of the valve pin restricts the flow of injection fluid 18 to less than the flow would otherwise be if the valve pin were disposed fully upstream, the restriction occurring as a result of the tip end of the valve pin restricting the size of the flow path or opening at or near the gate 32, 34, 36 to a size that is less than the size of the opening or flow path would otherwise be if the valve pin were disposed fully upstream of the gate 32, 34, 36.

In the FIG. 17 prior system, the actuator controller 16 typically receives a signal in real time from a pressure sensor 603 (or 605, 607) disposed in the drive fluid line communicating with the exit of the metering valve 600, the signal being indicative of the reduced drive fluid pressure in line 703 (or 705, 707). In a system where an electric motor apparatus is used in conjunction with an apparatus according to the invention, the actuator controller 16 typically receives a signal in real time indicative of the position of the actuator or the valve pin 1041, 1042. The actuator controller 16 instructs the valve 600 or the electric actuator 941e, 942e to move according to a predetermined profile of drive pressures or electric actuator or valve pin positions that effect the initial slow and subsequent fast moving valve pin velocity protocols described herein.

As shown in the apparatus of FIG. 17 the injection molding machine IMM includes its own internal manufacturer supplied machine controller that generates standardized beginning of cycle gate closed and end of cycle gate open and gate closed machine voltage signals VS typically 0 volts for gate open and 24 volts for gate open (or 0 volts and 120 volts respectively). The standardized machine voltage signals VS are typically sent either directly to the solenoids of a master directional control valve 12 (that controls the direction of flow of actuator drive fluid into or out of the drive chambers of all of the plurality of fluid driven actuators 940f, 941f, 942f) to cause the directional control valve 12 (DCV) to move to a gate closed or gate open actuator drive fluid flow position. Or, the same standardized voltage signals VSC can be sent to the directional control valve 12 via the actuator controller 16 which generates the same standardized voltage signals VSC as the VS signals in response to receipt from a screw position sensor SPSR of a machine screw position signal SPS sent by the injection molding machine IMM to the actuator controller 16, the actuator controller 16 thus generating the same beginning of cycle and end of cycle control voltage signals VSC as the machine IMM can otherwise generate and send VS directly to the directional control valve 12. Thus, where conventional standardized directional control valves 12 are used, the sending of start of cycle and end of cycle signals can be simplified via electrical or electronic signal connections directly to the internal signal generator or controller contained within the injection molding machine.

Electrically powered actuators or electric motors and proportional directional control valves cannot directly receive and utilize a standardized 0 volt (gate closed), 24 volt (gate open) or 0 volt (gate closed) 120 volt (gate open) signals generated by the start and stop cycle controller or signal generator that is typically included in a conventional injection molding machine.

Figure 19:
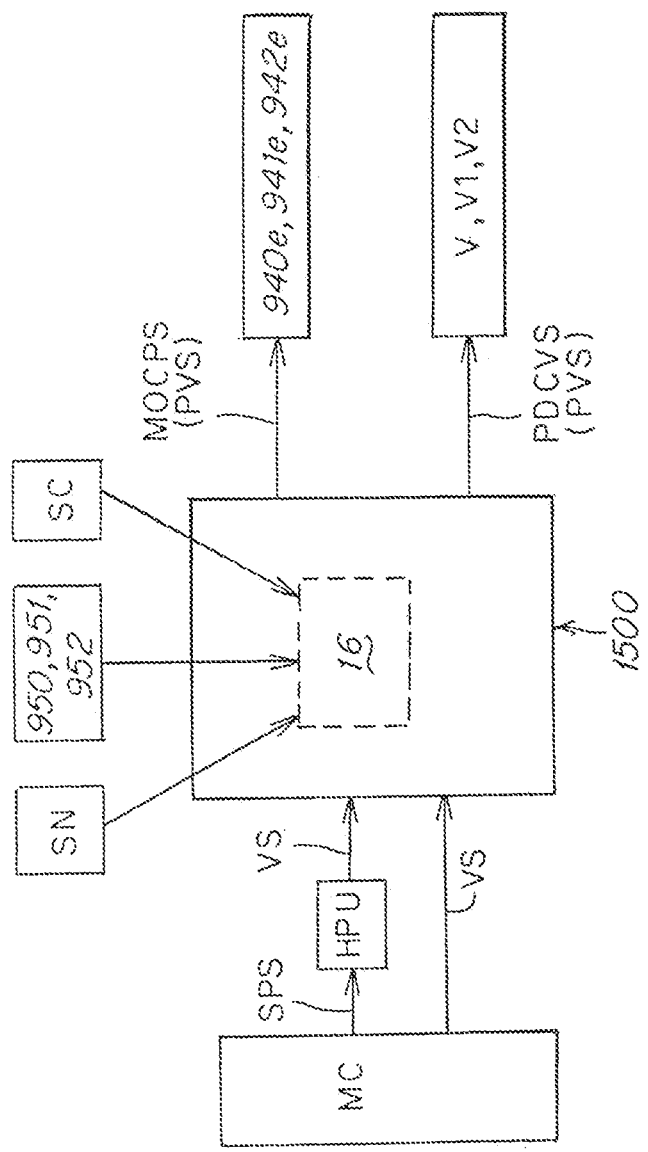
FIG. 19 is a generic schematic diagram of an arrangement of signal communications between an injection molding machine controller, sensors, a signal converter and electric actuators or the interface of a proportional directional control valve.

As shown in a generic schematic form in FIG. 19, an apparatus 10 according to the invention incorporates a signal converter 1500 that can receives standardized injection machine generated start of cycle and end of cycle signals VS (such as 0 volts, 24 volts or 120 volts) and converts the received standardized signal VS to an output power signal MOCPS or PDCVS that is compatible for receipt and use by an electric motor or a proportional direction control valve power signal. The two different actuator based systems, namely electric motor and proportional directional control valve, are shown together in the generic FIG. 11 for illustration purposes only. More typically, a practical implementation of a system as shown in FIG. 11 would be such that the converter 1500 would contain a single microcontroller and an interconnected driver that is configured to work with one or the other of an electric actuator based system or a proportional directional control valve system.

FIG. 18 shows an electric actuator based apparatus in simplified schematic form. As shown in FIG. 1, electric actuators 940e, 941e, 942e each have a rotating rotor 940r, 941r, 942r that is driven by electrical power (typically delivered via the converter 1500) one or more of the precise polarity, amplitude, voltage and strength of which is controlled for input to the motors by actuator controller 16 and the program contained in the actuator controller 16. The rotating rotors 940r, 941r, 942r are interconnected to a translationally movable shaft or other suitable connecting devices 940c, 941c, 942c that interconnect the valve pins 1040, 1041, 1042 to the driven rotors 940r, 941r, 942r. A typical interconnection between a shaft driven by a rotor and the head of a valve pin is shown in U.S. Reexamination Certificate 6,294,122 C1 and U.S. Pat. No. 9,492,960 the disclosures of which are incorporated herein by reference in their entirety as if fully set forth herein.

FIG. 18 illustrates an example of an apparatus 10 according to the invention having a plurality of electric power driven actuators 940e, 941e, 942e, with a central nozzle 22 feeding molten material 18 from an injection molding machine IMM through a main inlet 18a from a barrel of the injection molding machine IMM to a distribution channel 19 of a manifold 40. As in the conventional apparatus of FIG. 1 in the FIGS. 2, 3 apparatuss the IMM typically comprises a barrel (not shown) and a controllably rotatably drivable or driven screw BS disposed within the barrel to generate a pressurized supply of injection fluid 18 the pressure of which can be detected by a barrel pressure sensor BPSR which can send a signal indicative of barrel pressure to a controller 16 for use in controlling positioning and velocity of the valve pin 1040, 1041, 1042. The screw BS of the IMM initiates and ends an injection cycle at selected points in time when rotation of the screw BS is started and stopped. The beginning of an injection cycle is typically defined at a first selected point in time when the screw BS is initially rotated from a standstill position or at a time that occurs shortly after the time when the screw is initially rotated. The end of the cycle is typically defined by a selected second time following and after the first selected time at which second time the screw is stopped from rotating and injection fluid 18 is stopped from being injected into the heated manifold 40.

The distribution channel 19 commonly feeds three separate nozzles 20, 22, 24 which all commonly feed into a common cavity 30 of a mold 300. One of the nozzles 22 is controlled by an electric motor actuator 940e and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

As with the apparatus of FIG. 17, an injection cycle using the apparatuses of FIGS. 18, 19 typically are used to carry out a cascade or sequential valve gate process where injection is effected in a sequence from the center nozzle 22 first and at later predetermined times from the lateral nozzles 20, 24. The cascade process is discussed in detail as an example only, the invention encompassing configurations and protocols where a single valve pin and valve gate inject into a single cavity.

Also as with the FIG. 17 apparatus, the FIGS. 18,19 apparatuses 10 include an actuator controller 16 that typically includes a program that converts a standard voltage signal (such as 0V, 24V, 120V) received from an injection machine controller MC into an instruction signal IS that is compatible with, receivable and interpretable by a motor driver MD to cause the motor driver MD to generate a motor operating control power signal MOCPS that signals the start of an injection cycle and the end of injection cycle, the start typically being a power signal that drives the motor to withdraw the valve pin 1040, 1041, 1042 from a gate closed position and the end being a power signal that drives the motor to drive the valve pin from an upstream position to a gate closed position. The controller 16 can include a program with instructions that can move and drive the valve pin to and along any predetermined position or velocity profile including at reduced velocities as described above. Reduced velocity in the case of the FIG. 2 apparatus means a velocity that is less than the maximum velocity at which the electric actuator is capable of driving the pin, typically less than about 75% of maximum and more typically less than about 50% of maximum velocity whether upstream or downstream.

The actuator controller 16 typically includes additional instructions that can instruct a valve pin 1041, 1042, 1040 to be driven either upstream or downstream starting from either a fully closed downstream or a fully upstream, gate open position at one or more reduced upstream or reduced downstream velocities over at least the beginning portion of the upstream path of travel of the valve pins 1040, 1041, 1042 or the latter portion of the downstream path of travel of the valve pins toward the gates 32, 34, 36 where the tip end 1142 of the pin 1041 restricts flow of the injection fluid through the gate such as shown and described in U.S. Pat. No. 10,569,458.

In one embodiment, an electric actuator 940e, 941e, 942e is drivably interconnected to a valve pin 1040, 1041, 1042 in an arrangement wherein the electric motor drives the valve pin along the axis A of the valve pin and drives the tip end of the valve pin between a first position where the tip end of the valve pin obstructs the gate 34 to prevent the injection fluid from flowing into the cavity, a second position upstream of the first position wherein the tip end of the valve pin restricts flow 1153 of the injection fluid along at least a portion of the length of the drive path extending between the first position and the second position, and a third maximum upstream position where the injection fluid material flows freely without restriction from the tip end of the pin.

The electric motor 940e, 941e, 942e can be configured and arranged relative to its associated valve pin 1040, 1041, 1042 such as shown in FIG. 3 such that the driven rotor 940r, 941r, 942r and shaft components of the motor are axially aligned with the axis A of the valve pin 1040, 1041. Alternatively, a motor configuration can be used such as in U.S. Pat. No. 9,492,960 and FIGS. 2, 4, 5, 6 where the driven rotor and shaft components are arranged at an angle to the axis A, X FIGS. 2, 4, 5, 6 of the valve pin 1040, 1041, 1042.

In an embodiment such as shown in FIG. 18 an injection cycle can be started by first opening the pin 1040 of the center nozzle 22, and allowing the fluid material 100a (typically polymer or plastic material) to flow up to a position the cavity just before 100b the distally disposed entrance into the cavity 34, 36 of the gates of the lateral nozzles 24, 20. After an injection cycle is begun, the gate of the center injection nozzle 22 and pin 1040 is typically left open only for so long as to allow the fluid material 100b to travel to a position just past 100p the positions 34, 36. Once the fluid material has travelled just past 100p the lateral gate positions 34, 36, the center gate 32 of the center nozzle 22 is typically closed by pin 1040 at some predetermined time during the injection cycle. The lateral gates 34, 36 are then opened by upstream withdrawal of lateral nozzle pins 1041, 1042.

In alternative embodiments, the center gate 32 and associated actuator 940e, and valve pin 1040 can remain open at, during and subsequent to the times that the lateral gates 34, 36 are opened such that fluid material flows into cavity 30 through both the center gate 32 and one or both of the lateral gates 34, 36 simultaneously. When the lateral gates 34, 36 are opened and fluid material 100a is allowed to first enter the mold cavity into the stream that has been injected from center nozzle 22 past gates 34, 36, the two streams mix with each other. If the velocity of the fluid material is too high, such as often occurs when the flow velocity of injection fluid material through gates 34, 36 is at maximum, a visible line or defect in the mixing of the two streams will appear in the final cooled molded product at the areas where gates 34, 36 inject into the mold cavity. By injecting from a downstream gate 34, 36 at a reduced flow rate for a relatively short period of time at the beginning when the gate 34, 36 is first opened and following the time when fluid first enters the flow stream 100a, the appearance of a visible line or defect in the final molded product can be reduced or eliminated.

A signal converter 1500, FIGS. 18, 19 is provided that enables a user to connect the standardized voltage signal output (VS, VSC) of a conventional IMM controller to the input of the electric motors 940e, 941e, 942e, FIGS. 2, 3, 4, 5, 6, 10, 11, 12 in the same manner that the user interconnected an IMM controller in a conventional apparatus as in FIG. 1 to DCVs. The signal converter 1500 receives and converts received IMM voltage signals (such as 0 volts, 24 volts, 120 volts) to control signals (MOCPS or PDCVS that operate to begin cycle and end cycle). As shown in FIGS. 10, 11, 12 the standardized voltage signals VS can be alternatively generated by an HPU (hydraulic power unit) that is physically separate but interconnected to the machine controller MC, the HPU unit, FIGS. 10, 11, 12 receiving a barrel screw position signal SPS from the machine controller and generating therefrom a corresponding standardized VS signal that is in turn sent to the controller 16 for conversion to an instruction signal IS usable by either a motor driver MD, or by a proportional directional valve driver HVD, PVD, to drive either a motor or a proportional directional valve to initiate and end an injection cycle.

Thus the standard start and stop control signals generated by an IMM (VS, VSC) can operate in conjunction with the converter 1500 to instruct either the electric actuators, 940e, 941e, 942e or the fluid driven actuators 940p, 941p, 942p, to at least initiate or begin an injection cycle (such as by instructing the actuators 940e, 941e, 942e, 940p, 941p, 942p to drive a valve pin upstream from a gate closed position) and to end or stop an injection cycle (such as by instructing the actuators 940e, 941e, 942e, 940p, 941p, 942p to drive a valve pin downstream from a gate open position into a gate closed position).

Most preferably the physical or mechanical electric signal connectors that are typically used to connect a wire or cable from the IMM (or machine controller MC) to the signal conversion device 1500, are the same physical or mechanical connectors that are used in conventional apparatuses to connect the IMM (or machine controller MC) to the DCVs of a conventional apparatus as described with reference to FIG. 10.

Figure 20:
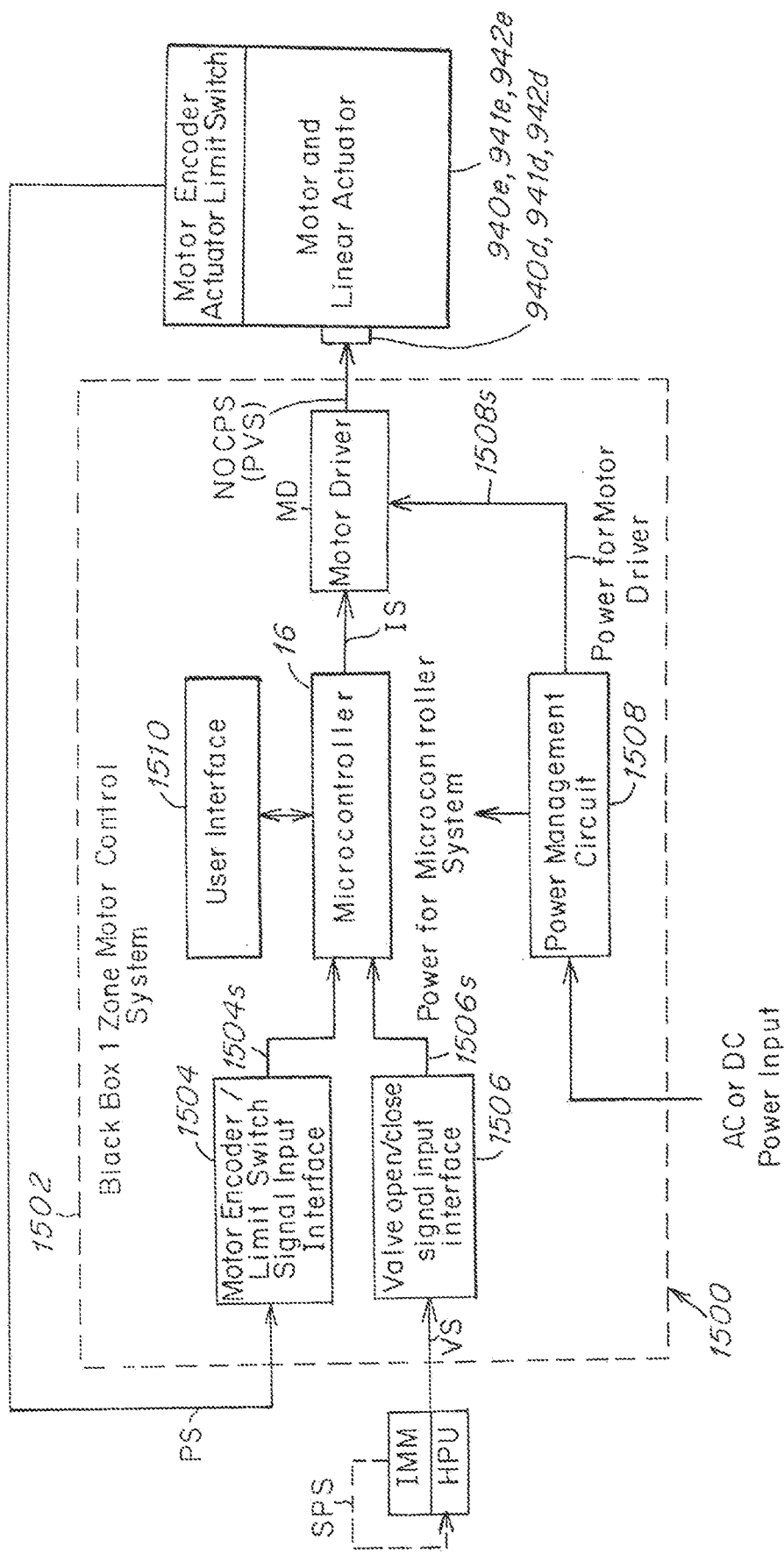
FIG. 20 is a schematic diagram of an arrangement of signal communications between an injection molding machine controller, position sensors, a signal converter and electric actuators.

As shown in FIGS. 18, 19, 20 the signal output VS of the IMM can be connected directly to signal converter 1500 which converts the VS signal into a motor open close power signal MOPCS or a proportional directional control valve signal PDCVS that is compatible with and processable by the motors 940e, 941e, 942e or the proportional directional control valves V, V1, V2. Alternatively, the signal output of the IMM of the machine controller MC of the FIG. 10, 11, 12 embodiment can comprise a barrel screw position signal SPS that is sent to an intermediate HPU unit by a screw position sensor SPSR.

The MOCPS and PDCVS signals include signals that correspond to the VS signals that operate to affect the beginning and end of an injection cycle.

Typically the FIG. 18 apparatus 10 includes one or more position sensors, 950, 951, 952 or other sensors, SN, SC that detect a selected condition of the injection fluid 18 in one or more of the manifold fluid flow channel 19, a nozzle flow channel 42, 44, 46 or in the cavity 30 of the mold 300.

The actuator controller 16 can include a program that receives and processes a real time signal indicative of a condition of the injection fluid 18 or a component of the apparatus (10) such as rotational position of a rotor 940r, 941r, 942r or axial linear position of a valve pin 1040, 1041, 1042. The real time signals sent to and received by the actuator controller 16 are generated by one or more of position sensors 950, 951, 952 or fluid condition sensors SN, SC. The sensors detect and send a signal to the actuator controller that is typically indicative of one or more of rotational position (sensors 950, 951, 952) of a rotor 940r, 941r, 942r or of linear axial position of a valve pin 1040, 1041, 1042. The fluid condition sensors typically comprise one or more of a pressure or temperature sensor SN that senses injection fluid 18 within a manifold channel 19 or a nozzle channel 42, 44, 46 or senses pressure or temperature of the injection fluid SC within the cavity 30 of the mold 300.

The actuator controller 16 can include a program that processes the received signal(s) from one or more of the sensors 950, 951, 952, SN, SC according to a set of instructions that use the received signals as a variable input or other basis for controlling one or more of the position or velocity of the actuators 940e, 941e, 942e or their associated valve pins 1040, 1041, 1042 throughout all or selected portion of the duration of an injection cycle or all or a portion of the length of the upstream or downstream stroke of the actuators 940e, 941e, 942e.

As shown the controller 16 can be included within and comprise a component of the converter 1500, FIGS. 10, 11, 12. Where the converter 1500 includes a controller 16 that includes position and velocity control instructions, the converter 1500 can thus send its machine open close power signals MOCPS (or valve open close signals PDCVS) together with position velocity signals (PVS) to either the electric actuators 940e, 941e, 942e or proportional directional control valves V, V1, V2. The control signals MOCPS and PDCVS thus include a signal that has been converted from and corresponds to one or the other of the converted VS signals received by the converter 1500 from the IMM controller MC or the HPU. The position or velocity control signals PVS can control the position or velocity of the valve pin according to any predetermined profile of pin position or velocity versus time of injection cycle. The form, format, intensity and frequency of the MOCPS, PDCVS and PVS signals are compatible with the signal receiving interface of the electric actuators 940e, 941e, 942e or valves V, V1, V2.

In the embodiment shown in FIGS. 2A, 2B, 2BB, 2C, 2D, 2E, the controllably rotatable shaft of the electric actuator 940 is interconnected downstream to a rotational speed reducing device 46. In the specific embodiment shown, the speed reducing device 46 comprises a strain wave gear that is in turn interconnected to an eccentric pin drive mechanism 940l that converts rotational motion to linear motion of the valve pin 1040. In such an embodiment, the valve pin 1040 can be interconnected to or interengaged with a cam member 600 that is driven eccentrically around an output rotation axis such as the axis 12a of the motor rotor or the axis R3 of the speed reducing, torque increasing device 46. The eccentricity of the cam member 600 enables variable speed and higher torque control over the linear drive movement of the pin 1040 along linear axis A.

Figure 13A:
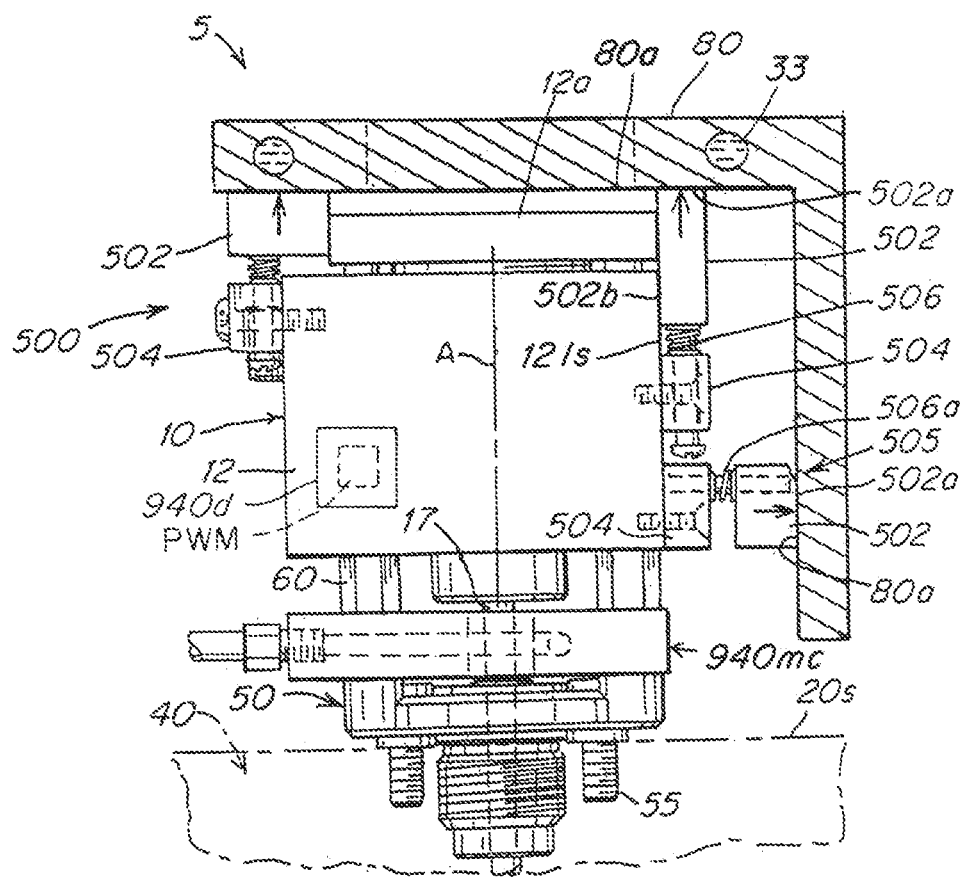
Figure 13B:
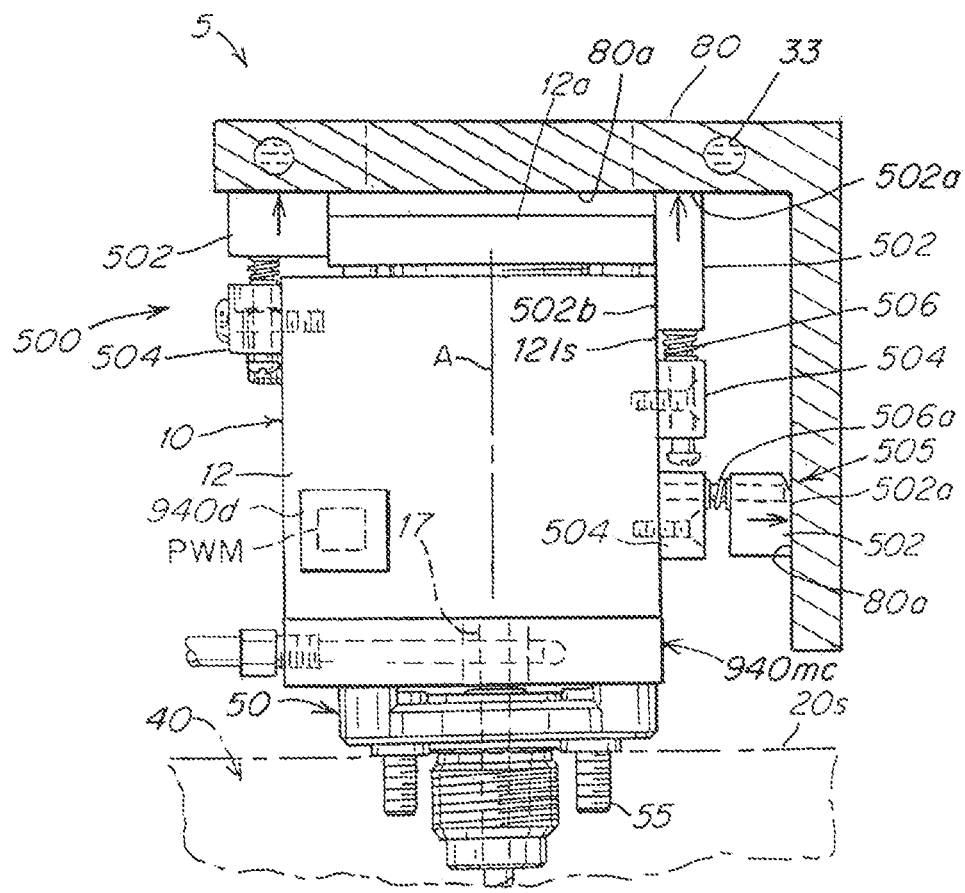
FIG. 13B is a view of an apparatus similar to FIG. 13A where the actuator 12 is mounted directly on or to the cooling device without being spaced as in the FIG. 13A embodiment.
Figure 14A:
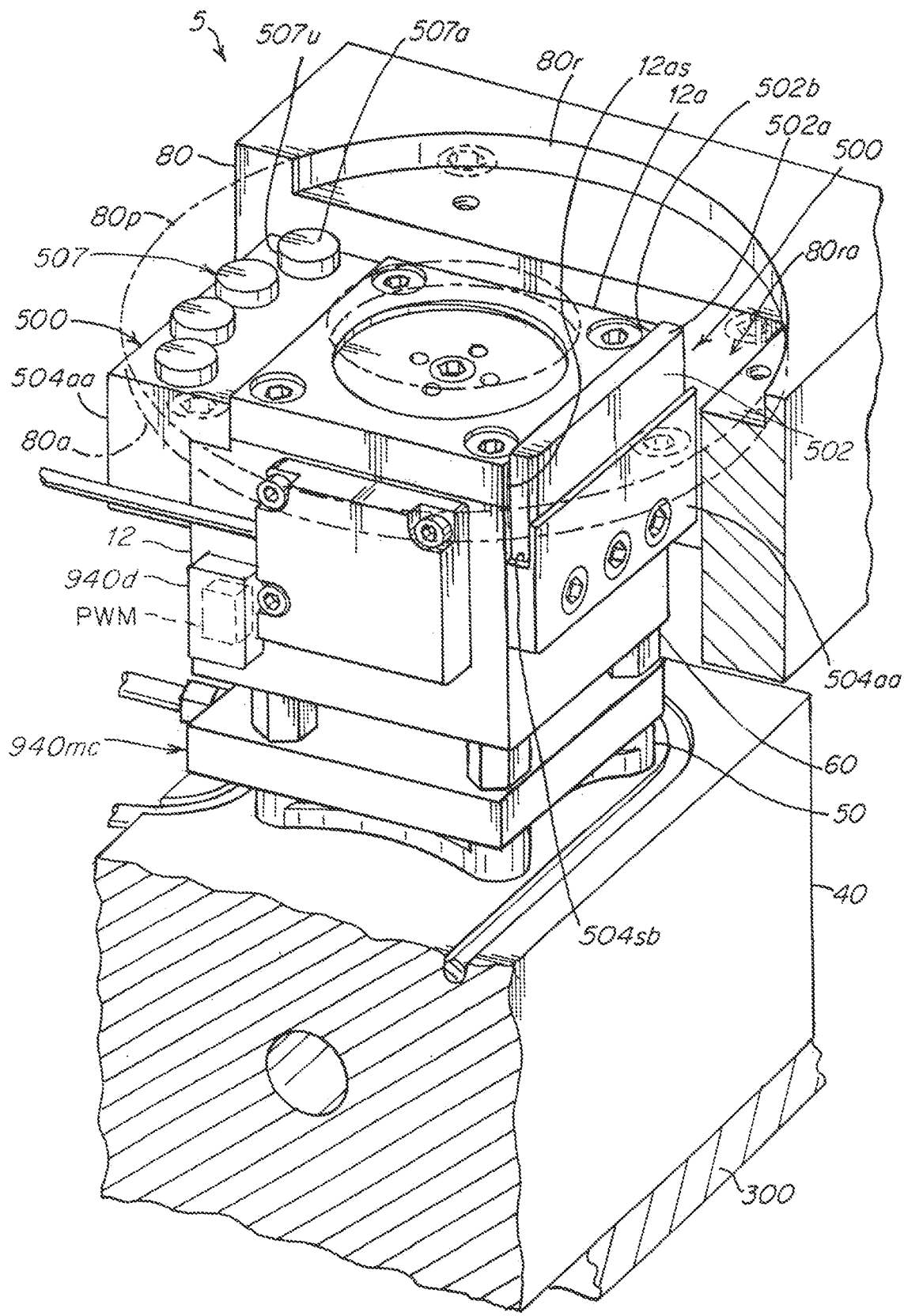
Figure 14B:
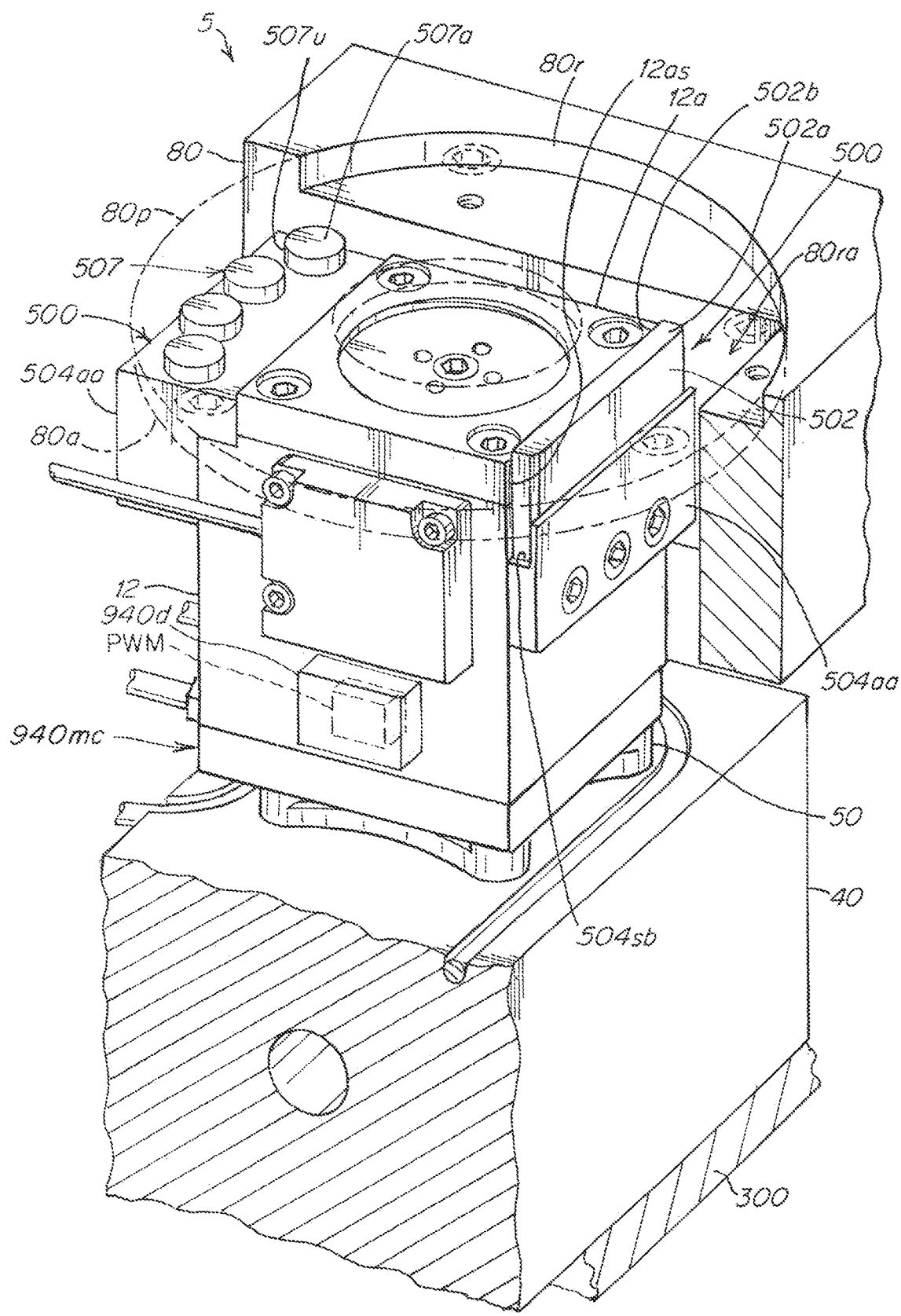
FIG. 14B is a view of an apparatus or assembly similar to FIG. 14A where the actuator 12 is mounted directly on or to the cooling device without being spaced as in the FIG. 13A embodiment.

In the embodiments of FIGS. 1B, 13A, 14A, the motor rotor axis is coaxial with the valve pin axis and thus the actuator housing (940h, 941h, 942h) is mounted on, to and in direct heat communicative contact with the cooling device (940mc) via heat insulative mounts (60). The mounts (60) can be adapted to form a heat insulative gap (G') between the cooling device and one or the other or both of the housing (940h) and the electric drive (940d).

Similarly as shown for example in the embodiments of FIGS. 2A through 2F where the motor rotor axis (Y) is arranged non coaxial relative to the axis (X) of travel of the valve pin (1040), the mounts (60) can be adapted to form a gap (G') between the cooling device (940mc) and the rotary to linear converter (940l, 9411, 940h, 9411h). In these embodiments, by virtue of the intermediate interconnection of the rotary to linear converter (940l, 9411, 940h, 9411h) between the actuator housing (940h) and mounting of the actuator housing (940h) and electric drive (940d) on or to the cooling device (940mc) via mounting of the rotary to linear converter (940l, 940lh) on or to the cooling device (940mc), the mounts (60) also effectively form a heat insulative gap (G'), FIG. 2BB, between the cooling device (940mc) and one or the other or both of the housing (940h) and the electric drive (940d) as well as the rotary to linear converter (940l, 940lh, 9411, 9411h).

The specific strain wave gear and downstream eccentric rotary to linear drive mechanism of FIG. 2A et seq. is described in detail in U.S. international application publication WO2019/100085 A1, the disclosure of which is incorporated by reference in its entirety as if fully set forth herein.

As shown in FIG. 2D, the converter 940l can comprise a mount or alignment support 40a and a sled or slide 43 to which is interconnected a valve pin 100. The alignment support 40a has a guide surface 40as against which a complementary surface 43s of the sled or slide 43 slides as the sled 43 is driven reciprocally along a linear path A by the eccentric drive components that include the cam member 47. The sled 43 has freely rotatably wheels 43r that facilitate upstream downstream sliding of the sled along surface 40as. In an alternative embodiment, wheels 43r are not necessary and the lateral surface 43s can be adapted to slide directly against surface 40as without wheels. The alignment support 40a is attached to a rotation speed reducer 46. The converter 940l is mounted as shown to the heated manifold 60.

The converter 940l includes a drive or mounting wheel or disc 500 having a rotational center 500c to which is axially attached or interconnected the rotatable drive shaft 12 of the actuator 940 either directly or indirectly via rotatably interconnected elongated shaft 20, 20*f* or a connector shaft such as a splined shaft 42*s*. The electrically powered rotatably driven rotor or drive shaft 12 of the motor is rotatably interconnected to the center 500*c* of the drive wheel or disc 500 of the rotary to linear converter 940*l* mechanism. An eccentrically mounted cam member 600, typically a freely rotatable disc or wheel, is mounted to the rotatably driven disc or wheel 500 a selected eccentric off center distance ED from the rotational center 500*c* of the driven wheel or disc 500.

The electrically powered drive of the motor rotor 12 drivably rotates R3 the drive wheel 500 at a controllably selectable speed and direction. As shown, the drive wheel 500 of the converter 940*l* is rotatably driven, the eccentrically mounted cam member 600 rotates R3 around the center 500*c* of the drive wheel 500. As shown, the converter 940*l* includes a slide or sled 43 that is provided with a cam slot 43*s*1 that is attached to the support 40*a* in an arrangement such that an outside circumferential surface 600*cs*, of the cam member 600 engages a complementary interior cam surface 43*ss* of the slide or sled 43 member. The cam surface 43*ss* of the slide 43 is configured and adapted relative to the diameter D of the cam member 600 and the eccentric distance ED to enable the outside surface 600*cs* of the cam member 600 to forcibly engage the interior surface 43*ss* of the slide 43 and thus cause the slide 43 to be forcibly driven in a linear direction up and down or back and forth in or along a linear direction or axis A, FIGS. 5-9 as the cam member 600 is eccentrically drivably rotated R3 around the center of driven disc or wheel member 500. As shown, valve pin 100 is fixedly attached to the driven slide or sled member 43 in an arrangement such that the valve pin 100 is linearly driven together with the linear movement A of the slide 43.

Because of the eccentric mounting of the cam member 600, the linear or axial speed, A31, A32, A33 of the valve pin 1040 and sled 43 along the linear path A varies A31, A32, A33 according to the rotational or angular position of the cam member 600 during the course of a constant rotational speed R3. The linear or axial speed A32 is at a maximum when the cam member 600 is at the ninety degree rotational position and at a lesser speed when the cam member 600 is at the 45 degree position and the 135 degree rotational position.

Conversely because of the eccentric mounting of the cam member 600, the torque force, exerted by the eccentric cam 600 on the valve pin 1040 and sled 43 along the linear path A varies according to the rotational or angular position of the cam member 600 the rotational speed R3 is constant. The torque force is at a minimum when the cam member 600 is disposed at the ninety degree rotational position and at a higher torque when the cam member 600 is at the 45 degree position and the 135 degree rotational position.

The absolute highest torque position is a position where the cam is disposed in the absolute maximum moment position which is typically the 0 degree position, or the 180 degree position.

Rotation of the cam member 600 can be limited to travelling through an arc segment that is something less than the full 360 degrees that the shaft or output device would otherwise rotate, such as between 70 degrees above and below the 90 and 270 degree positions, most preferably between 40 degrees above and below the 90 and 270 degree positions.

The cam device (600) is eccentrically disposed or mounted off center a selected distance (ED, R) from the output rotation axis (12*a*, R3*a*) in an arrangement such that when the shaft (12) or rotation device (16, 430, 500) is rotatably driven, the cam member (600) is eccentrically rotatably drivable around the output rotation axis (12*a*, R3*a*) to selectable angular positions above and below either a 270 degree position or a 90 degree position, FIGS. 6A, 6B, 6C.

In such a preferred embodiment, a controller, FIGS. 1, 6A, 11 is interconnected to the shaft (12) or output rotation device (16, 430, 500), the controller can include an algorithm that controllably limits rotation of the shaft (12) or output rotation device (16, 430, 500) during the course of an entire injection cycle to angular positions between about 70 degrees above and 70 degrees below the 270 degree position, or between about 70 degrees above and 70 degrees below the 90 degree position. A preselected angular position between the 270 or 90 degree position and 70 degrees above defines a fully open valve pin position (PFO) and a preselected angular position between the 270 or 90 degree position and 70 degrees below defines a valve pin position where the gate is closed (PFC).

As shown a slide, sled or linear travel device (43, 40) is adapted to guide the valve pin along a linear path of travel (A, AS). The rotary to linear converter device (40, 43) can include stops or linear travel limiters (not shown) that are fixed to the alignment supports 40*a* of the rotary to linear converter 940*l* or otherwise fixedly attached relative to the sled 43. The stops are typically mounted and adapted to limit linear travel of the slide or sled 43 such that when the cam member 600 is rotated to a preselected maximum angular position 70 degrees or less above or below the 270 (or 90) degree position, travel of the cam 600 and the valve pin is stopped. Typically, such preselected maximum angular positions above and below the 270 or 90 degree positions are selected so as to define a corresponding preselected valve fully open position (PFO) and a corresponding valve fully closed position (PFC).

The algorithm can controllably limit rotation of the shaft (12) or output rotation device (16, 430, 500) during the course of an entire injection cycle to angular positions between about 40 degrees above and 40 degrees below the 270 degree position or between about 40 degrees above and 40 degrees below the 90 degree position wherein a preselected angular position between 40 degrees above the 270 or 90 degree position defines the fully open valve pin position (PFO) and a preselected angular position 40 below the 270 or 90 degree position defines the valve pin position where the gate is closed (PFC).

An alternative manner of describing how rotation of the cam 600 is limited is that the algorithm of the controller 16, 1000 limits rotation of the shaft (12) or output rotation device (16, 430, 500) to selectable angular positions that create a moment arm M that extends between a selected minimum moment arm M2, and a selected maximum moment arm, M1, the selectable angular positions being between 70 degrees above and 70 degrees below the preselected angular position (270 degrees) that corresponds to the selected maximum moment arm M1. Typically the absolute maximum moment arm M1 exists when the rotational or angular position of the cam 600 is disposed at 270 degrees or 90 degrees, although other angular positions could be preselected to define or correspond to the absolute maximum moment arm position.

As shown the driven wheel or disc component 500 is typically mounted on the forward face 500*m* of the driven rotating disc or wheel component 700 of a speed reducing device 46 which is reduced in rotational speed relative to the rotational speed of the rotor or drive shaft 12 of the actuator 200.

The rotational speed reducing device 46 can comprise a strain wave gear that includes a rotatable elliptical or other non circular shaped such as a three node containing shaped disk or ring that generates a reduction in rotation speed output relative to the rotation speed of the input rotor. The strain wave gear is typically comprised of three basic components: a wave generator, a flex spline and a circular spline. The wave generator is typically made up of an elliptical or other non circular shaped such as a three node containing shaped disk called a wave generator plug and an outer ball bearing, the outer bearing having an elliptical or other non circular shaped such as a three node containing shape as well. The flex spline is typically shaped like a shallow cup. The circumferential side walls of the spline are very thin, but the bottom is relatively rigid. This results in significant flexibility of the walls at the open end due to the thin wall, and in the closed side being quite rigid and able to be tightly secured to an output shaft. Teeth are positioned radially around the outside of the flex spline. The flex spline fits tightly over the wave generator, so that when the wave generator plug is rotated, the flex spline deforms to the shape of a rotating ellipse or other non circular shape such as a three node containing shape and does not slip over the outer elliptical or other non circular shaped such as a three node containing shaped ring of the ball bearing. The ball bearing lets the flex spline rotate independently to the wave generator's shaft. The circular spline is a rigid circular ring with teeth on the inside. The flex spline and wave generator are placed inside the circular spline, meshing the teeth of the flex spline and the circular spline. Because the flex spline is deformed into an elliptical or other non circular shaped such as a three node containing shape, its teeth only actually mesh with the teeth of the circular spline in two regions on opposite sides of the flex spline (located on the major axis of the ellipse or other non circular shaped such as a three node containing shape).

As the wave generator plug rotates, the flex spline teeth which are meshed with those of the circular spline change position. The major axis of the flex spline's ellipse or other non circular shaped such as a three node containing shape rotates with wave generator, so the points where the teeth mesh revolve around the center point at the same rate as the wave generator's shaft. The key to the design of the strain wave gear is that there are fewer teeth (often for example two fewer) on the flex spline than there are on the circular spline. This means that for every full rotation of the wave generator, the flex spline would be required to rotate a slight amount (two teeth in this example) backward relative to the circular spline. Thus the rotation action of the wave generator results in a much slower rotation of the flex spline in the opposite direction. For a strain wave gearing mechanism, the gearing reduction ratio can be calculated from the number of teeth on each gear.

The apparatus most preferably includes a position sensor 950, 951, 952 that senses a rotational position of the rotor 12 of the electric actuator or motor 200 or a position sensor that senses the linear position of the valve pin 1040 or a linearly moving member such as sled 43 that moves together with linear movement of the valve pin 1040. In the FIGS. 1, 2 embodiment, the position sensor typically comprises an encoder that senses the rotational position of the rotor 12 or a rotating element of the strain wave gear 400 such as the flexible spline 430 which in turn corresponds to the linear position of the pin 1040. The linear position sensor PS can comprise a Hall Effect sensor (HES or H.E.S.) that senses a change in a magnetic field generated by a magnet that is mounted to and linearly moves together with linear movement of the pin 1040, the sensor converting change in magnetic field to position of the valve pin 1040.

In the embodiments shown, the strain wave gear 400, FIGS. 10, 11, 12A, 12B, 12C, 12D is comprised of the wave generator or thin walled bearing 460 that is mounted within and against the inner circumferential wall of the flex spline 430 that is in turn mounted within the inner splined circumference of a rigid circular spline 448 as shown for example in FIGS. 2C, 2D, 2E. An inner bearing race 464 pressed on the elliptical or other non circular shaped such as a three node containing surface of the hub 472 either having or taking a shape complementary to the cam or elliptical or other non circular shaped such as a three node containing surfaces of the hub 472 and imparting forces 470 through the ball bearings 466 to the complementarily shaped outer race 462 that is also generally elliptical or other non circular shaped such as a three node containing shape and to the flex spline teeth 444, forcing them to mesh with the ring gear teeth 446 as the cam turns on shaft 12.

The input shaft comprises the motor shaft 12 that rotates around the shaft axis 12a, the outer surface of which is compressibly mated with the inner circumferential surface 480 of the shaft receiving bore 474 of the hub of the gear. In the embodiment shown, output shaft or disc being the inner race 414 of an output bearing 410, the interface surface 420 of the inner race 414 being attached to a complementary end surface 432 of the flexspline 430. The strain wave gear as shown is comprised of a housing 400 on which a slewing ring bearing is mounted at the front end. The outer race 412 of the bearing is bolted to the housing and the inner race 414 is part of an armature 418 which is supported by rollers 416. The slewing ring bearing provides superior stability against any forward to backward movement of the armature as it turns in the housing. The forward end or face 422 of the armature has a bolt pattern 424 on which the drive disc 500 is fastened by screws 428 which pass through bolt pattern 502. The cam member 600 is bolted to armature 418 through one of the holes in bolt pattern 502 of the drive disc 500 and is rotated eccentrically a distance ED around output rotation axis R3a. The shoulder bolt 602 clamps a boss 604 to the disc 500 that is drivably rotated around the gear reducer rotation axis. The boss forms an inner race for roller bearings 606. The outer race 608 has an outer surface 600cs that drives the sled 43 up and down. At the rearward end 420 of the armature there is a bolt pattern 426 to which the flex spline 430 is bolted. The flex spline is cup shaped. The forward end 432 is closed and has a bolt pattern 436 for securing the end of the flex spline to the armature by means of clamping plate 436 and bolts 438. The sidewall 440 of the flex spline is thin for flexibility but retains good torsional strength. The rearward end of the cup shape 442 is open to receive the wave generator 460. The exterior surface of the rim has gear teeth 444 which selectively engage teeth 446 on the ring gear 448 as the wave generator rotates. The wave generator is mounted on the motor drive shaft 12 by hub 472. Hub 472 has an aperture 474 lined with compressible wedge shaped sleeves 480. When screws 478 are tightened, they force the clamping ring 476 rearward compressing the sleeves and self-centering and clamping the hub to the shaft 12 without the use of Allen set screws or keyways for smoother operation. The wave generator 460 is composed of an oval shaped cam formed on hub 472 on which is mounted by force fit, a ball bearing assembly with a flexible inner race that is force fit on the cam portion of hub 472. Lobes 482 on the hub form the inner race 464 into a cam with two lobes 468 formed 180 degrees apart in an oval shape. The outer race 462 can be rigid in the form an ellipse or other non circular shaped such as a three node containing shape complementary to the elliptical shape or other non circular shaped such as a three node containing shape of the hub 472 and the inner race 464 or can be thin and flexible so it can conform to the shape of the cam such that it projects outward (arrows 470, FIGS. 12A & 12B) together with ball bearings 466 as the shaft 12 rotates, to force the gear teeth 444, 446 to mesh at locations 450. The teeth 444 at locations 452 flex inward after the lobes have passed to allow clearance for one or more of the teeth 444 to skip the ring gear teeth 446 and allow the flex spline 430 to rotate in relation to the ring gear 448 as dictated by the gear ratio and number of teeth.

The nature of the arrangement of the operative components (wave generator, flex spline, circular spline) of the strain wave gear 46, 400 in a nested fashion provide a physical device depth GD, diameter DIA or physical size that is adapted to be compact and space efficient enough or sufficient to enable the device to be mounted to the housing of the rotary to linear converter 40, and to be readily mountable to and dismountable from, alone or together with the rotary to linear converter, either one or the other of the top clamping plate and the heated manifold.

Alternatively the speed reducing, torque increasing device can comprise an assembly such as a worm gear assembly, a spur gear assembly), a planetary gear assembly where the rotor 12 of the motor is connected to and rotates the highest speed rotating gear or gear tooth containing component of the assembly and the intermediate shaft is connected to and rotated by the highest rotating gear or gear tooth containing component of the assembly to effectively reduce the rotational speed and increase the torque output of the rotor 12 that is transmitted to the output shaft that is driven at a reduced speed and higher torque. Other assemblies such as helical gear assemblies, or belts and pulley arrangements and assemblies can be used to affect such speed changing and torque changing.

As used in this application with regard to various monitoring and control systems, the terms "controller," "component," "computer" and the like are intended to refer to a computer-related entity, either hardware, a combination of hardware and software, software, or software in execution. For example, a component or controller may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Claimed methods of the present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the term "data" or the like means any sequence of symbols (typically denoted "0" and "1") that can be input into a computer, stored and processed there, or transmitted to another computer. As used herein, data includes metadata, a description of other data. Data written to storage may be data elements of the same size, or data elements of variable sizes. Some examples of data include information, program code, program state, program data, other data, and the like.

As used herein, computer storage media or the like includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

The methods described herein may be implemented in a suitable computing and storage environment, e.g., in the context of computer-executable instructions that may run on one or more processors, microcontrollers or other computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

A "controller," as used herein also refers to electrical and electronic control apparatus that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

What is claimed is:

1. An injection molding apparatus comprising:
a heated manifold that receives injection fluid from an injection molding machine and distributes the injection fluid to a flow channel that delivers the injection fluid to a gate of a mold cavity,
an actuator controllably drivable by electric power having a drive axis and a driver adapted to controllably drive a valve pin along a linear path of travel, the valve pin being adapted to vary rate of flow of the injection material to and through the gate,
the driver receiving electrical energy or power from an electrical drive,
the electrical drive comprising an interface that receives and controllably distributes electrical energy or power in controllably varied amounts during the course of an injection cycle to the driver,
the actuator having a housing,
the electrical drive being housed within or by the housing or being mounted on or to the housing,
the housing and the electrical drive being mounted on, to or in close proximity to the heated manifold,
the apparatus including a cooling device disposed between the heated manifold and the housing,
the cooling device being adapted to substantially isolate or insulate at least the electrical drive from substantial communication with heat emanating or emitted from the heated manifold.

2. Apparatus of claim 1 wherein the cooling device is adapted to substantially isolate or insulate the housing from substantial communication with heat emanating or emitted from the heated manifold.

3. Apparatus of claim 1 wherein the electrical drive is mounted on or to the cooling device.

4. Apparatus of claim 1 wherein the electrical drive is housed within or by the housing or physically mounted on or to the housing in thermally conductive communication or contact therewith.

5. Apparatus of claim 1 wherein the housing is mounted on or to the cooling device.

6. Apparatus of claim 1 wherein the housing is mounted in direct heat communicative contact with the cooling device.

7. Apparatus of claim 1 wherein the housing is mounted on or to the cooling device via a mount comprised of a heat insulative material.

8. Apparatus of claim 7 wherein the housing is interconnected to a rotational speed control device that is interconnected to a rotary to linear converter device in an arrangement wherein the valve pin is driven along a linear axis that is non-coaxial relative to a drive axis of the actuator, the rotary to linear converter device being mounted in direct heat communicative contact with the cooling device.

9. Apparatus of claim 8 wherein the mount is adapted to form a gap between the cooling device and one or more of the linear converter device, the actuator housing, the rotational speed control device and the electric drive.

10. Apparatus of claim 1 wherein the cooling device is mounted in direct or indirect thermal contact or communication with the heated manifold.

11. Apparatus of claim 1 wherein the cooling device comprises a body of highly heat conductive material that contains one or more channels through which a flow of a selected cool or cooling fluid is routed.

12. Apparatus of claim 1 wherein the cooling device comprises a Peltier effect device.

13. Apparatus of claim 1 wherein the electric actuator comprises a driver adapted to receive and convert electrical energy to driven movement of a rotor or rod arranged to drive the valve pin along the linear path of travel.

14. Apparatus of claim 1 wherein the cooling device is mounted on or to an intermediate mount comprised of a metal material, the intermediate mount being mounted in direct metal to metal contact or communication with the heated manifold.

15. Apparatus of claim 1 wherein the electrical drive includes a pulse-width modulator (PWM) that converts received electrical energy or power into sinusoidal voltage waveforms, each sinusoidal voltage waveform being adapted to drive a corresponding phase-coil of the actuator driver.

16. Apparatus of claim 1 further comprising a signal converter for converting signals generated by an injection molding apparatus that is comprised of an injection molding machine having a drivably rotatable barrel screw that generates an injection fluid, a heated manifold that receives an injection fluid from the injection molding machine and distributes the injection fluid to one or more gates, a mold having a cavity communicating with the gates to receive the injection fluid, wherein the injection molding machine includes a machine controller or a control unit that generates one or more directional control valve compatible signals, wherein the direction control valve compatible signals are compatible for use by a signal receptor, interface or driver of a standard fluid directional control valve to instruct the fluid directional control valve to move to a position that routes a source of drive fluid to flow in a direction that drives an interconnected fluid drivable actuator to move in a direction that operates to begin an injection cycle and to move in a direction that operates to end an injection cycle,
wherein the signal converter is interconnected to the machine controller or control unit, the signal converter receiving and converting the directional control valve compatible signals to a command signal that is compatible with a signal receptor or interface of an electrically powered actuator or a signal receptor or interface of a proportional directional control valve that drives a fluid driven actuator,
wherein the signal converter includes a processor that converts the command signals into a form, frequency, power or format that is usable by the signal receptor or interface of the electrically powered actuator or by the signal receptor or interface of the proportional directional control valve to respectively cause the electrically powered actuator or the proportional directional control valve to be driven in a direction that operates to either begin an injection cycle or to end an injection cycle.

17. Apparatus of claim 1 further comprising one or more sensors that detect and generate one or more sensor signals indicative of one or more of rotational or linear position of an actuator or its associated valve pin, pressure or temperature of the injection fluid within a fluid channel of the manifold or within a nozzle channel or within the cavity of the mold or within a barrel of the injection molding machine, the apparatus including an actuator controller that receives and uses the one or more sensor signals in a program that:
instructs the actuator or its associated valve pin to travel during the course of the injection cycle to positions that correspond to a predetermined profile of injection fluid pressures, linear or rotational pin positions, linear actuator or valve pin positions, barrel screw positions, barrel pressures or actuator drive fluid pressures or that, instructs the actuator or its associated valve pin such that the valve pin is withdrawn from a closed gate position upstream at a reduced velocity over a selected path of upstream travel, or that, instructs the actuator or its associated valve pin to travel such that the valve pin is driven downstream at a reduced velocity over a selected path of travel where a distal tip end of the pin travel from upstream of the gate to a gate closed position, or that, instructs the actuator or its associated valve pin to travel such that the valve pin is driven upstream or downstream to an intermediate position between a gate closed position and a fully upstream position where the valve pin is maintained in the intermediate position for a selected period of time during the course of the injection cycle wherein, in the intermediate position, the distal tip end of the valve pin restricts flow of injection of the injection to less than a maximum flow.

18. A method of performing an injection molding cycle comprising:

injecting a flow of injection fluid to a heated manifold that distributes the injection fluid to a flow channel through which the injection fluid is controllably delivered to a gate of a mold cavity by controllably driving an actuator, distributing electrical energy or power from an electrical drive to a driver of the actuator, adapting the driver to controllably drive a valve pin along a linear path of travel according to the distributed electrical energy, configuring the electrical drive as an interface that receives and controllably distributes electrical energy or power in controllably varied amounts during the course of an injection cycle to the driver, providing the actuator with a housing, housing the electrical drive within or by the housing or mounting the electrical drive on or to the housing, mounting the housing and the electrical drive on, to or in close proximity to the heated manifold, disposing a cooling device between the heated manifold and the housing, and, adapting the cooling device to substantially isolate or insulate at least the electrical drive from substantial communication with heat emanating or emitted from the heated manifold.

* * * * *